(12) United States Patent
Nakayama

(10) Patent No.: US 9,759,927 B2
(45) Date of Patent: Sep. 12, 2017

(54) IMAGE BLUR CORRECTION DEVICE AND IMAGING APPARATUS

(71) Applicant: SONY CORPORATION, Tokyo (JP)

(72) Inventor: Tatsuyuki Nakayama, Kanagawa (JP)

(73) Assignee: SONY CORPORATION, Tokyo (JP)

(*) Notice: Subject to any disclaimer, the term of this patent is extended or adjusted under 35 U.S.C. 154(b) by 22 days.

(21) Appl. No.: 14/447,284

(22) Filed: Jul. 30, 2014

(65) Prior Publication Data
US 2015/0043075 A1 Feb. 12, 2015

(30) Foreign Application Priority Data

Aug. 12, 2013 (JP) ................................. 2013-167625

(51) Int. Cl.
*G02B 27/64* (2006.01)
(52) U.S. Cl.
CPC .................................. *G02B 27/646* (2013.01)
(58) Field of Classification Search
CPC .... G02B 27/646; G02B 7/023; G02B 21/241; G02B 7/005; G02B 7/346; G02B 27/64; G06T 5/003; G06T 2207/20201; H04N 5/23287; H04N 5/23248; G03B 2205/0007; G03B 13/32; G03B 5/06
See application file for complete search history.

(56) References Cited

U.S. PATENT DOCUMENTS

| 3,638,502 A | * | 2/1972 | Leavitt | G01C 21/18 348/147 |
| 5,822,122 A | * | 10/1998 | Kuno | G02B 27/646 359/554 |
| 2008/0136949 A1 | * | 6/2008 | Huang | G03B 13/00 348/294 |
| 2009/0128637 A1 | * | 5/2009 | Noji | G03B 5/00 348/208.1 |
| 2010/0202766 A1 | * | 8/2010 | Takizawa | G03B 5/00 396/55 |

FOREIGN PATENT DOCUMENTS

JP H07-274056 A 10/1995

* cited by examiner

*Primary Examiner* — Scott J Sugarman
*Assistant Examiner* — Balram Parbadia
(74) *Attorney, Agent, or Firm* — Chip Law Group

(57) ABSTRACT

An image blur correction device includes: a lens unit that has at least one lens and is rotatable at least in a first direction, which is an axial rotation direction of a first fulcrum axis orthogonal to an optical axis of the lens, and a second direction which is an axial rotation direction of a second fulcrum axis orthogonal to the first fulcrum axis; a fixing member that rotatably supports the lens unit in the first and second directions; a first actuator that has a first driving portion movable in a predetermined direction so as to rotate the lens unit in the first direction; and a second actuator that has a second driving portion movable in a predetermined direction so as to rotate the lens unit in the second direction.

15 Claims, 46 Drawing Sheets

IMAGE BLUR CORRECTION DEVICE AND IMAGING APPARATUS

CROSS REFERENCE TO RELATED APPLICATIONS

This application claims the benefit of Japanese Priority Patent Application JP 2013-167625 filed Aug. 12, 2013, the entire contents of which are incorporated herein by reference.

BACKGROUND

The present technology relates to a technical field of an image blur correction device, which is rotatable in axial rotation directions of at least two fulcrum axes orthogonal to a lens unit, and an imaging apparatus.

Some imaging apparatuses, such as video cameras, still cameras, and various apparatuses having a built-in camera unit, are provided with an image blur correction device that performs image blur correction by moving a lens in a direction orthogonal to the optical axis direction.

In some image blur correction devices provided in such imaging apparatuses, a lens unit having a lens is rotatable at least in the axial rotation directions of the two fulcrum axes orthogonal to the outer casing, for example, a first direction, which is an axial rotation direction of a first fulcrum axis orthogonal to the optical axis of the lens, and a second direction which is an axial rotation direction of a second fulcrum axis orthogonal to both of the optical axis and the first fulcrum axis (for example, refer to Japanese Unexamined Patent Application Publication No. 07-274056).

The lens unit is rotated in a pitching direction about the first fulcrum axis as a fulcrum and is rotated in a yawing direction about a second fulcrum axis as a fulcrum, thereby correcting image blur.

The image blur correction device described in Japanese Unexamined Patent Application Publication No. 07-274056 is provided with two gimbal mechanisms each having a base plate which is bent in an L-shape in order to rotate the lens unit in the pitching direction and the yawing direction.

One gimbal mechanism performs a blur correction operation in the pitching direction by rotating the lens unit in the pitching direction. The other gimbal mechanism performs a blur correction operation in the yawing direction by rotating integrally one gimbal mechanism and the lens unit in the yawing direction.

SUMMARY

However, in the image blur correction device described in Japanese Unexamined Patent Application Publication No. 07-274056, the two gimbal mechanisms for rotating the lens unit in the pitching direction and the yawing direction are provided. Thus, there is a problem in that, due to the two gimbal mechanisms, the number of components becomes large and a structure becomes complex.

Further, parts of the two gimbal mechanisms are provided to be opposed in a direction orthogonal to the optical axis and overlap with each other. Hence, there is a problem in that, due to the two gimbal mechanisms, the size of the device increases in the direction orthogonal to the optical axis and it becomes difficult to achieve reduction in the size.

Accordingly, in the image blur correction device and the imaging apparatus according to embodiments of the present technology, it is desirable to overcome the problems, simplify the structure thereof, and achieve reduction in the size thereof.

According to a first embodiment of the present technology, there is provided an image blur correction device including: a lens unit that has at least one lens and is rotatable at least in a first direction, which is an axial rotation direction of a first fulcrum axis orthogonal to an optical axis of the lens, and a second direction which is an axial rotation direction of a second fulcrum axis orthogonal to the first fulcrum axis; a fixing member that rotatably supports the lens unit in the first and second directions; a first actuator that has a first driving portion movable in a predetermined direction so as to rotate the lens unit in the first direction; and a second actuator that has a second driving portion movable in a predetermined direction so as to rotate the lens unit in the second direction, in which a first movement allowance section is formed that moves the first driving portion relative to the lens unit when the lens unit is rotated in the second direction by movement of the second driving portion, and in which a second movement allowance section is formed that moves the second driving portion relative to the lens unit when the lens unit is rotated in the first direction by movement of the first driving portion.

Thereby, when the lens unit is rotated by one driving unit, the other driving portion is moved relative to the lens unit.

According to a second embodiment, in the blur correction device, it is preferable that the lens unit be provided with a plurality of protrusion portions which are pressed by the driving portions and function as driven portions, spaces between the plurality of protrusion portions be formed as the movement allowance sections, and the driving portions be inserted into the movement allowance sections in a state where the driving portions are movable.

Thereby, the driven portions are pressed by the driving portions such that the lens unit is rotated, and the driven portions function as portions for forming the movement allowance sections.

According to a third embodiment, in the blur correction device, it is preferable that the first driving portion and the second driving portion be disposed in a state where the driving portions intersect with each other in a protruding direction of the driven portions.

Thereby, the spaces, in which the first driving portion and the second driving portion are disposed, decrease in size in a direction orthogonal to a direction of intersection.

According to a fourth embodiment, in the blur correction device, it is preferable that the number of the driven portions provided be four, and the driven portions be arranged in a matrix.

Thereby, the spaces, in which the driven portions are disposed, become small, and spaces are formed between the driven portions.

According to a fifth embodiment, in the blur correction device, it is preferable that, when the lens unit is rotated, the driving portions come into line contact with the driven portions.

Thereby, sliding loads of the driven portions and the driving portions are reduced.

According to a sixth embodiment, in the blur correction device, it is preferable that the lens unit be provided with a plurality of protrusion portions which are pressed by the driving portions and function as driven portions, the driving portions be formed in frame shapes, inner spaces of the driving portions be formed as the movement allowance sections, and the driving portions be inserted into the movement allowance sections in a state where the driving portions are movable.

Thereby, the movement allowance sections are formed as the inner spaces of the portions having the frame shapes.

According to a seventh embodiment, in the blur correction device, it is preferable that the first driving portion and the second driving portion be disposed in a state where the driving portions intersect with each other.

Thereby, the spaces, in which the first driving portion and the second driving portion are disposed, decrease in size in a direction orthogonal to a direction of intersection.

According to an eighth embodiment, in the blur correction device, it is preferable that, when the lens unit is rotated, the driving portions come into line contact with the driven portions.

Thereby, sliding loads of the driven portions and the driving portions are reduced.

According to a ninth embodiment, in the blur correction device, it is preferable that the first driving portion be rotatable in an axial rotation direction of the first fulcrum axis, and the second driving portion be rotatable in an axial rotation direction of the second fulcrum axis.

Thereby, sliding loads of the first driving portion and the second driving portion to the driven portions are reduced.

According to a tenth embodiment, in the blur correction device, it is preferable that the lens unit be rotatable in a third direction which is an axial rotation direction of a third fulcrum axis orthogonal to both of the first fulcrum axis and the second fulcrum axis, and a third actuator, which has a third driving portion movable in a predetermined direction so as to rotate the lens unit in the third direction, be provided.

Thereby, in addition to the first and second directions, the lens unit is also rotated in the third direction about the third fulcrum axis as a fulcrum.

According to an eleventh embodiment, in the blur correction device, it is preferable that the third direction be set as an axial rotation direction of the optical axis of the lens, the lens unit be provided with a driven portion which is pressed by the first driving portion or the second driving portion, the lens unit be rotated in the first direction or the second direction by the driven portion being pressed by the first driving portion or the second driving portion, and the driven portion be rotatable toward the other side in the third direction when the lens unit is rotated toward one side in the third direction of the lens unit.

Thereby, the driven portions do not regulate rotation of the lens unit in the third direction.

According to a twelfth embodiment, in the blur correction device, it is preferable that the third driving portion be rotatable in the axial rotation direction of the third fulcrum axis.

Thereby, a sliding load of the third driving portion to the driven portion is reduced.

In order to solve the above problems, there is provided an imaging apparatus including: an image blur correction device that has a lens unit having at least one lens and an outer casing, in which the lens unit is disposed, and corrects image blur by rotating the lens unit at least in a first direction, which is an axial rotation direction of a first fulcrum axis orthogonal to an optical axis of the lens, and a second direction which is an axial rotation direction of a second fulcrum axis orthogonal to the first fulcrum axis, in which the image blur correction device includes a fixing member that rotatably supports the lens unit in the first and second directions, a first actuator that has a first driving portion movable in a predetermined direction so as to rotate the lens unit in the first direction, and a second actuator that has a second driving portion movable in a predetermined direction so as to rotate the lens unit in the second direction, in which a first movement allowance section is formed that moves the first driving portion relative to the lens unit when the lens unit is rotated in the second direction by movement of the second driving portion, and in which a second movement allowance section is formed that moves the second driving portion relative to the lens unit when the lens unit is rotated in the first direction by movement of the first driving portion.

Thereby, in the image blur correction device, when the lens unit is rotated by one driving unit, the other driving portion is moved relative to the lens unit.

In the image blur correction device and the imaging apparatus according to the embodiments of the present technology, when the lens unit is rotated by one driving unit, the other driving portion is moved relative to the lens unit. Hence, it is possible to simplify the structure and achieve reduction in the size of the device.

DETAILED DESCRIPTION OF EMBODIMENTS

Hereinafter, embodiments of the image blur correction device and imaging apparatus of the present technology will be described with reference to the accompanying drawings.

In the embodiments to be described later, an imaging apparatus of the present technology is applied to a video camera, and an image blur correction device of the present technology is applied to an image blur correction device which is provided in the video camera.

In addition, the applicable scopes of the imaging apparatus and the image blur correction device of the present technology are not limited to the video camera, and the image blur correction device which is provided in the video camera. The imaging apparatus and the image blur correction device of the present technology can be widely applied to, for example, a still camera, a personal computer, an imaging apparatus which is provided in each of various devices such as a mobile phone and a mobile terminal, or an image blur correction device which is provided in such an imaging apparatus.

In the following description, front-back, vertical, and horizontal directions are indicated in terms of a direction viewed from a photographer at the time of photography using a video camera. Accordingly, the subject side is a front side, and the photographer side is a back side.

It should be noted that the front-back, vertical, and horizontal directions to be described later are directions for convenience of description, and the present technology does not have to be limited to such directions.

Further, the lens to be described later is defined to include both of a lens system formed of a single lens and a lens system formed of a plurality of lenses as a lens group.

Overall Configuration of Imaging Apparatus

Figure 1:
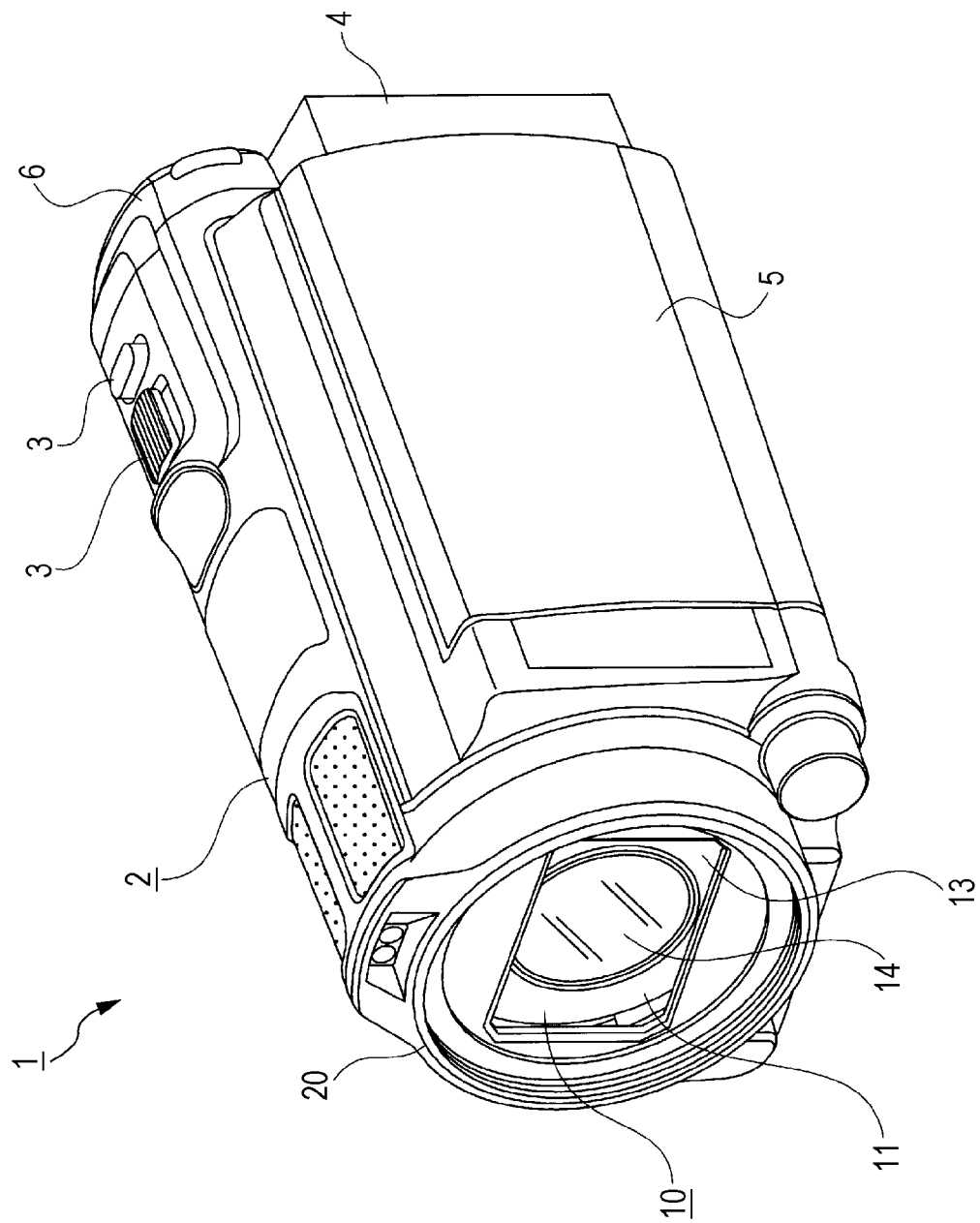
FIG. 1 is a perspective view of an imaging apparatus.
Figure 2:
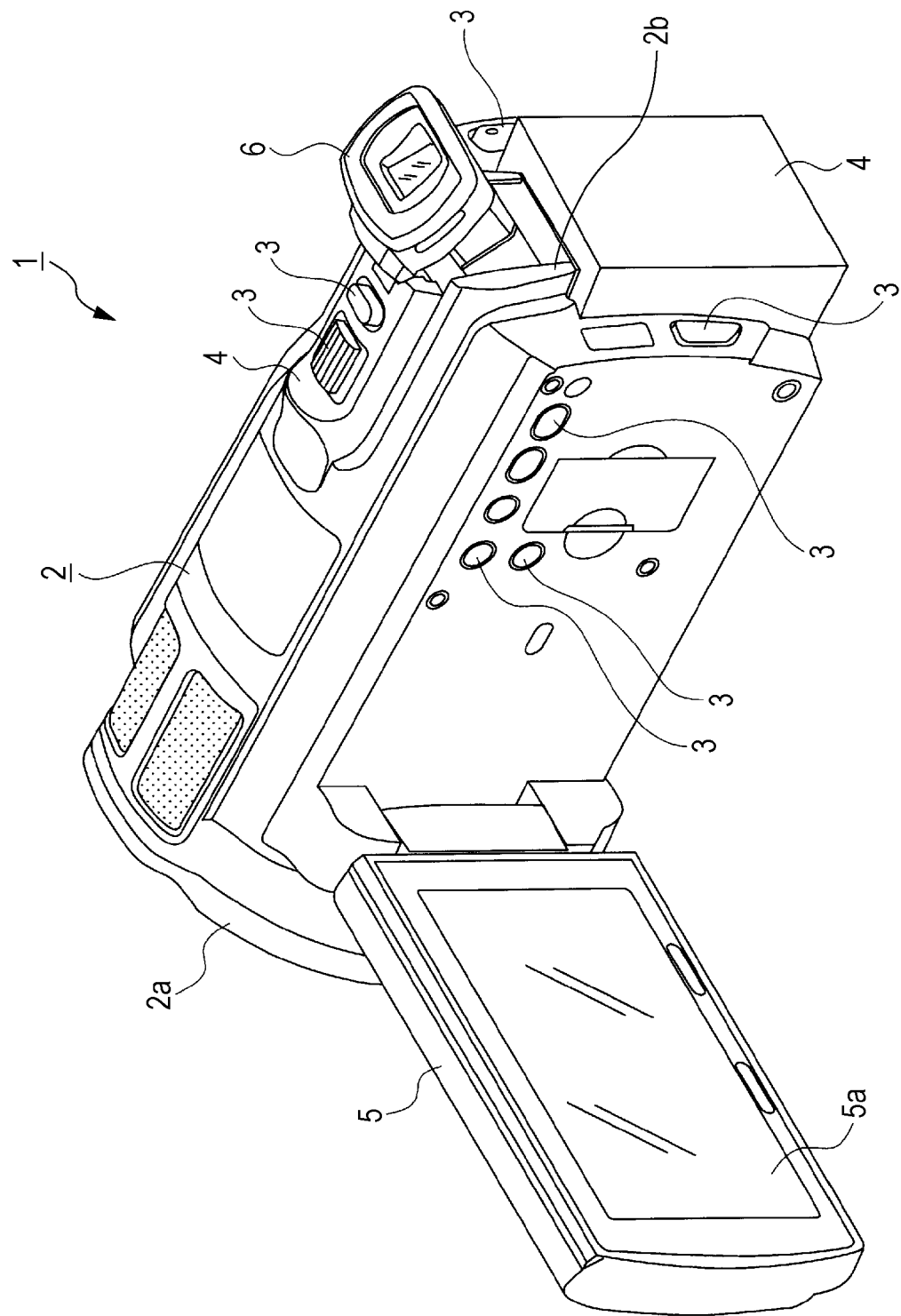
FIG. 2 is a perspective view illustrating the imaging apparatus in a condition where the display section is open.

An imaging apparatus (video camera) 1 is formed such that the necessary respective sections are disposed inside and outside an outer casing 2 (refer to FIGS. 1 and 2). The outer casing 2 is formed, for example, in a casing shape which is long in the front-back direction, the front end portion thereof is provided as a front panel section 2a, and an upper end portion at the back end portion is provided as a storage casing section 2b which is open toward the back side thereof.

At the back end portion on the upper surface of the outer casing 2, for example, operation sections 3 and 3, which function as a zoom lever and a photography button, are disposed. Various operation sections 3, 3, . . . such as a power button and an image reproduction button are disposed on one side surface of the outer casing 2. Operation sections 3, 3, . . . such as a mode switch button and a recording button are disposed on the rear surface of the outer casing 2.

A battery 4 is mounted on the rear surface of the outer casing 2, and thus a part of the battery 4 protrudes backward from the rear surface of the outer casing 2.

A display section 5 is swingably and rotatably connected to the side surface portion of the outer casing 2. The display section 5 has a display surface 5a, where the front end portion thereof is connected to the outer casing 2.

A finder 6 is connected to the back end portion of the outer casing 2, and the finder 6 is slidable in the front-back direction and is rotatable in the tilt direction relative to the storage casing section 2b.

An image blur correction device 10 (10A, 10B, 10C, or 10D) for performing blur correction is disposed inside the outer casing 2.

Configuration (First Embodiment) of Image Blur Correction Device

Hereinafter, a configuration of an image blur correction device 10 according to a first embodiment will be described (refer to FIGS. 3 to 5).

The image blur correction device 10 has a lens unit 11 and a fixing member 12 that supports the lens unit 11.

The lens unit 11 has, for example, a substantially cylindrical shape that extends in the optical axis direction. The lens unit 11 has a barrel portion 13 and a lens group or a plurality of lenses arranged in the barrel portion 13 in the optical axis direction. A photography lens 14, which is referred to as a front lens, is disposed on the frontmost side (object side) of the lenses or the lens group.

A sliding portion 15 is provided on an outer peripheral surface of an intermediate part of the lens unit 11 in the optical axis direction. The sliding portion 15 has a spherical shape of which a diameter is set to be larger than the diameters of the other outer peripheral surfaces. The sliding portion 15 is formed in a spherical shape centered on a reference point M which is one point inside the lens unit 11. The reference point M is, for example, positioned on the optical axis P, and set as the rotation fulcrum of the lens unit 11.

The lens unit 11 is provided with four driven portions 16, 16, . . . which protrude backward from the rear surface 13a of the barrel portion 13. The driven portions 16, 16, . . . are formed in a prismatic shape, and are positioned at the same distance from the optical axis P on the periphery based on the optical axis P. The driven portions 16, 16, . . . are arranged in a matrix so as to be separated in the vertical and horizontal directions.

The upper and lower surfaces of the driven portions 16, 16, . . . facing each other in the vertical direction are formed as first surfaces 16a, 16a, . . . to be operated, and the left and right surfaces thereof facing each other in the horizontal direction are formed as second surfaces 16b, 16b, . . . to be operated.

The spaces between the driven portions 16, 16, . . . are formed in a cross shape. The space extending in the horizontal direction is formed as a first movement allowance section 17, and the space extending in the vertical direction is formed as a second movement allowance section 18.

Spherical objects 19, 19, . . . are rotatably disposed on the sliding portion 15 to be separated in the front-back direction. For example, groups of two spherical objects 19 and 19, which are disposed to be separated in the front-back direction, are provided to be separated in the circumferential direction.

The fixing member 12 has a supporting portion 20 that has a substantially cylindrical shape, and an actuator attaching portion 21 that is provided on the back side of the supporting portion 20.

An annular portion 22, which has a substantially annular shape, is provided at the front end portion of the supporting portion 20, and an inner peripheral surface of the annular portion 22 is formed as a supporting surface 22a that has a spherical shape centered on the reference point M.

The actuator attaching portion 21 has a first holding portion 21a that is provided at the lower back end portion and a second holding portion 21b that is provided at the right back end portion.

In the lens unit 11, the sliding portion 15 is rotatably supported on the annular portion 22 of the fixing member 12 with the spherical objects 19, 19, . . . interposed therebetween. In the state where the lens unit 11 is supported on the fixing member 12, the supporting surface 22a of the annular portion 22 is in contact with the spherical objects 19, 19, . . . , and the lens unit 11 is rotated with the spherical objects 19, 19, . . . interposed.

In addition, a dropout prevention portion, which is not shown in the drawing, is provided on the lens unit 11 or the fixing member 12. The dropout prevention portion prevents the spherical objects 19, 19, . . . , which are interposed between the supporting surface 22a and the sliding portion 15, from dropping out.

Further, the spherical objects 19, 19, . . . do not have to be disposed between the annular portion 22 and the sliding portion 15, and the annular portion 22 may be supported by the sliding portion 15 with the spherical objects 19, 19, . . . interposed therebetween.

The first holding portion 21a of the actuator attaching portion 21 in the fixing member 12 holds a first actuator 23. The first actuator 23 has a first driving shaft 23a that is movable in the vertical direction, and a first connection portion 24 is connected to the first driving shaft 23a. The first connection portion 24 is formed in a frame shape which is open in the front-back direction, and the central portion of the lower end portion thereof in the horizontal direction is connected to the upper end portion of the first driving shaft 23a.

A first driving portion 25, which has a cylindrical shape extending in the horizontal direction, is supported on the upper end portion of the first connection portion 24 so as to be rotatable in the axial rotation direction.

The first driving portion 25 of the first actuator 23 is inserted into the first movement allowance section 17, and the first driving portion 25 is rotatable relative to the driven portions 16, 16, . . . in the first movement allowance section 17.

In the first actuator 23, when the first driving shaft 23a is moved in the vertical direction, the first connection portion 24 and the first driving portion 25 are integrally moved in the vertical direction in accordance with the movement of the first driving shaft 23a.

The second holding portion 21b of the actuator attaching portion 21 in the fixing member 12 holds a second actuator 26. The second actuator 26 has a second driving shaft 26a that is movable in the horizontal direction, and a second connection portion 27 is connected to the second driving shaft 26a. The second connection portion 27 is formed in a frame shape which is open in the front-back direction, and the central portion of the right end portion thereof in the vertical direction is connected to the left end portion of the second driving shaft 26a.

The second driving portion 28, which has a cylindrical shape extending in the vertical direction, is supported on the left end portion of the second connection portion 27 so as to be rotatable in the axial rotation direction.

The second driving portion 28 of the second actuator 26 is inserted into the second movement allowance section 18, and the second driving portion 28 is rotatable relative to the driven portions 16, 16, . . . in the second movement allowance section 18. For example, the second driving portion 28 is positioned on the back side of the first driving portion 25, and is inserted into the second movement allowance section 18 in a state where the second driving portion 28 intersects with the first driving portion 25.

In the second actuator 26, when the second driving shaft 26a is moved in the horizontal direction, the second connection portion 27 and the second driving portion 28 are integrally moved in the horizontal direction in accordance with the movement of the second driving shaft 26a.

The lens unit 11 is configured to be rotatable in a first direction (pitching direction) about the first fulcrum axis S1 as a fulcrum, relative to the fixing member 12. The first fulcrum axis S1 is orthogonal to the optical axis P, passes through the reference point M, and extends in the horizontal direction. The lens unit 11 is configured to be rotatable in a second direction (yawing direction) about the second fulcrum axis S2 as a fulcrum. The second fulcrum axis S2 is orthogonal to both of the optical axis P and the first fulcrum axis S1, passes through the reference point M, and extends in the vertical direction.

Operation (First Embodiment) of Image Blur Correction Device

Hereinafter, a blur correction operation in the image blur correction device 10 will be described (refer to FIGS. 3 to 13).

Figure 3:
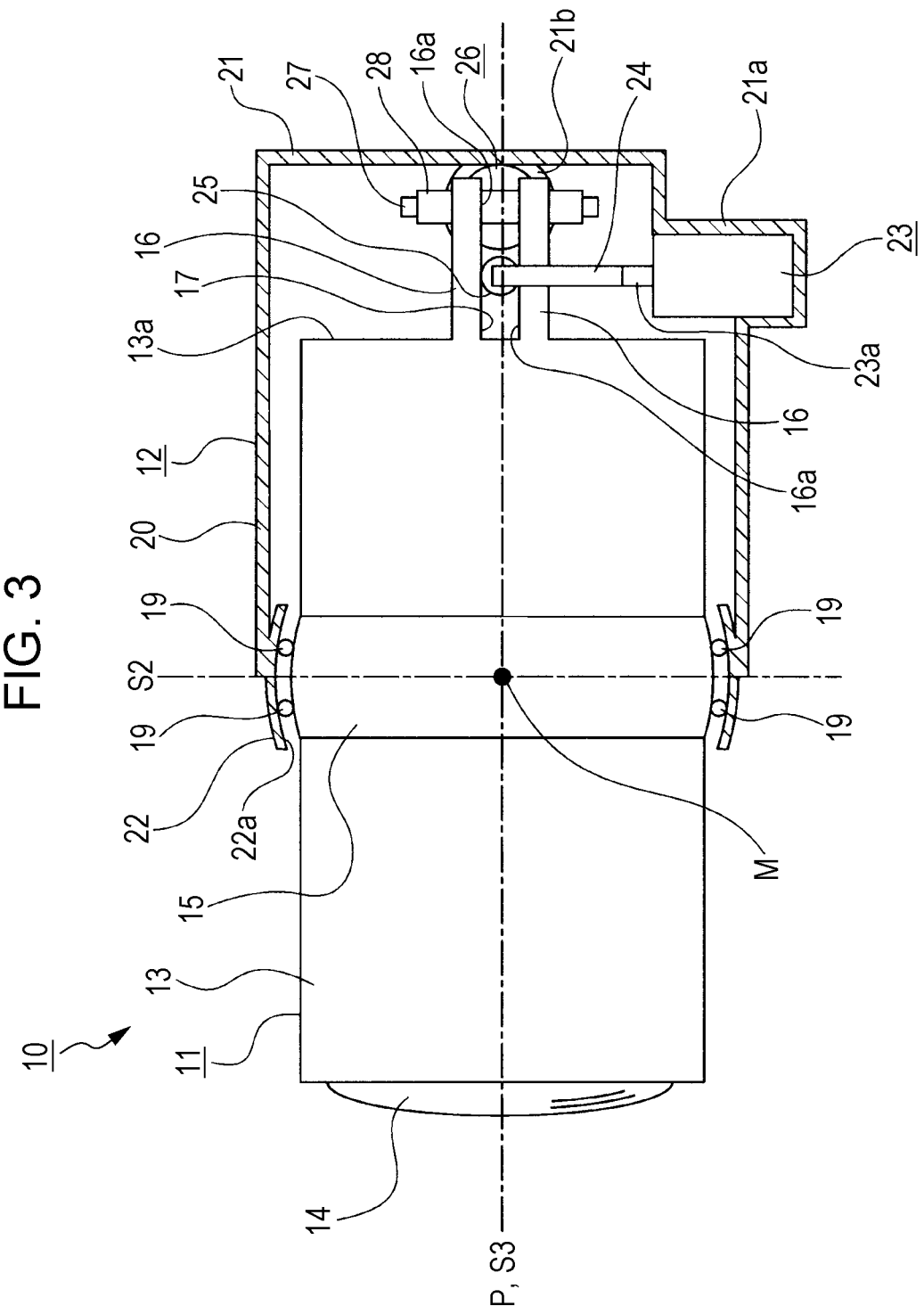
FIG. 3 is a schematic side view illustrating an image blur correction device according to a first embodiment together with FIGS. 4 to 13.
Figure 4:
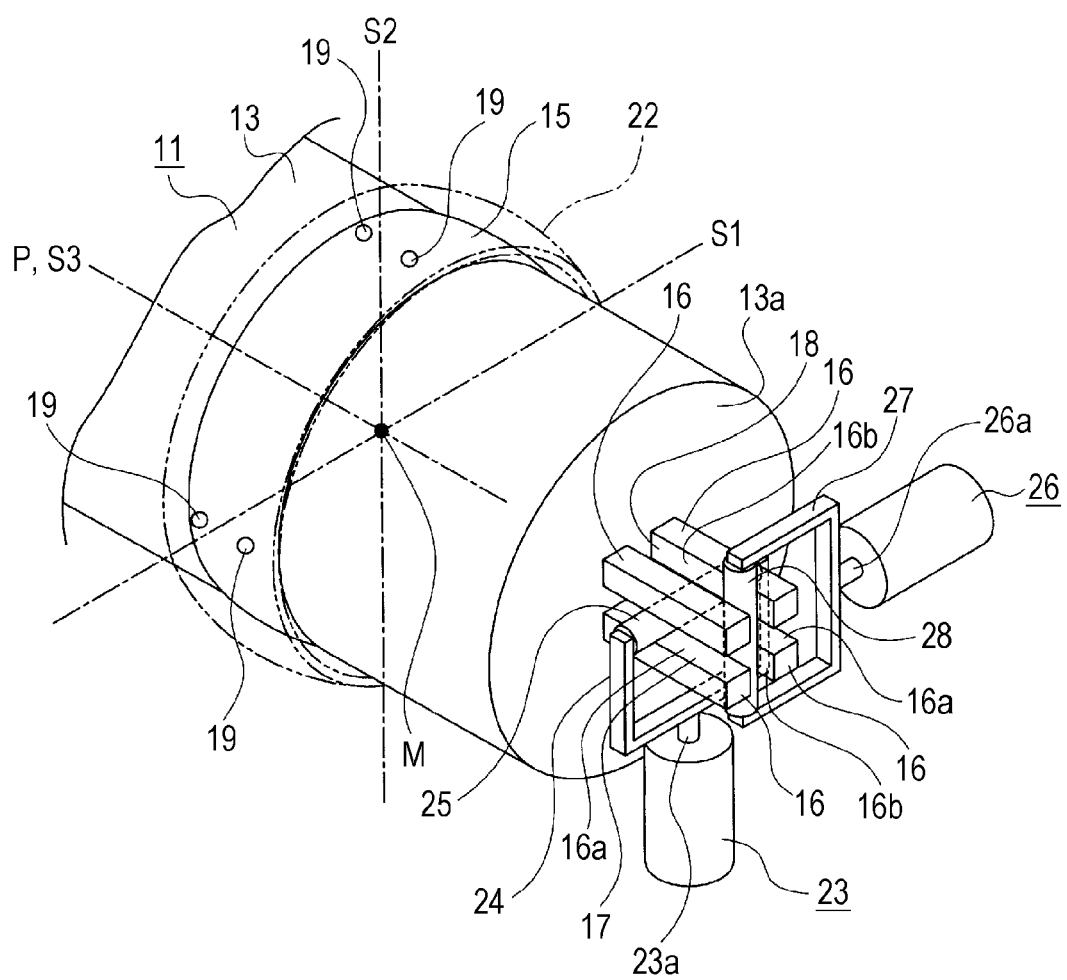
FIG. 4 is a schematic perspective view of the image blur correction device.
Figure 5:
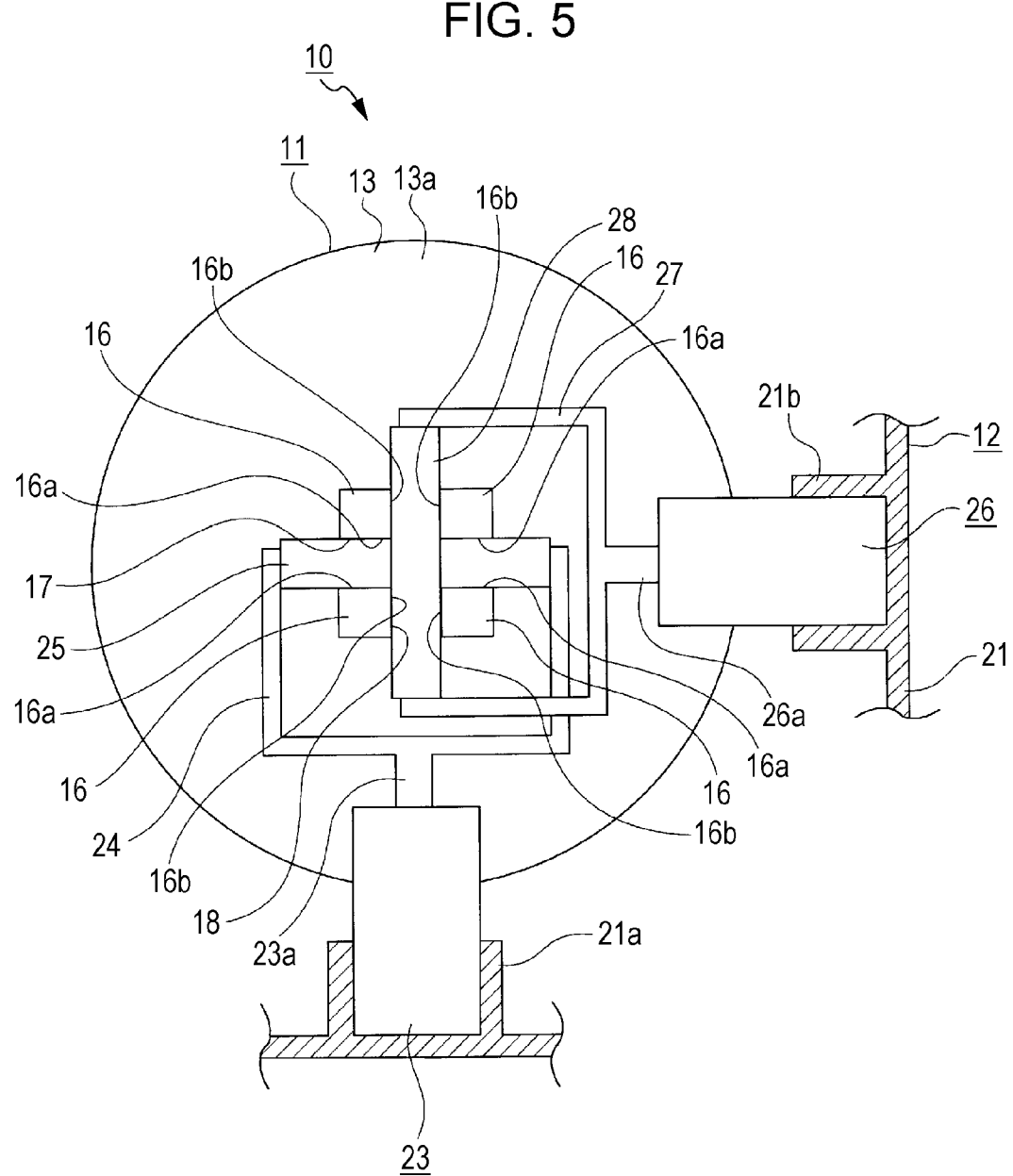
FIG. 5 is a schematic rear view of the image blur correction device.
Figure 6:
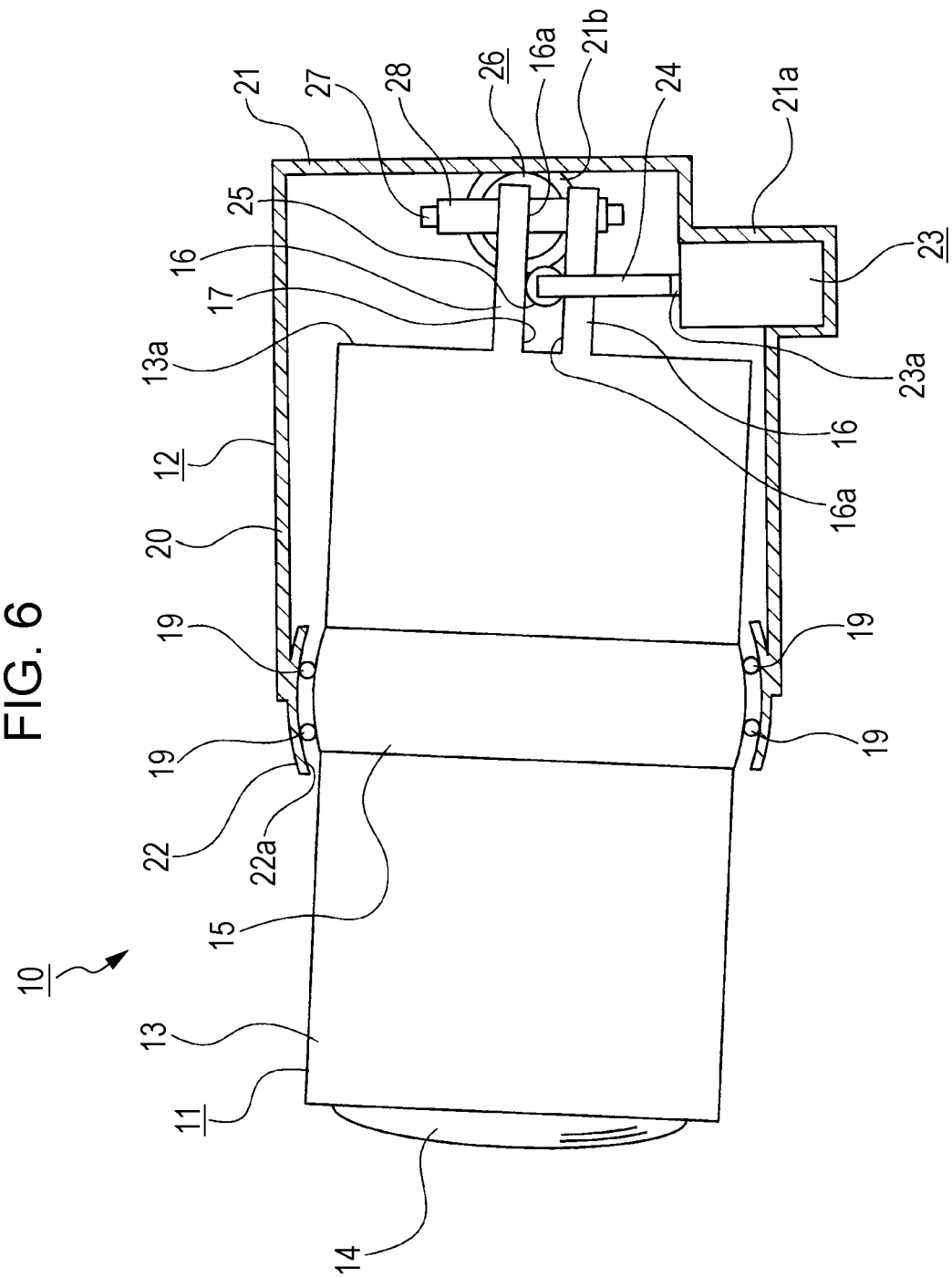
FIG. 6 is a schematic side view illustrating an operation of the image blur correction device in a condition where the lens unit is rotated toward one side in the first direction together with FIGS. 7 to 13.
Figure 7:
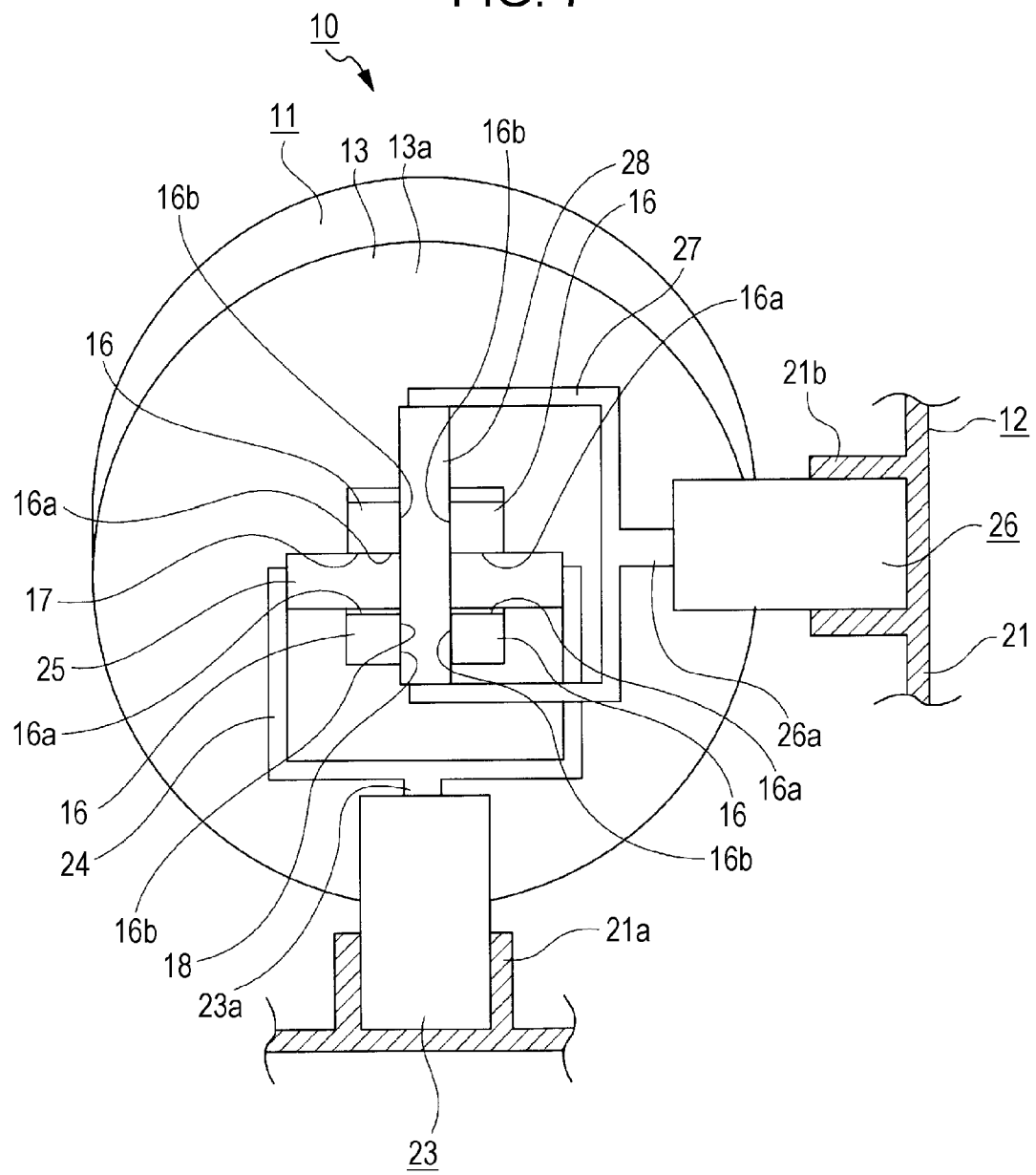
FIG. 7 is a schematic rear view illustrating a condition where the lens unit is rotated toward one side in the first direction.
Figure 8:
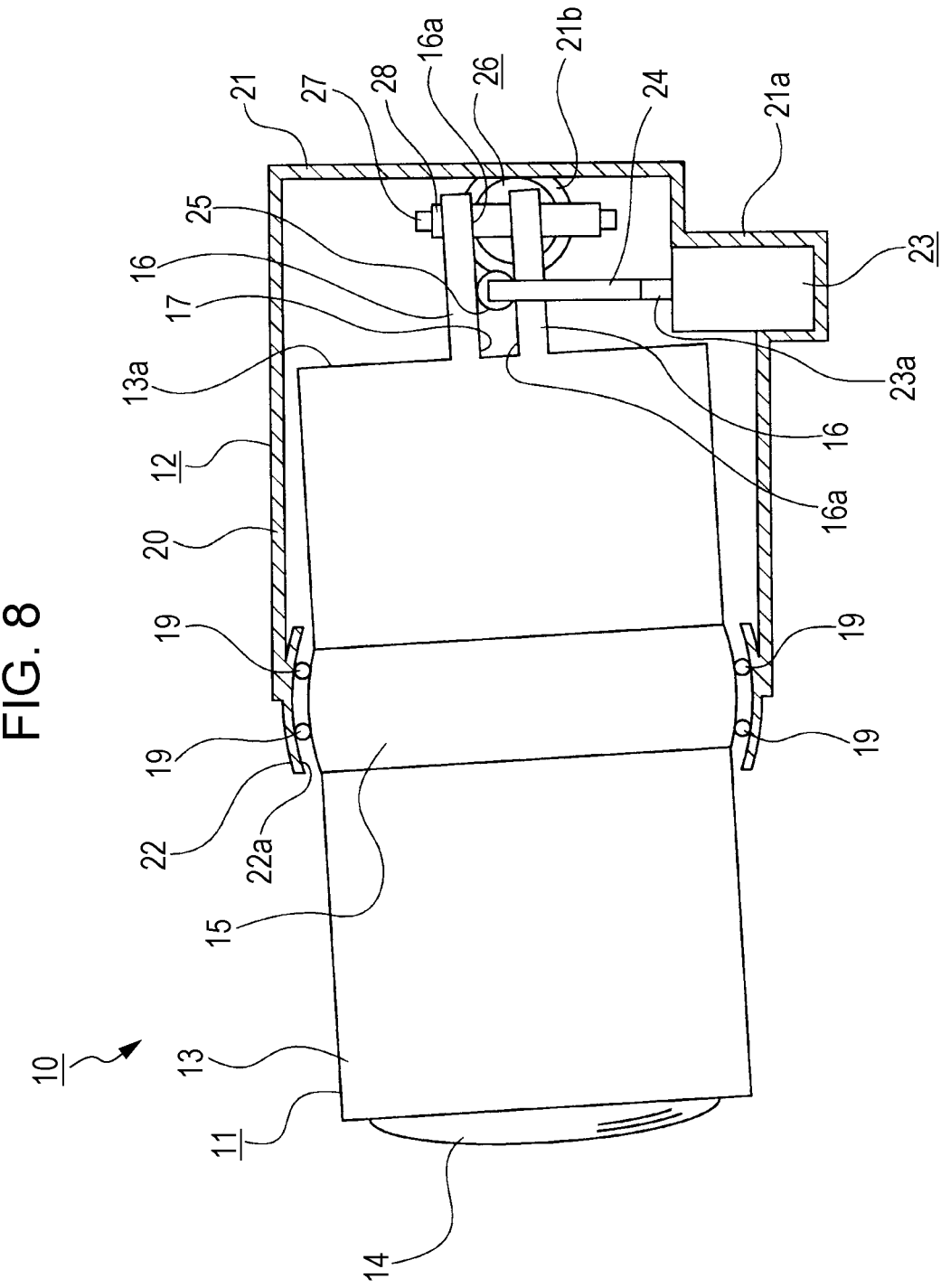
FIG. 8 is a schematic side view illustrating a condition where the lens unit is rotated toward the other side in the first direction.
Figure 9:
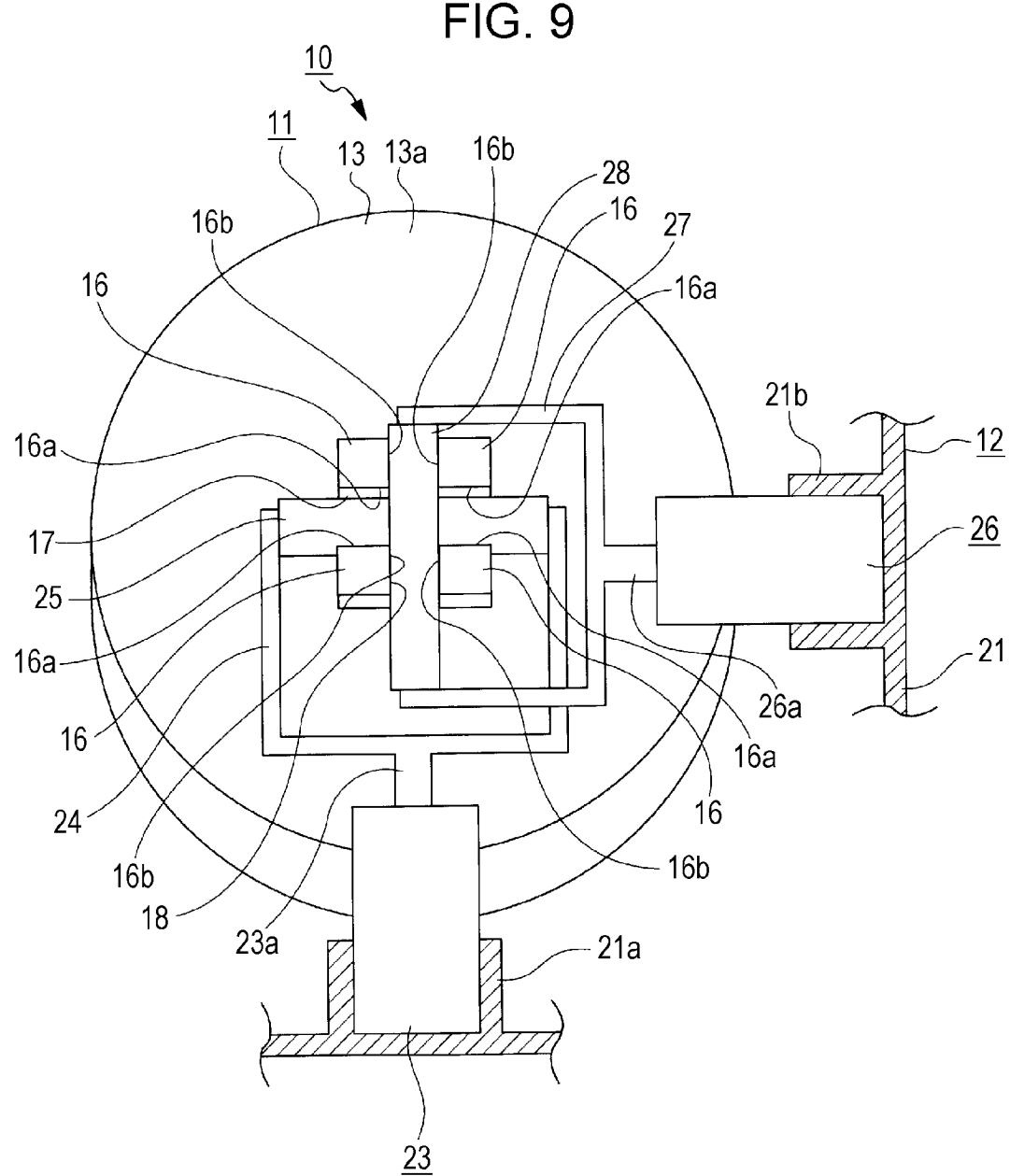
FIG. 9 is a schematic rear view illustrating a condition where the lens unit is rotated toward the other side in the first direction.
Figure 10:
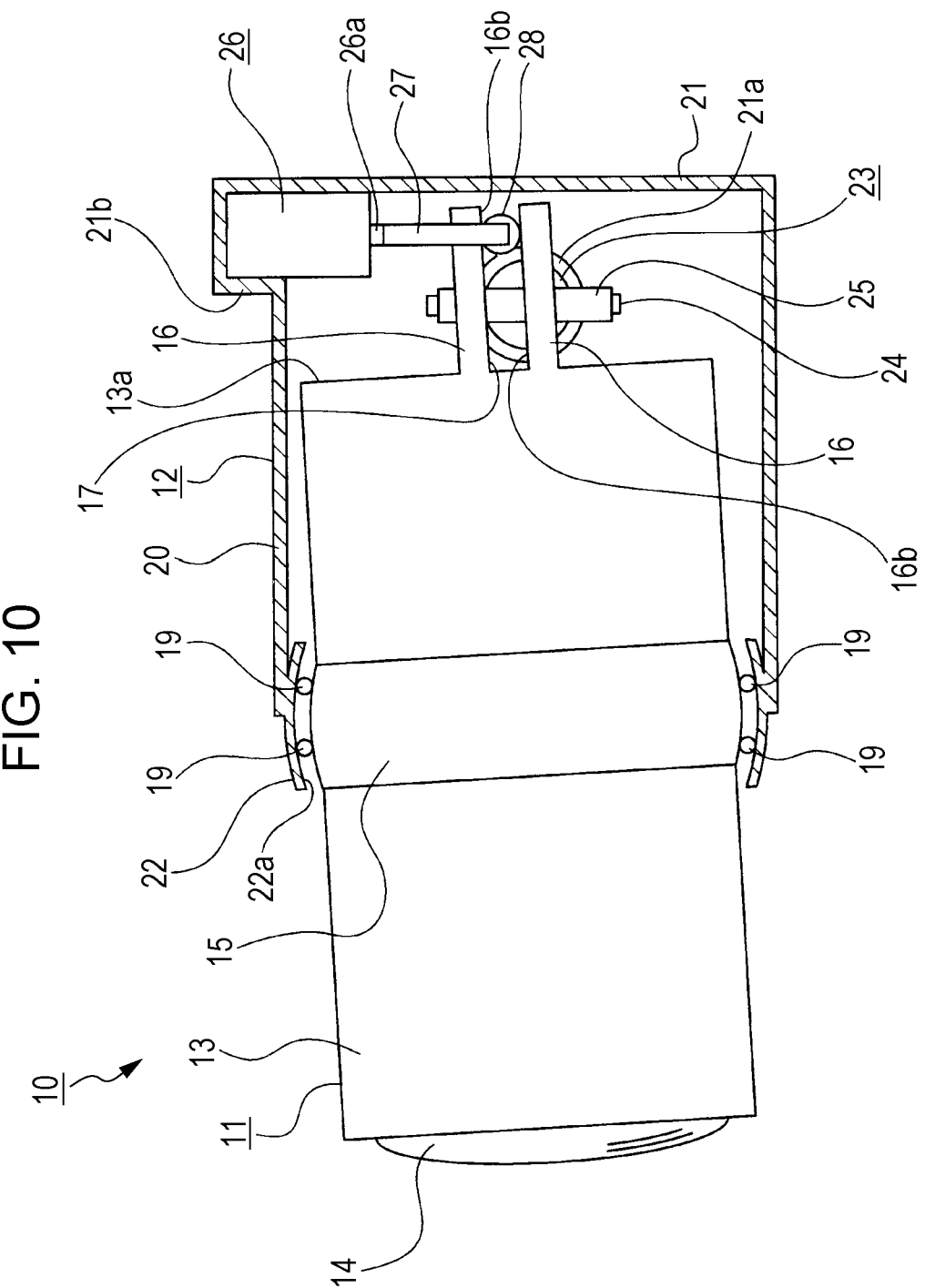
FIG. 10 is a schematic top plan view illustrating a condition where the lens unit is rotated toward one side in the second direction.
Figure 11:
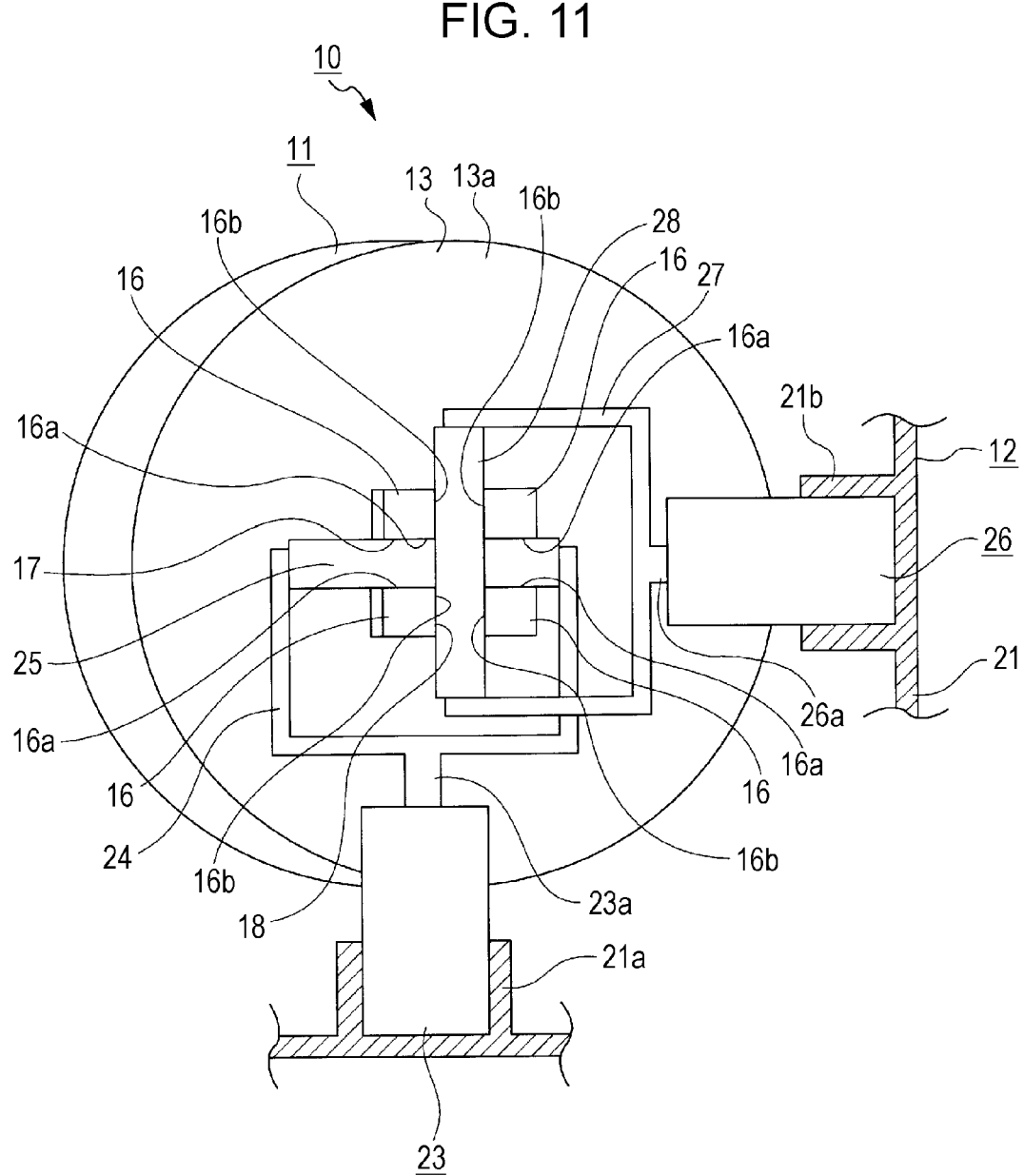
FIG. 11 is a schematic rear view illustrating a condition where the lens unit is rotated toward one side in the second direction.
Figure 12:
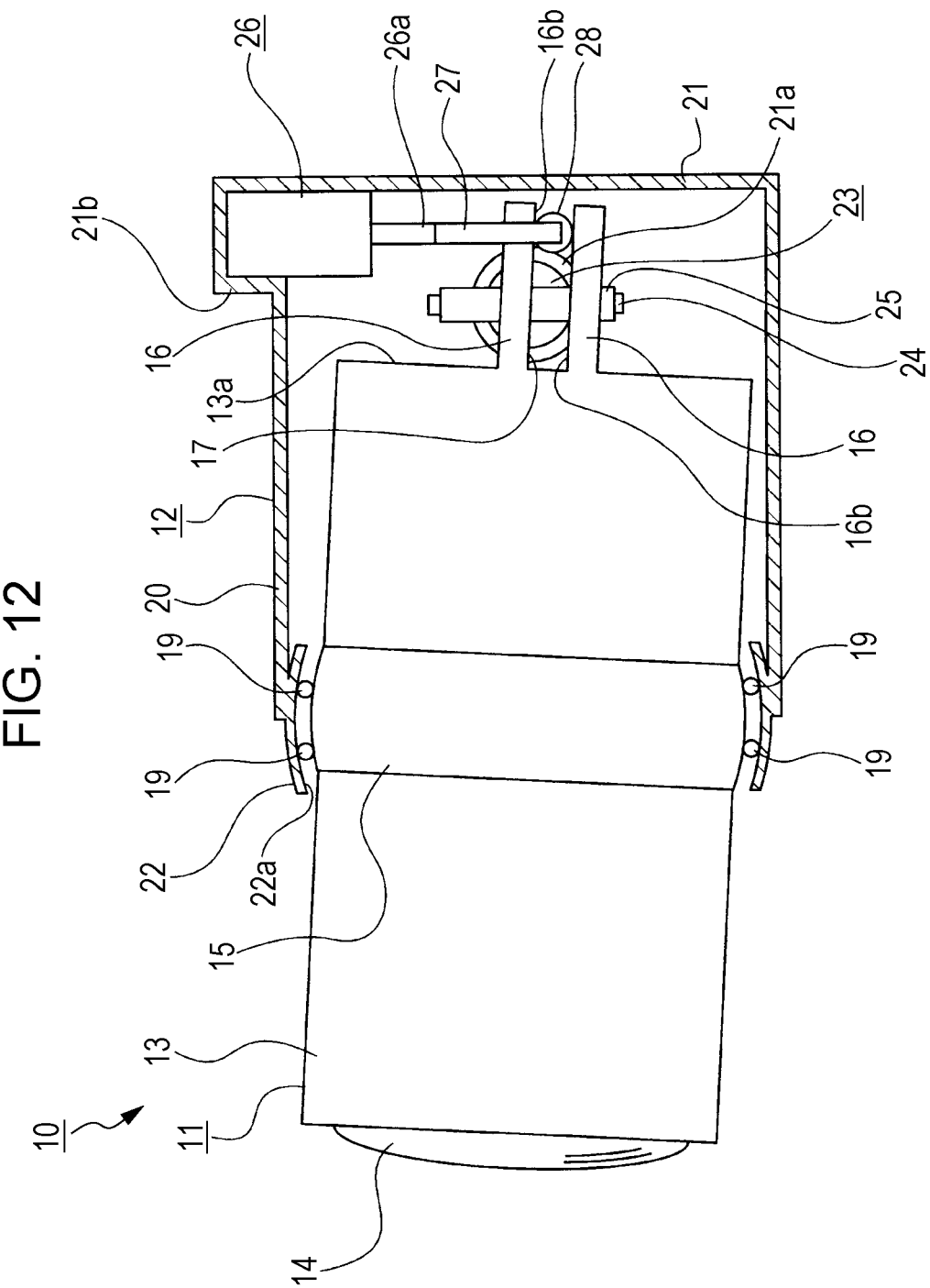
FIG. 12 is a schematic top plan view illustrating a condition where the lens unit is rotated toward the other side in the second direction.
Figure 13:
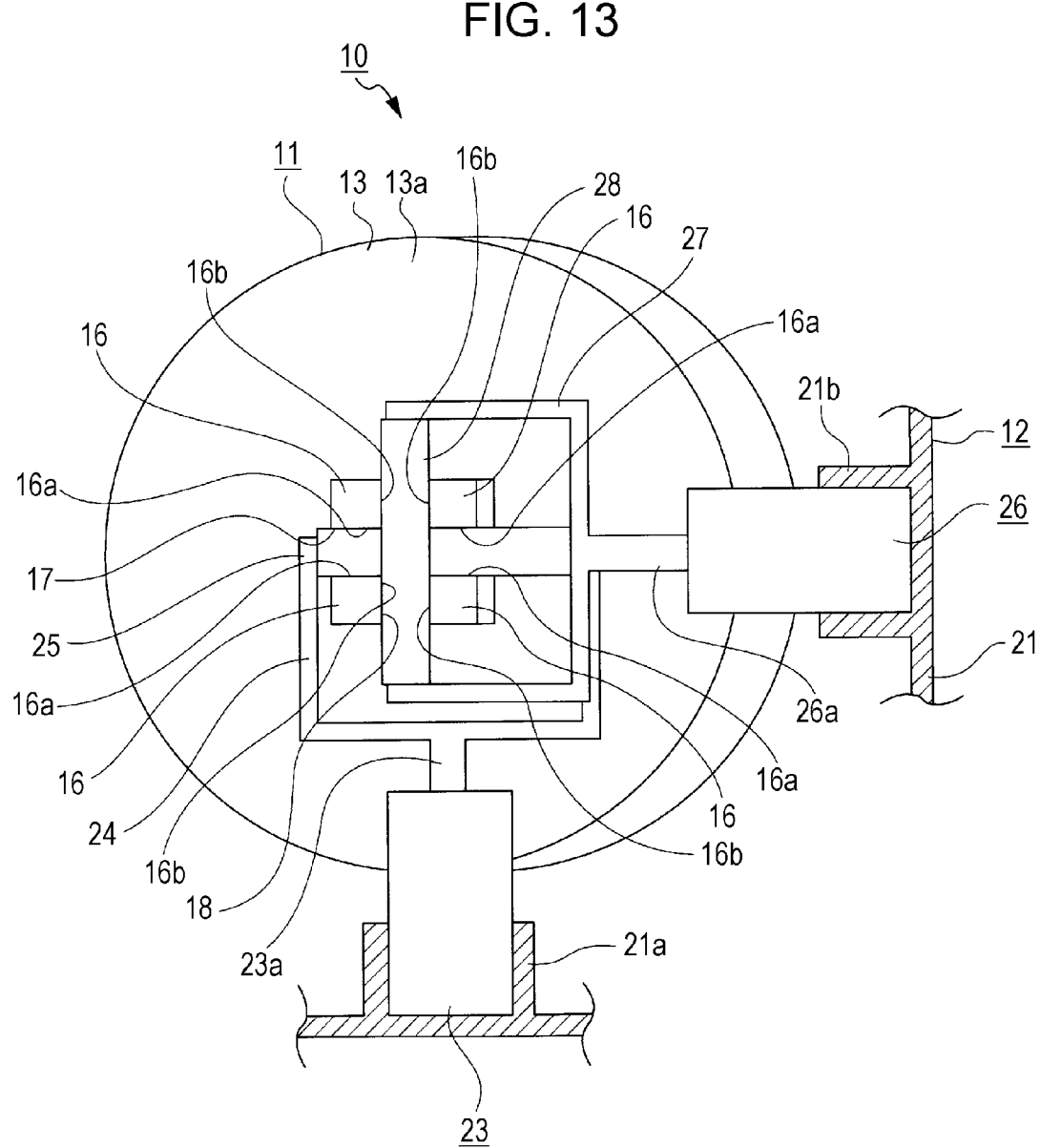
FIG. 13 is a schematic rear view illustrating a condition where the lens unit is rotated toward the other side in the second direction.
Figure 14:
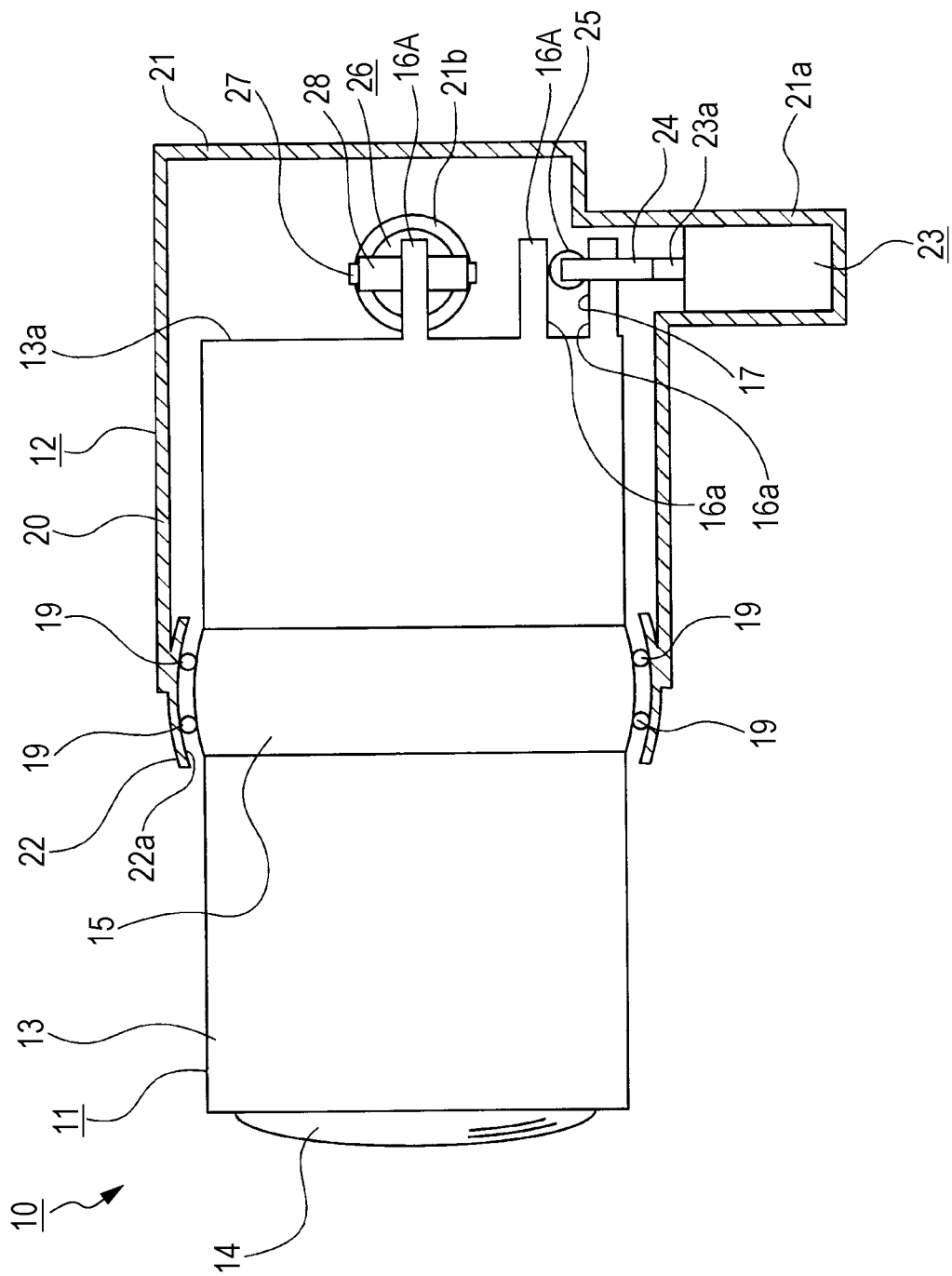
FIG. 14 is a schematic side view illustrating a first modified example together with FIG. 15.
Figure 15:
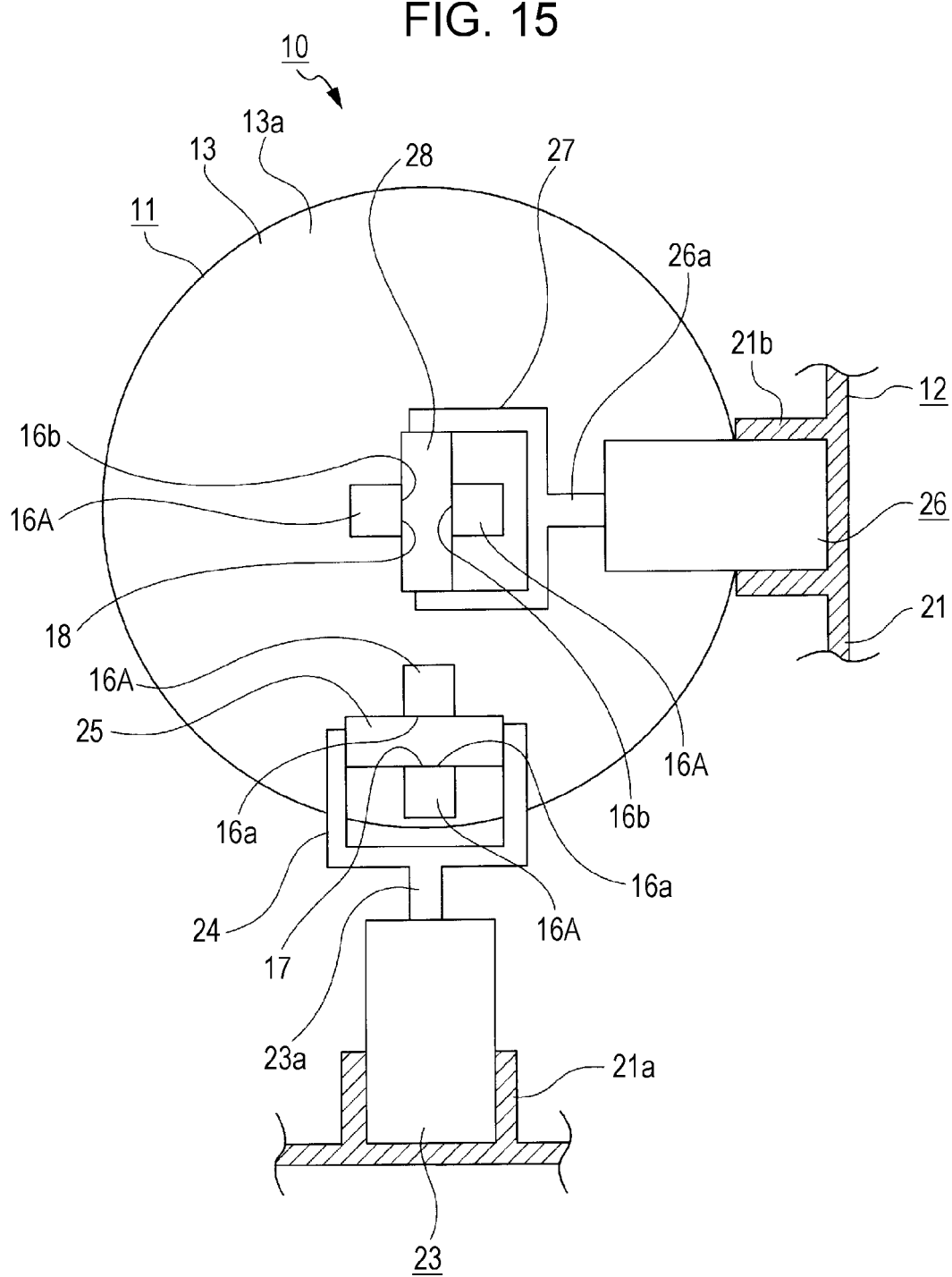
FIG. 15 is a schematic rear view.

In a state where the blur correction operation is not performed, the image blur correction device 10 is at a reference position at which the device is not rotated in any one direction of the first direction and the second direction (refer to FIGS. 3 and 5).

First, a blur correction operation in the first direction (pitching direction) in the image blur correction device 10 will be described (refer to FIGS. 6 to 9).

In the image blur correction device 10, when the first driving shaft 23a of the first actuator 23 is moved downward and the first driving portion 25 is moved downward, the first surfaces 16a and 16a to be operated, which face toward the upper side of the driven portions 16 and 16, are pressed by the first driving portion 25, and the first driving portion 25 slides on the first surfaces 16a, 16a, . . . to be operated while rotating. As a result, the lens unit 11 is rotated about the first fulcrum axis S1 as a fulcrum in the first direction in which the photography lens 14 faces slightly upward (refer to FIGS. 6 and 7).

At this time, the second driving portion 28 of the second actuator 26 is moved upward relative to the driven portions 16, 16, . . . in the second movement allowance section 18, in accordance with the rotation of the lens unit 11 in the first direction.

When the lens unit 11 is rotated in the first direction in such a manner, in accordance with the rotation of the lens unit 11, the second driving portion 28 is moved upward relative to the driven portions 16, 16, . . . in the second movement allowance section 18. Hence, it is difficult for unnecessary load to be applied to the lens unit 11 from the second driving portion 28. Accordingly, the lens unit 11 is smoothly rotated in the first direction.

Further, when the first driving portion 25 is moved downward and the lens unit 11 is rotated in the first direction, the first driving portion 25 is rotated relative to the driven portions 16, 16, . . . . Hence, a sliding load of the first driving portion 25 to the driven portions 16, 16, . . . is reduced, and it is possible to secure a smooth rotation operation of the lens unit 11 in the first direction.

On the other hand, in the image blur correction device 10, when the first driving shaft 23a of the first actuator 23 is moved upward and the first driving portion 25 is moved upward, the first surfaces 16a and 16a to be operated, which face toward the lower side of the driven portions 16 and 16, are pressed by the first driving portion 25, and the first driving portion 25 slides on the first surfaces 16a, 16a, . . . to be operated while rotating. As a result, the lens unit 11 is rotated about the first fulcrum axis S1 as a fulcrum in the first direction in which the photography lens 14 faces slightly downward (refer to FIGS. 8 and 9).

At this time, the second driving portion 28 of the second actuator 26 is moved downward relative to the driven portions 16, 16, . . . in the second movement allowance section 18, in accordance with the rotation of the lens unit 11 in the first direction.

When the lens unit 11 is rotated in the first direction in such a manner, in accordance with the rotation of the lens unit 11, the second driving portion 28 is moved downward relative to the driven portions 16, 16, . . . in the second movement allowance section 18. Hence, it is difficult for unnecessary load to be applied to the lens unit 11 from the second driving portion 28. Accordingly, the lens unit 11 is smoothly rotated in the first direction.

Further, when the first driving portion 25 is moved upward and the lens unit 11 is rotated in the first direction, the first driving portion 25 is rotated relative to the driven portions 16, 16, . . . . Hence, a sliding load of the first driving portion 25 to the driven portions 16, 16, . . . is reduced, and it is possible to secure a smooth rotation operation of the lens unit 11 in the first direction.

Next, a blur correction operation in the second direction (yawing direction) in the image blur correction device 10 will be described (refer to FIGS. 10 to 13).

In the image blur correction device 10, when the second driving shaft 26a of the second actuator 26 is moved rightward and the second driving portion 28 is moved rightward, the second surfaces 16b and 16b to be operated, which face toward the left side of the driven portions 16 and 16, are pressed by the second driving portion 28, and the second driving portion 28 slides on the second surfaces 16b, 16b, . . . to be operated while rotating. As a result, the lens unit 11 is rotated about the second fulcrum axis S2 as a fulcrum in the second direction in which the photography lens 14 faces slightly leftward (refer to FIGS. 10 and 11).

At this time, the first driving portion 25 of the first actuator 23 is moved leftward relative to the driven portions 16, 16, . . . in the first movement allowance section 17, in accordance with the rotation of the lens unit 11 in the second direction.

When the lens unit 11 is rotated in the second direction in such a manner, in accordance with the rotation of the lens unit 11, the first driving portion 25 is moved leftward relative to the driven portions 16, 16, . . . in the first movement allowance section 17. Hence, it is difficult for unnecessary load to be applied to the lens unit 11 from the first driving portion 25. Accordingly, the lens unit 11 is smoothly rotated in the second direction.

Further, when the second driving portion 28 is moved rightward and the lens unit 11 is rotated in the second direction, the second driving portion 28 is rotated relative to the driven portions 16, 16, . . . . Hence, a sliding load of the second driving portion 28 to the driven portions 16, 16, . . . is reduced, and it is possible to secure a smooth rotation operation of the lens unit 11 in the second direction.

On the other hand, in the image blur correction device 10, when the second driving shaft 26a of the second actuator 26 is moved leftward and the second driving portion 28 is moved leftward, the second surfaces 16b and 16b to be operated, which face toward the right side of the driven portions 16 and 16, are pressed by the second driving portion 28, and the second driving portion 28 slides on the second surfaces 16b, 16b, . . . to be operated while rotating. As a result, the lens unit 11 is rotated about the second fulcrum axis S2 as a fulcrum in the second direction in which the photography lens 14 faces slightly rightward (refer to FIGS. 12 and 13).

At this time, the first driving portion 25 of the first actuator 23 is moved rightward relative to the driven portions 16, 16, . . . in the first movement allowance section 17, in accordance with the rotation of the lens unit 11 in the second direction.

When the lens unit 11 is rotated in the second direction in such a manner, in accordance with the rotation of the lens unit 11, the first driving portion 25 is moved rightward relative to the driven portions 16, 16, . . . in the first movement allowance section 17. Hence, it is difficult for unnecessary load to be applied to the lens unit 11 from the first driving portion 25. Accordingly, the lens unit 11 is smoothly rotated in the second direction.

Further, when the second driving portion 28 is moved leftward and the lens unit 11 is rotated in the second direction, the second driving portion 28 is rotated relative to the driven portions 16, 16, . . . . Hence, a sliding load of the second driving portion 28 to the driven portions 16, 16, . . . is reduced, and it is possible to secure a smooth rotation operation of the lens unit 11 in the second direction.

In addition, in the image blur correction device 10, although not shown in the drawing, the lens unit 11 is configured to be rotatable in the second direction in a state where the lens unit 11 is rotated in the first direction from the reference position, and the lens unit 11 is configured to be rotatable in the first direction in a state where the lens unit 11 is rotated in the second direction from the reference position.

Modified Examples of Image Blur Correction Device (First Embodiment)

Next, modified examples (first and second modified examples) of the respective sections according to the first embodiment will be described (refer to FIGS. 14 to 19).

First Modified Example

The first modified example describes driven portions 16A, 16A, . . . as the modified example of driven portions 16, 16, . . . (refer to FIGS. 14 and 15).

The driven portions 16A, 16A, . . . are formed in shapes the same as the shapes of the driven portions 16, 16, . . . , and groups of two driven portions 16A and 16A are disposed to be separated in the vertical direction. The driven portions 16A and 16A disposed on the upper side are positioned to be separated in the horizontal direction from the central portion of a rear surface 13a of a barrel portion 13. The driven portions 16A and 16A disposed on the lower side are positioned to be separated in the vertical direction from the lower end portion of the rear surface 13a of the barrel portion 13.

The upper and lower surfaces of the driven portions 16A and 16A disposed on the lower side are formed as the first surfaces 16a and 16a to be operated. The upper and lower surfaces thereof face each other in the vertical direction. The space between the driven portions 16A and 16A disposed on the lower side is formed as the first movement allowance section 17.

The right and left surfaces of the driven portions 16A and 16A disposed on the upper side are formed as the second surfaces 16b and 16b to be operated. The right and left surfaces thereof face each other in the horizontal direction.

The space between the driven portions 16A and 16A disposed on the upper side is formed as the second movement allowance section 18.

The first driving portion 25 of the first actuator 23 is inserted into the first movement allowance section 17, and the first driving portion 25 is rotatable relative to the driven portions 16A and 16A in the first movement allowance section 17. In the first actuator 23, when the first driving shaft 23a is moved in the vertical direction, the first connection portion 24 and the first driving portion 25 are integrally moved in the vertical direction in accordance with the movement of the first driving shaft 23a.

The second driving portion 28 of the second actuator 26 is inserted into the second movement allowance section 18, and the second driving portion 28 is rotatable relative to the driven portions 16A, 16A . . . in the second movement allowance section 18. In the second actuator 26, when the second driving shaft 26a is moved in the horizontal direction, the second connection portion 27 and the second driving portion 28 are integrally moved in the horizontal direction in accordance with the movement of the second driving shaft 26a.

When the first driving portion 25 is moved in the vertical direction, the lens unit 11 is rotated about the first fulcrum axis S1 as a fulcrum in the first direction. At this time, the second driving portion 28 of the second actuator 26 is moved in the vertical direction relative to the driven portions 16A and 16A in the second movement allowance section 18, in accordance with the rotation of the lens unit 11 in the first direction.

When the lens unit 11 is rotated in the first direction in such a manner, in accordance with the rotation of the lens unit 11, the second driving portion 28 is moved in the vertical direction relative to the driven portions 16A and 16A in the second movement allowance section 18. Hence, it is difficult for unnecessary load to be applied to the lens unit 11 from the second driving portion 28. Accordingly, the lens unit 11 is smoothly rotated in the first direction.

On the other hand, when the second driving portion 28 is moved in the horizontal direction, the lens unit 11 is rotated about the second fulcrum axis S2 as a fulcrum in the second direction. At this time, the first driving portion 25 of the first actuator 23 is moved in the horizontal direction relative to the driven portions 16A and 16A in the first movement allowance section 17, in accordance with the rotation of the lens unit 11 in the second direction.

When the lens unit 11 is rotated in the second direction in such a manner, in accordance with the rotation of the lens unit 11, the first driving portion 25 is moved in the horizontal direction relative to the driven portions 16A and 16A in the first movement allowance section 17. Hence, it is difficult for unnecessary load to be applied to the lens unit 11 from the first driving portion 25. Accordingly, the lens unit 11 is smoothly rotated in the second direction.

In the case of using the driven portions 16A, 16A, . . . , the first driving portion 25 of the first actuator 23 and the second driving portion 28 of the second actuator 26 do not overlap in the optical axis direction. Hence, it is possible to achieve reduction in the size of the image blur correction device 10 in the optical axis direction.

Second Modified Example

The second modified example describes a driven portion 16B, a first driving portion 25B, and a second driving portion 28B according to modified examples of the driven portion 16, the first driving portion 25, and the second driving portion 28 (refer to FIGS. 16 to 19).

Figure 16:
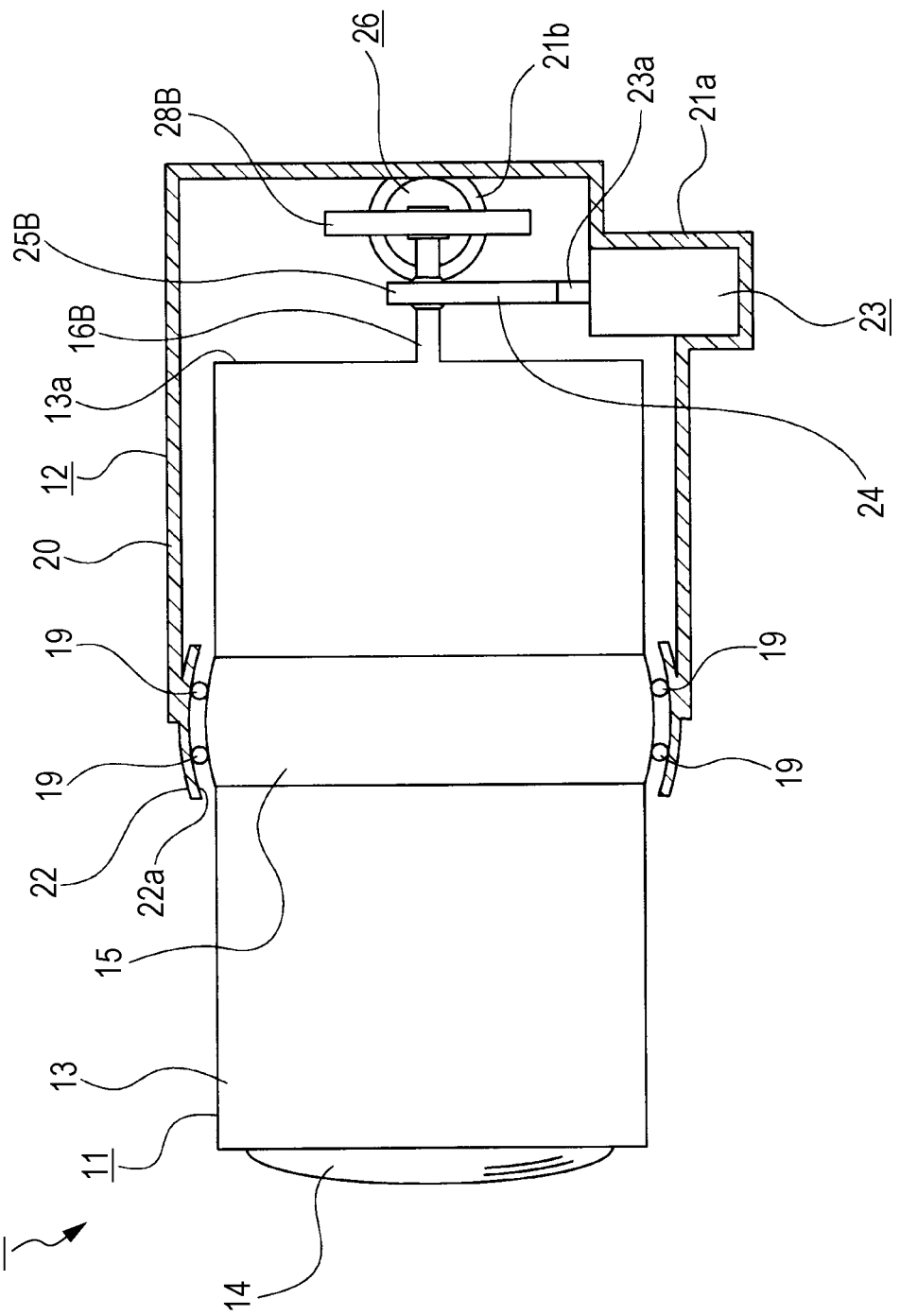
FIG. 16 is a schematic side view illustrating a second modified example together with FIGS. 17 to 19.
Figure 17:
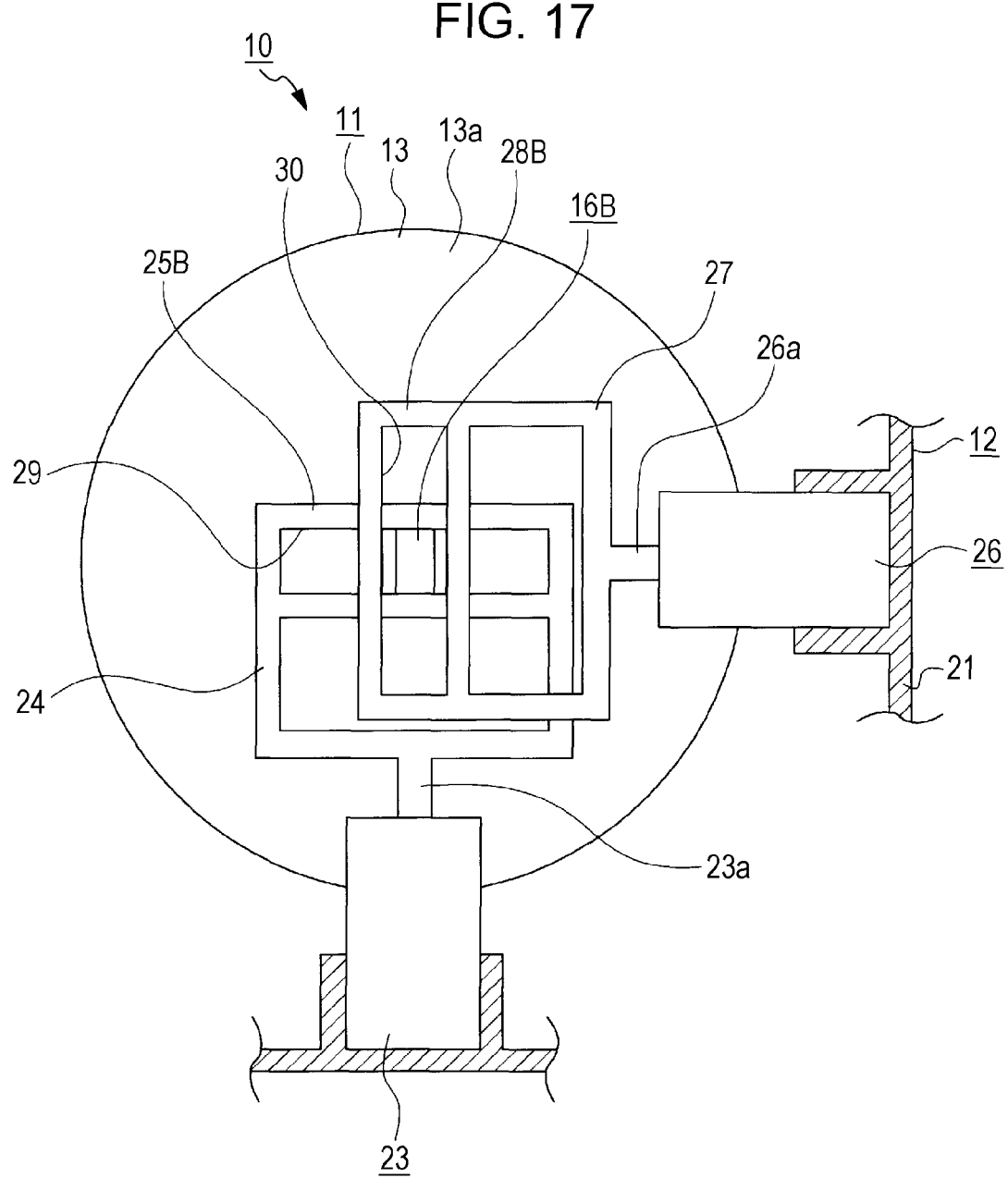
FIG. 17 is a schematic rear view.

The driven portion 16B is formed in, for example, a prismatic cylinder shape, and is positioned at the central portion on the rear surface 13a of the barrel portion 13 (refer to FIGS. 16 and 17).

Figure 18:
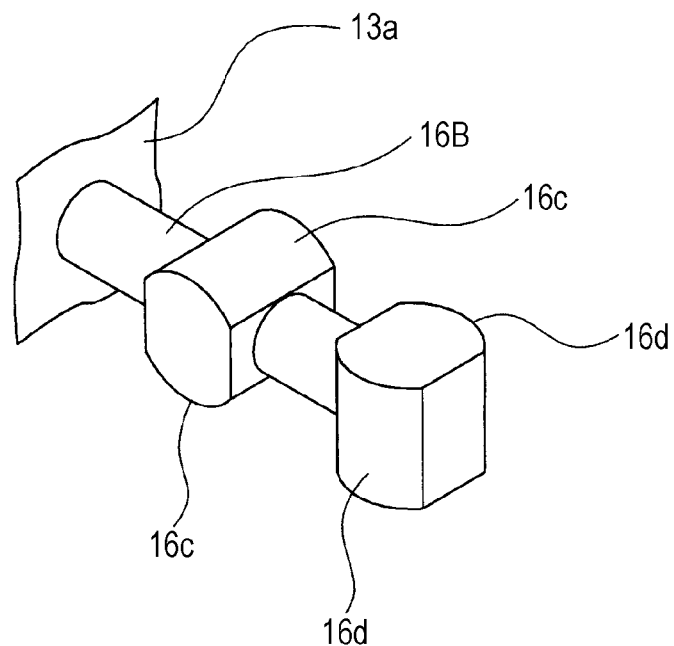
FIG. 18 is a perspective view of a driven portion.
Figure 19:
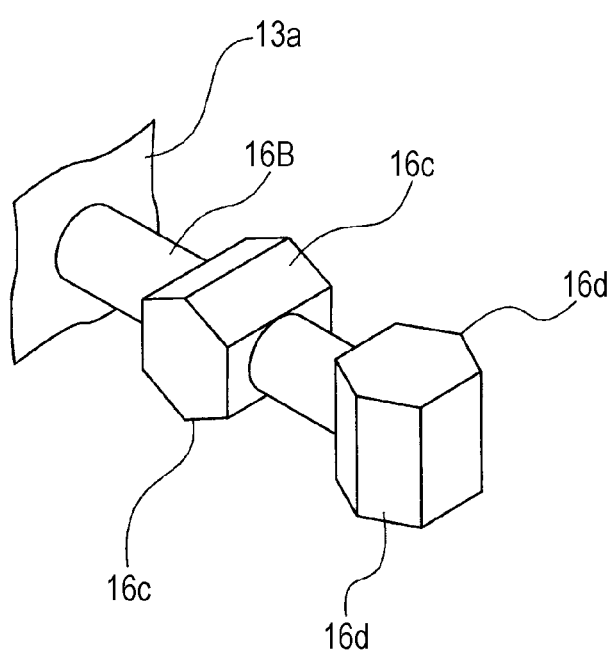
FIG. 19 is a perspective view of another driven portion.

On the driven portion 16B, first surfaces 16c and 16c to be operated are formed at the central portion in the length direction, and second surfaces 16d and 16d to be operated are formed at the tip portion (refer to FIG. 18). The first surfaces 16c and 16c to be operated are positioned on the upper and lower sides, and are respectively formed in convex curve shapes on the upper and lower sides. The second surfaces 16d and 16d to be operated are positioned on the right and left sides, and are respectively formed in convex on the right and left side. The central portions in the front-back direction on the first surfaces 16c and 16c to be operated on the upper and lower sides are respectively positioned at the top and bottom. The central portions in the front-back direction on the second surfaces 16d and 16d to be operated on the right and left sides are respectively positioned on the rightmost side and the leftmost side.

The first driving portion 25B is integrated with the first connection portion 24, and is formed in a horizontally long frame shape. The lower end portion of the first driving portion 25B coincides with the upper end portion of the first connection portion 24, and the first driving portion 25B is positioned on the upper side of the first connection portion 24. The inner space of the first driving portion 25B is formed as a first movement allowance section 29. The driven portion 16B is inserted into the first movement allowance section 29.

The second driving portion 28B is integrated with the second connection portion 27, and is formed in a vertically long frame shape. The right end portion of the second driving portion 28B coincides with the left end portion of the second connection portion 27, and the second driving portion 28B is positioned on the left side of the second connection portion 27. The inner space of the second driving portion 28B is formed as a second movement allowance section 30. The driven portion 16B is inserted into the second movement allowance section 30.

For example, the second driving portion 28B is positioned on the back side of the first driving portion 25B, and intersects with the first driving portion 25B.

When the first driving portion 25B is moved in the vertical direction, one first surface 16c to be operated on the driven portion 16B is pressed by the first driving portion 25B, and the lens unit 11 is rotated about the first fulcrum axis S1 as a fulcrum in the first direction. At this time, the second driving portion 28B is moved in the vertical direction relative to the driven portion 16B, in accordance with the rotation of the lens unit 11 in the first direction.

When the lens unit 11 is rotated in the first direction in such a manner, in accordance with the rotation of the lens unit 11, the second driving portion 28B is moved in the vertical direction relative to the driven portion 16B. Hence, it is difficult for unnecessary load to be applied to the lens unit 11 from the second driving portion 28B. Accordingly, the lens unit 11 is smoothly rotated in the first direction.

Further, when the first driving portion 25B is moved in the vertical direction and the lens unit 11 is rotated in the first direction, the first driving portion 25B slides on the first surfaces 16c and 16c to be operated, in which the first surfaces are formed in curved shapes. Hence, a sliding load of the first driving portion 25B to the driven portion 16B is reduced, and it is possible to secure a smooth rotation operation of the lens unit 11 in the first direction.

When the second driving portion 28B is moved in the horizontal direction, one second surface 16d to be operated on the driven portion 16B is pressed by the second driving portion 28B, and the lens unit 11 is rotated about the second fulcrum axis S2 as a fulcrum in the second direction. At this time, the first driving portion 25B is moved in the horizontal direction relative to the driven portion 16B, in accordance with the rotation of the lens unit 11 in the second direction.

When the lens unit 11 is rotated in the second direction in such a manner, in accordance with the rotation of the lens unit 11, the first driving portion 25B is moved in the horizontal direction relative to the driven portion 16B. Hence, it is difficult for unnecessary load to be applied to the lens unit 11 from the first driving portion 25B. Accordingly, the lens unit 11 is smoothly rotated in the second direction.

Further, when the second driving portion 28B is moved in the horizontal direction and the lens unit 11 is rotated in the second direction, the second driving portion 28B slides on the second surfaces 16d and 16d to be operated, in which the second surfaces are formed in curved shapes. Hence, a sliding load of the second driving portion 28B to the driven portion 16B is reduced, and it is possible to secure a smooth rotation operation of the lens unit 11 in the second direction.

In the second modified example, the driven portion 16B, which is a protrusion portion, is provided on the lens unit 11, and the first driving portion 25B and the second driving portion 28B are respectively formed in frame shapes. The inner spaces of the first driving portion 25B and the second driving portion 28B are respectively formed as the first movement allowance section 29 and the second movement allowance section 30.

Accordingly, the driven portion 16B is pressed by the first driving portion 25B and the second driving portion 28B, whereby the lens unit 11 is rotated. In addition, since the first movement allowance section 29 and the second movement allowance section 30 are formed as inner spaces of members having frame shapes, it is possible to rotate the lens unit 11 with a simple structure.

Further, the first driving portion 25B intersects with the second driving portion 28B. Hence, it is possible to achieve reduction in the size of the image blur correction device 10 by effectively using the spaces.

In addition, the driven portion 16B may be formed in, for example, a round shank shape. In this case, the first driving portion 25B and the second driving portion 28B come into line contact with the driven portion 16B.

Accordingly, the sliding loads of the first driving portion 25B and the second driving portion 28B to the driven portion 16B decrease, and it is possible to secure a smooth rotation operation of the lens unit 11.

Configuration (Second Embodiment) of Image Blur Correction Device

Next, a configuration of an image blur correction device 10A according to a second embodiment will be described (refer to FIGS. 20 and 21).

In addition, the image blur correction device 10A to be described below is different, compared with the image blur correction device 10 according to the first embodiment, in that the positions of the driving portions and the driven portions are different. Accordingly, in the image blur correction device 10A, compared with the image blur correction device 10, only different parts will be described in detail, the other parts will be represented by numerals and signs the same as the numerals and signs used in the image blur correction device 10, and the description thereof will be omitted.

The image blur correction device 10A has a lens unit 11A and a fixing member 12A that supports the lens unit 11A.

The lens unit 11A has a barrel portion 13 and a plurality of lenses or a lens group.

The lens unit 11A is provided with four driven portions 16, 16, . . . , which protrude laterally from the peripheral surface 13b at a position near the back end of the barrel portion 13. The driven portions 16, 16, . . . are formed in prismatic shapes, and are arranged in a matrix so as to be separated in the vertical and front-back directions.

The upper and lower surfaces of the driven portions 16, 16, . . . facing each other in the vertical direction are formed as first surfaces 16a, 16a, . . . to be operated, and the front and back surfaces thereof facing each other in the front-back direction are formed as second surfaces 16b, 16b, . . . to be operated.

The spaces between the driven portions 16, 16, . . . are formed in a cross shape. The space extending in the front-back direction is formed as a first movement allowance section 17, and the space extending in the vertical direction is formed as a second movement allowance section 18.

The fixing member 12A has a supporting portion 20 that has a substantially cylindrical shape, and an actuator attaching portion 21A that is provided to be continuous with the supporting portion 20.

The actuator attaching portion 21A has a first holding portion 21c that is provided at the upper end portion and a second holding portion 21d that is provided at the left front end portion.

The first holding portion 21c of the actuator attaching portion 21A in the fixing member 12A holds a first actuator 23. The first actuator 23 has a first driving shaft 23a that is movable in the vertical direction, and a first connection portion 24 is connected to the first driving shaft 23a. The first connection portion 24 is formed in a frame shape which is open in the horizontal direction, and the central portion of the upper end portion thereof in the front-back direction is connected to the lower end portion of the first driving shaft 23a.

The first driving portion 25, which has a cylindrical shape extending in the front-back direction, is supported on the lower end portion of the first connection portion 24 so as to be rotatable in the axial rotation direction.

The first driving portion 25 of the first actuator 23 is inserted into the first movement allowance section 17, and the first driving portion 25 is rotatable relative to the driven portions 16, 16, . . . in the first movement allowance section 17.

In the first actuator 23, when the first driving shaft 23a is moved in the vertical direction, the first connection portion 24 and the first driving portion 25 are integrally moved in the vertical direction in accordance with the movement of the first driving shaft 23a.

The second holding portion 21d of the actuator attaching portion 21A in the fixing member 12A holds a second actuator 26. The second actuator 26 has a second driving shaft 26a that is movable in the front-back direction, and a second connection portion 27 is connected to the second driving shaft 26a. The second connection portion 27 is formed in a frame shape which is open in the horizontal direction, and the central portion of the front end portion thereof in the vertical direction is connected to the back end portion of the second driving shaft 26a.

The second driving portion 28, which has a cylindrical shape extending in the vertical direction, is supported on the back end portion of the second connection portion 27 so as to be rotatable in the axial rotation direction.

The second driving portion 28 of the second actuator 26 is inserted into the second movement allowance section 18, and the second driving portion 28 is rotatable relative to the driven portions 16, 16, . . . in the second movement allowance section 18. For example, the second driving portion 28 is positioned on the left side of the first driving portion 25, and is inserted into the second movement allowance section 18 in a state where the second driving portion 28 intersects with the first driving portion 25.

In the second actuator 26, when the second driving shaft 26a is moved in the front-back direction, the second connection portion 27 and the second driving portion 28 are integrally moved in the front-back direction in accordance with the movement of the second driving shaft 26a.

Operation (Second Embodiment) of Image Blur Correction Device

Hereinafter, a blur correction operation in the image blur correction device 10A will be described (refer to FIGS. 20 to 23).

Figure 20:
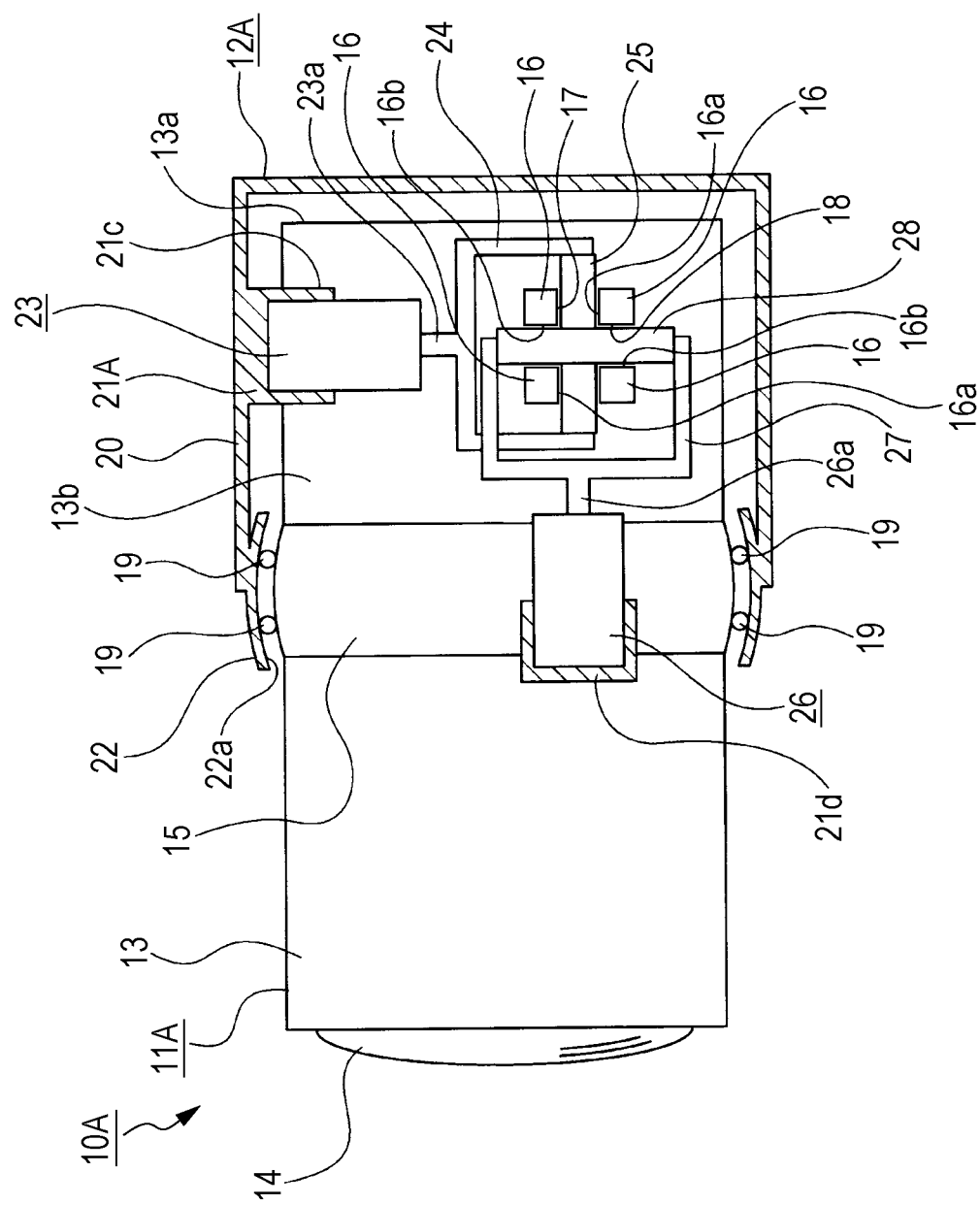
FIG. 20 is a schematic side view illustrating an image blur correction device according to a second embodiment together with FIGS. 21 to 23.
Figure 21:
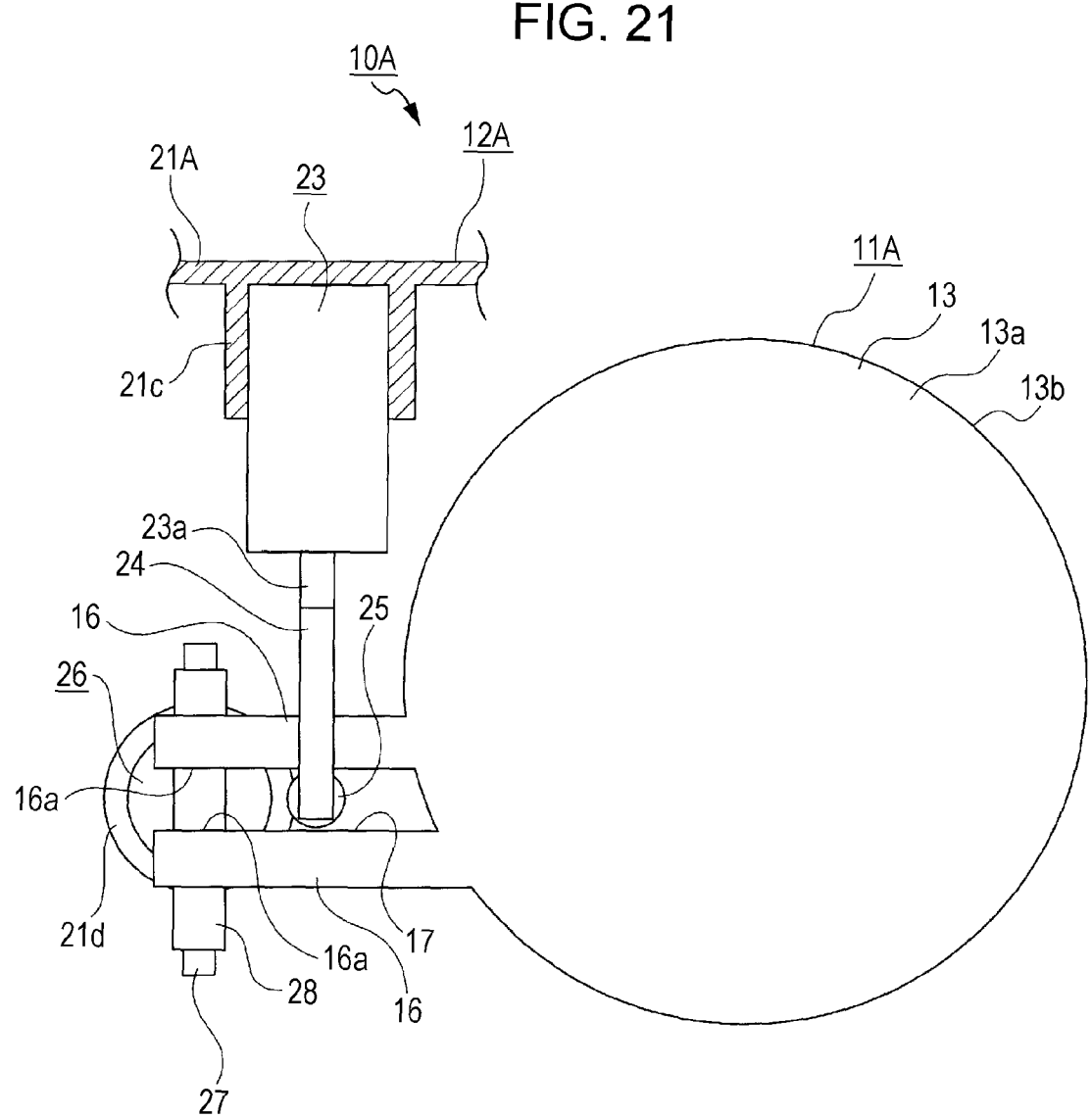
FIG. 21 is a schematic rear view of the image blur correction device.
Figure 22:
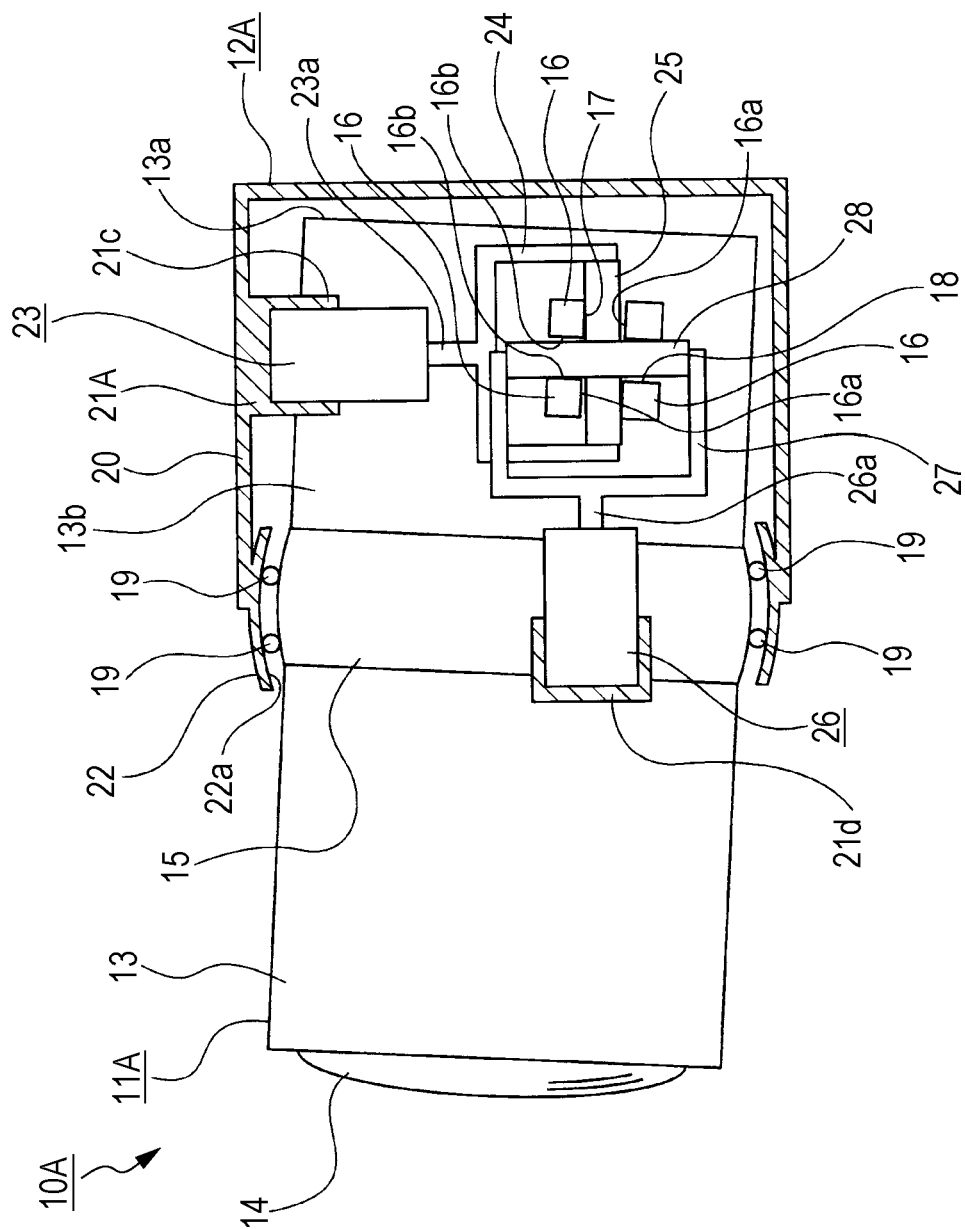
FIG. 22 is a schematic side view illustrating an operation of the image blur correction device in a condition where the lens unit is rotated in the first direction together with FIG. 23.
Figure 23:
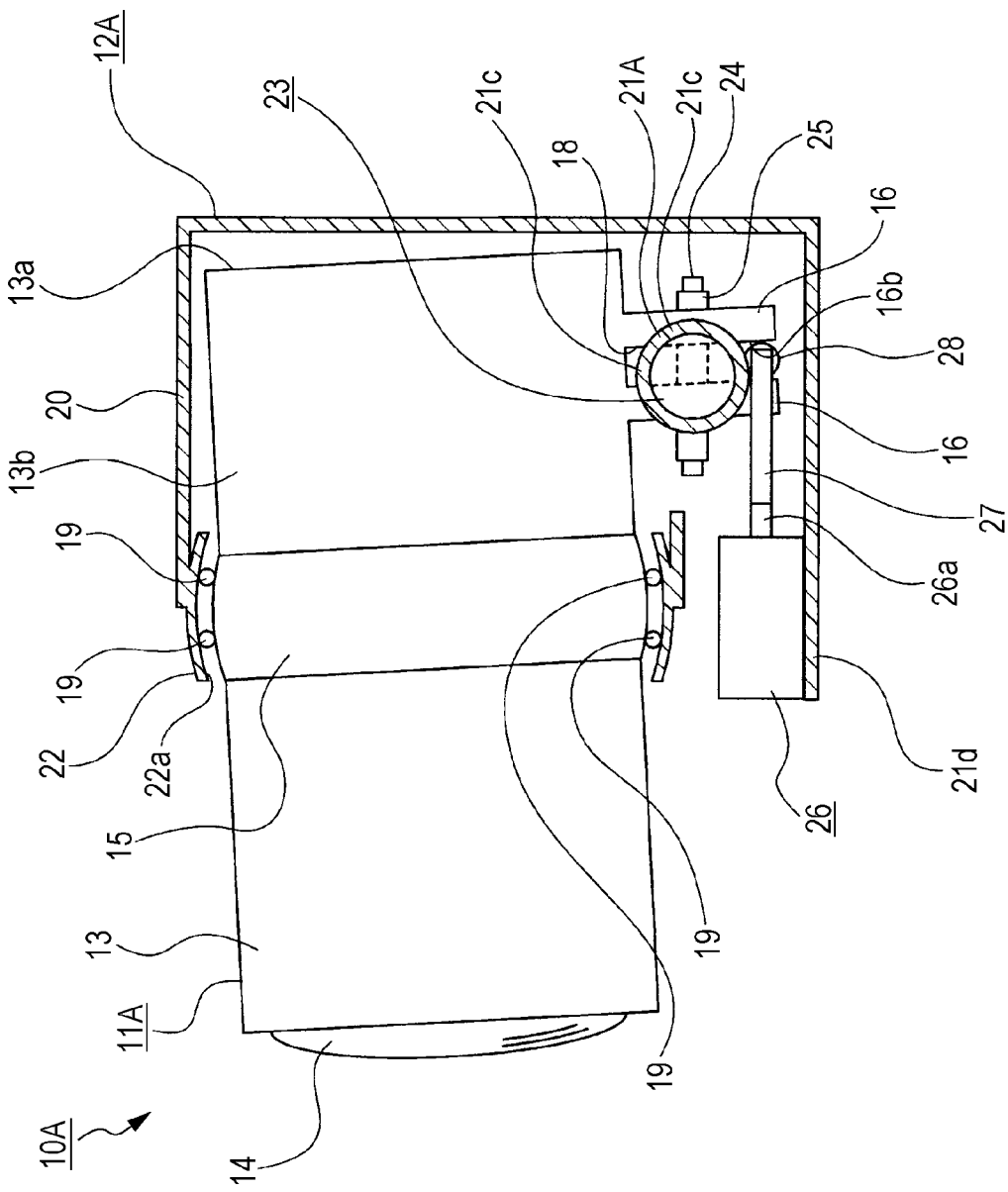
FIG. 23 is a schematic top plan view illustrating a condition where the lens unit is rotated in the second direction.

In a state where the blur correction operation is not performed, the image blur correction device 10A is at a reference position at which the device is not rotated in any one direction of the first direction and the second direction (refer to FIGS. 20 and 21).

First, a blur correction operation in the first direction (pitching direction) in the image blur correction device 10A will be described.

In the image blur correction device 10A, when the first driving shaft 23a of the first actuator 23 is moved downward and the first driving portion 25 is moved downward, the first surfaces 16a and 16a to be operated, which face toward the upper side of the driven portions 16 and 16, are pressed by the first driving portion 25, and the first driving portion 25 slides on the first surfaces 16a, 16a, . . . to be operated while rotating. As a result, the lens unit 11A is rotated about the first fulcrum axis S1 as a fulcrum in the first direction in which the photography lens 14 faces slightly upward (refer to FIG. 22).

At this time, the second driving portion 28 of the second actuator 26 is moved upward relative to the driven portions 16, 16, . . . in the second movement allowance section 18, in accordance with the rotation of the lens unit 11A in the first direction.

When the lens unit 11A is rotated in the first direction in such a manner, in accordance with the rotation of the lens unit 11A, the second driving portion 28 is moved upward relative to the driven portions 16, 16, . . . in the second movement allowance section 18. Hence, it is difficult for unnecessary load to be applied to the lens unit 11A from the second driving portion 28. Accordingly, the lens unit 11A is smoothly rotated in the first direction.

On the other hand, in the image blur correction device 10A, when the first driving shaft 23a of the first actuator 23 is moved upward and the first driving portion 25 is moved upward, the first surfaces 16a and 16a to be operated, which face toward the lower side of the driven portions 16 and 16, are pressed by the first driving portion 25, and the first driving portion 25 slides on the first surfaces 16a, 16a, . . . to be operated while rotating. As a result, the lens unit 11A is rotated about the first fulcrum axis S1 as a fulcrum in the first direction in which the photography lens 14 faces slightly downward.

At this time, the second driving portion 28 of the second actuator 26 is moved downward relative to the driven portions 16, 16, . . . in the second movement allowance section 18, in accordance with the rotation of the lens unit 11A in the first direction.

When the lens unit 11A is rotated in the first direction in such a manner, in accordance with the rotation of the lens unit 11A, the second driving portion 28 is moved downward relative to the driven portions 16, 16, . . . in the second movement allowance section 18. Hence, it is difficult for unnecessary load to be applied to the lens unit 11A from the second driving portion 28. Accordingly, the lens unit 11A is smoothly rotated in the first direction.

Next, a blur correction operation in the second direction (yawing direction) in the image blur correction device 10A will be described.

In the image blur correction device 10A, when the second driving shaft 26a of the second actuator 26 is moved backward and the second driving portion 28 is moved backward, the second surfaces 16b and 16b to be operated, which face toward the front side of the driven portions 16 and 16, are pressed by the second driving portion 28, and the second driving portion 28 slides on the second surfaces 16b, 16b, . . . to be operated while rotating. As a result, the lens unit 11A is rotated about the second fulcrum axis S2 as a fulcrum in the second direction in which the photography lens 14 faces slightly leftward (refer to FIG. 23).

At this time, the first driving portion 25 of the first actuator 23 is moved frontward relative to the driven portions 16, 16, . . . in the first movement allowance section 17, in accordance with the rotation of the lens unit 11A in the second direction.

When the lens unit 11A is rotated in the second direction in such a manner, in accordance with the rotation of the lens unit 11A, the first driving portion 25 is moved frontward relative to the driven portions 16, 16, . . . in the first movement allowance section 17. Hence, it is difficult for unnecessary load to be applied to the lens unit 11A from the first driving portion 25. Accordingly, the lens unit 11A is smoothly rotated in the second direction.

On the other hand, in the image blur correction device 10A, when the second driving shaft 26a of the second actuator 26 is moved frontward and the second driving portion 28 is moved frontward, the second surfaces 16b and 16b to be operated, which face toward the back side of the driven portions 16 and 16, are pressed by the second driving portion 28, and the second driving portion 28 slides on the second surfaces 16b, 16b, . . . to be operated while rotating. As a result, the lens unit 11A is rotated about the second fulcrum axis S2 as a fulcrum in the second direction in which the photography lens 14 faces slightly rightward.

At this time, the first driving portion 25 of the first actuator 23 is moved backward relative to the driven portions 16, 16, . . . in the first movement allowance section 17, in accordance with the rotation of the lens unit 11A in the second direction.

When the lens unit 11A is rotated in the second direction in such a manner, in accordance with the rotation of the lens unit 11A, the first driving portion 25 is moved backward relative to the driven portions 16, 16, . . . in the first movement allowance section 17. Hence, it is difficult for unnecessary load to be applied to the lens unit 11A from the first driving portion 25. Accordingly, the lens unit 11A is smoothly rotated in the second direction.

In addition, in the image blur correction device 10A, although not shown in the drawing, the lens unit 11A is configured to be rotatable in the second direction in a state where the lens unit 11A is rotated in the first direction from the reference position, and the lens unit 11A is configured to be rotatable in the first direction in a state where the lens unit 11A is rotated in the second direction from the reference position.

In the image blur correction device 10A, the respective sections for rotating the lens unit 11A are not disposed on the back side of the lens unit 11A, and thus it is possible to achieve reduction in the size thereof in the optical axis direction.

It should be noted that, even in the image blur correction device 10A according to the second embodiment, in a similar manner to the image blur correction device 10 according to the first embodiment, it is possible to apply the respective configurations of the first and second modified examples.

Configuration (Third Embodiment) of Image Blur Correction Device

Next, a configuration of an image blur correction device 10B according to a third embodiment will be described (refer to FIGS. 24 and 25).

In addition, the image blur correction device 10B to be described later is different, compared with the image blur correction device 10 according to the first embodiment, in that the positions of the driving portions and the driven portions are different. Accordingly, in the image blur correction device 10B, compared with the image blur correction device 10, only different parts will be described in detail, the other parts will be represented by numerals and signs the same as the numerals and signs used in the image blur correction device 10, and the description thereof will be omitted.

The image blur correction device 10B has a lens unit 11B and a fixing member 12B that supports the lens unit 11B.

The lens unit 11B has a barrel portion 13 and a plurality of lenses or a lens group.

The lens unit 11B is provided with a protrusion-like portion 31 and four driven portions 16, 16, . . . . The protrusion-like portion 31 protrudes laterally from the peripheral surface 13b at a position near the back end of the barrel portion 13, and four driven portions 16, 16, . . . protrude toward the back side of the protrusion-like portion 31. The driven portions 16, 16, . . . are formed in prismatic shapes, and are arranged in a matrix so as to be separated in the vertical and horizontal directions.

The upper and lower surfaces of the driven portions 16, 16, . . . facing each other in the vertical direction are formed as first surfaces 16a, 16a, . . . to be operated, and the right and left surfaces thereof facing each other in the horizontal direction are formed as second surfaces 16b, 16b, . . . to be operated.

The spaces between the driven portions 16, 16, . . . are formed in a cross shape. The space extending in the horizontal direction is formed as a first movement allowance section 17, and the space extending in the vertical direction is formed as a second movement allowance section 18.

The fixing member 12B has a supporting portion 20 that has a substantially cylindrical shape, and an actuator attaching portion 21B that is provided to be continuous with the supporting portion 20.

The actuator attaching portion 21B has a first holding portion 21c that is provided at the upper end portion and a second holding portion 21d that is provided at the left end portion.

The first holding portion 21c of the actuator attaching portion 21B in the fixing member 12B holds a first actuator 23. The first actuator 23 has a first driving shaft 23a that is movable in the vertical direction, and a first connection portion 24 is connected to the first driving shaft 23a. The first connection portion 24 is formed in a frame shape which is open in the front-back direction, and the central portion of the upper end portion thereof in the horizontal direction is connected to the lower end portion of the first driving shaft 23a.

The first driving portion 25, which has a cylindrical shape extending in the horizontal direction, is supported on the lower end portion of the first connection portion 24 so as to be rotatable in the axial rotation direction.

The first driving portion 25 of the first actuator 23 is inserted into the first movement allowance section 17, and the first driving portion 25 is rotatable relative to the driven portions 16, 16, . . . in the first movement allowance section 17.

In the first actuator 23, when the first driving shaft 23a is moved in the vertical direction, the first connection portion 24 and the first driving portion 25 are integrally moved in the vertical direction in accordance with the movement of the first driving shaft 23a.

The second holding portion 21d of the actuator attaching portion 21B in the fixing member 12B holds a second actuator 26. The second actuator 26 has a second driving shaft 26a that is movable in the horizontal direction, and a second connection portion 27 is connected to the second driving shaft 26a. The second connection portion 27 is formed in a frame shape which is open in the front-back direction, and the central portion of the left end portion thereof in the vertical direction is connected to the right end portion of the second driving shaft 26a.

The second driving portion 28, which has a cylindrical shape extending in the vertical direction, is supported on the right end portion of the second connection portion 27 so as to be rotatable in the axial rotation direction.

The second driving portion 28 of the second actuator 26 is inserted into the second movement allowance section 18, and the second driving portion 28 is rotatable relative to the driven portions 16, 16, . . . in the second movement allowance section 18. For example, the second driving portion 28 is positioned on the back side of the first driving portion 25, and is inserted into the second movement allowance section 18 in a state where the second driving portion 28 intersects with the first driving portion 25.

In the second actuator 26, when the second driving shaft 26a is moved in the horizontal direction, the second connection portion 27 and the second driving portion 28 are integrally moved in the horizontal direction in accordance with the movement of the second driving shaft 26a.

Operation (Third Embodiment) of Image Blur Correction Device

Hereinafter, a blur correction operation in the image blur correction device 10B will be described (refer to FIGS. 24 to 27).

Figure 24:
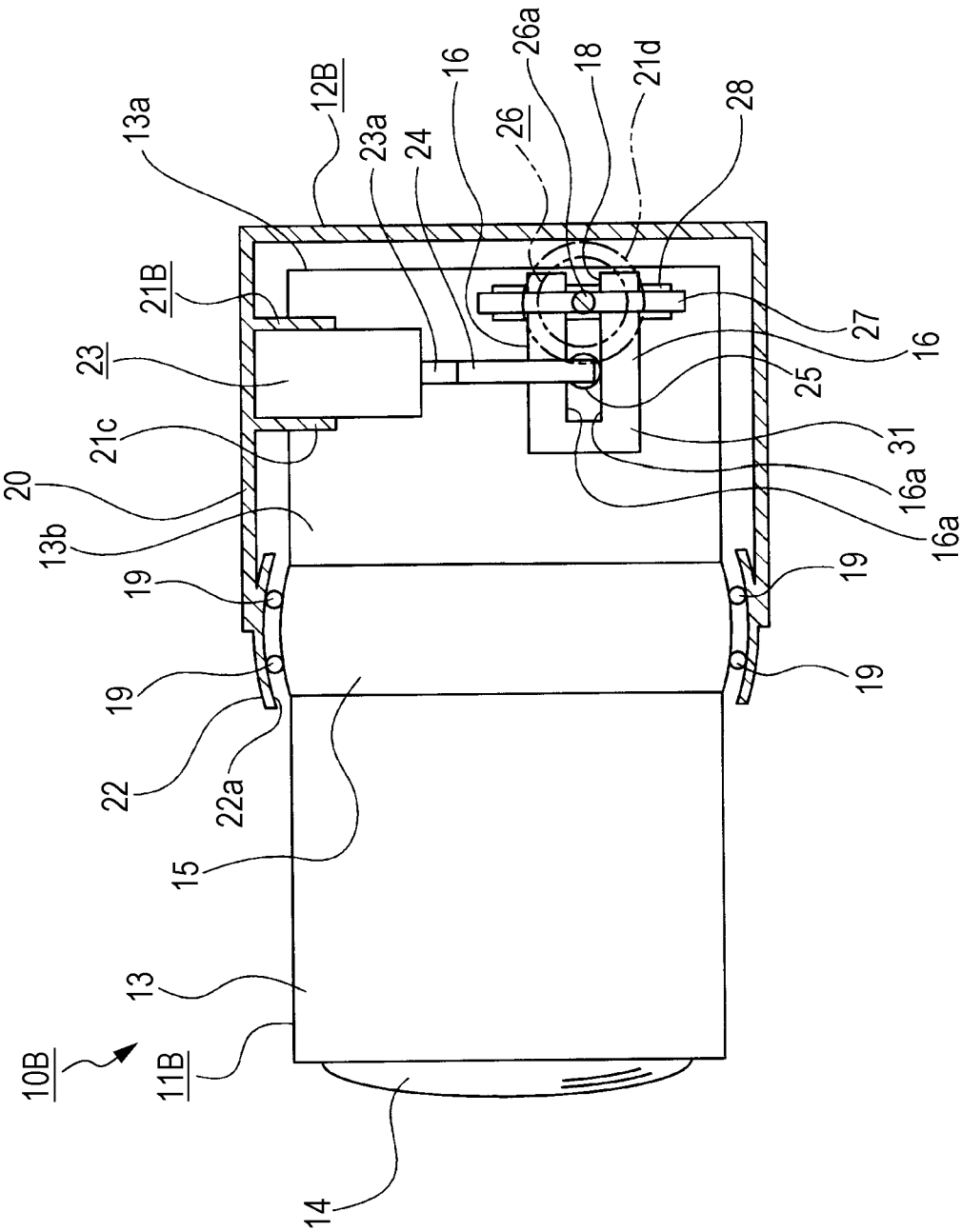
FIG. 24 is a schematic side view illustrating an image blur correction device according to a third embodiment together with FIGS. 25 to 27.
Figure 25:
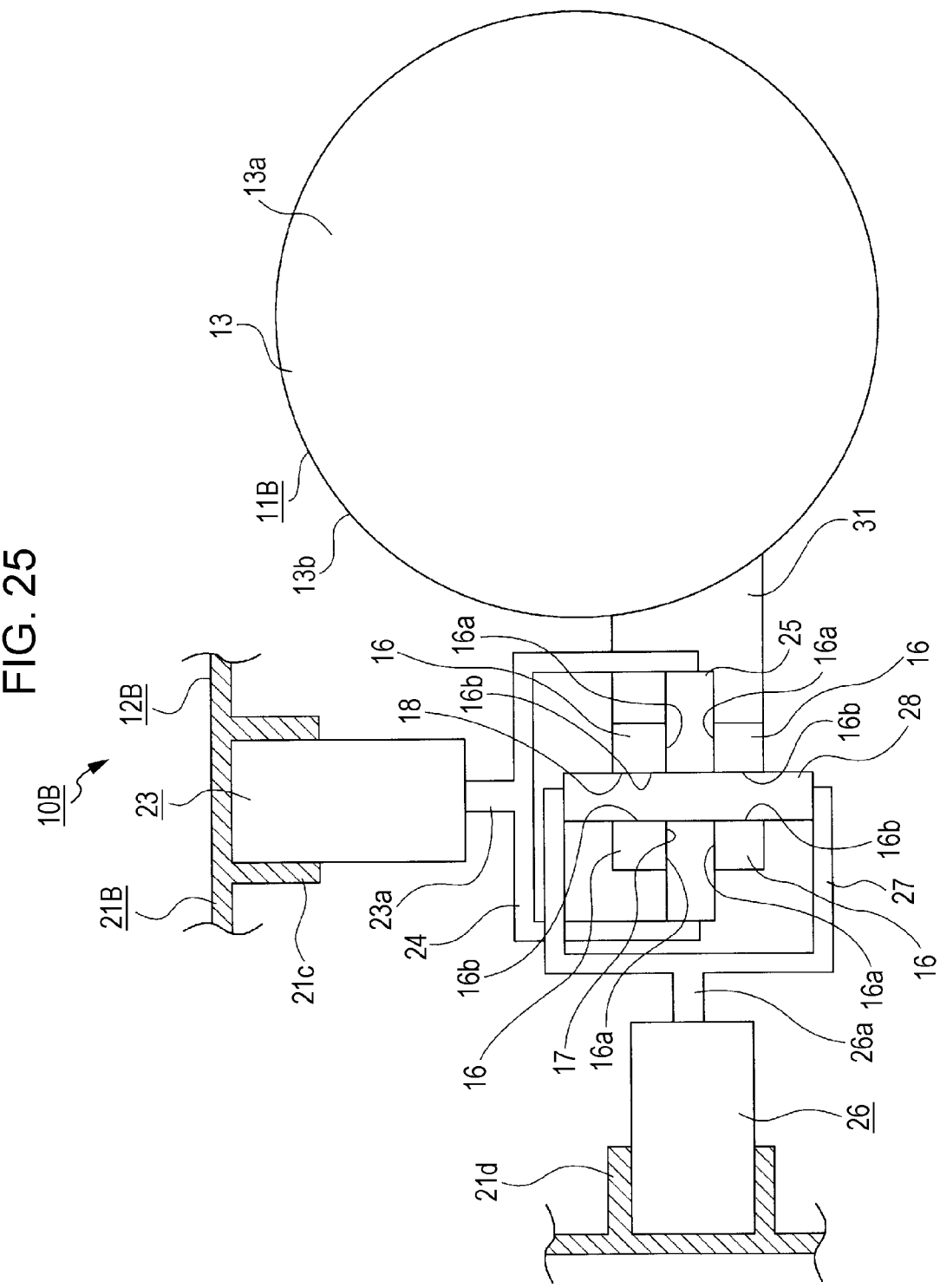
FIG. 25 is a schematic rear view of the image blur correction device.
Figure 26:
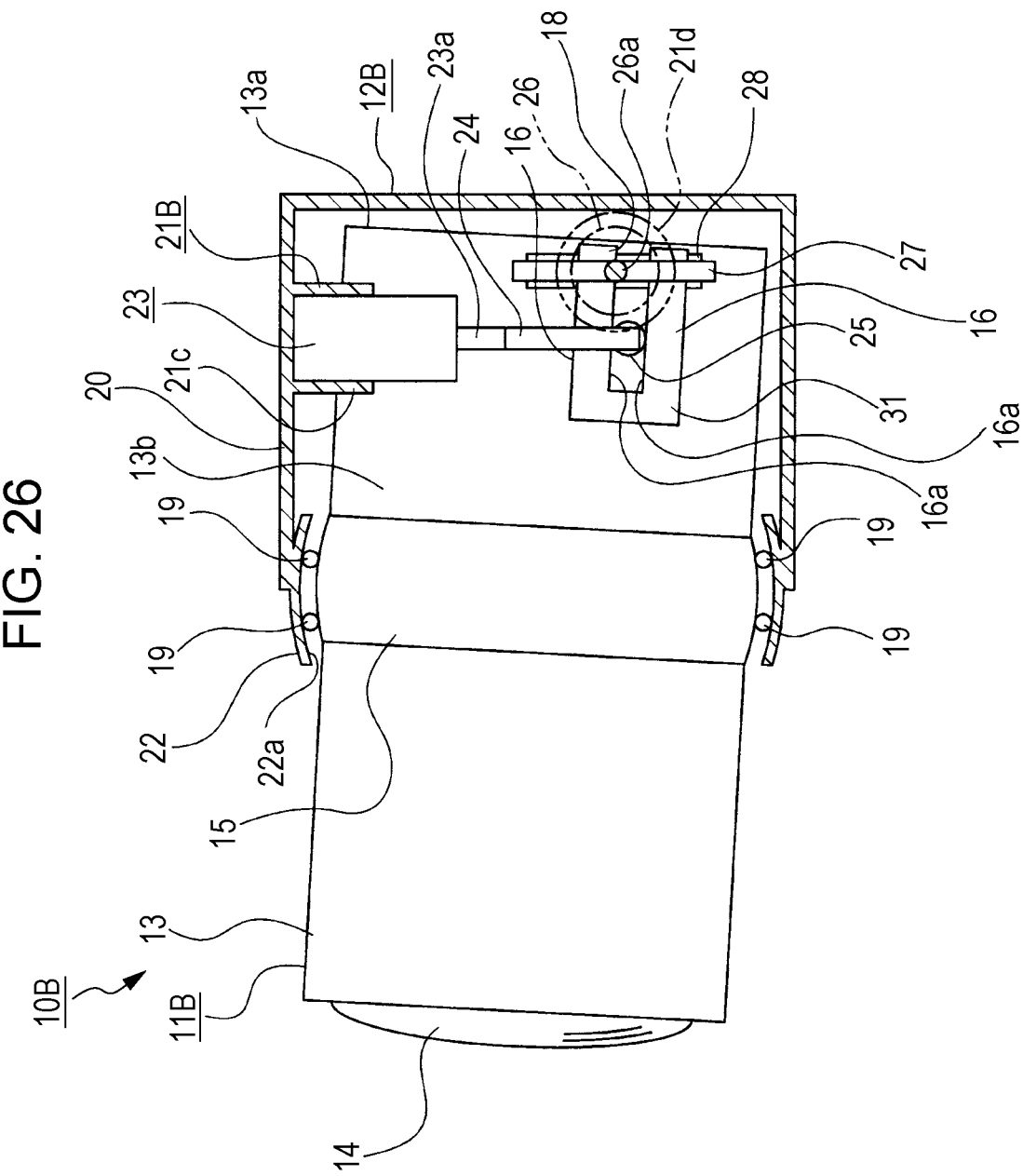
FIG. 26 is a schematic side view illustrating an operation of the image blur correction device in a condition where the lens unit is rotated in the first direction together with FIG. 27.
Figure 27:
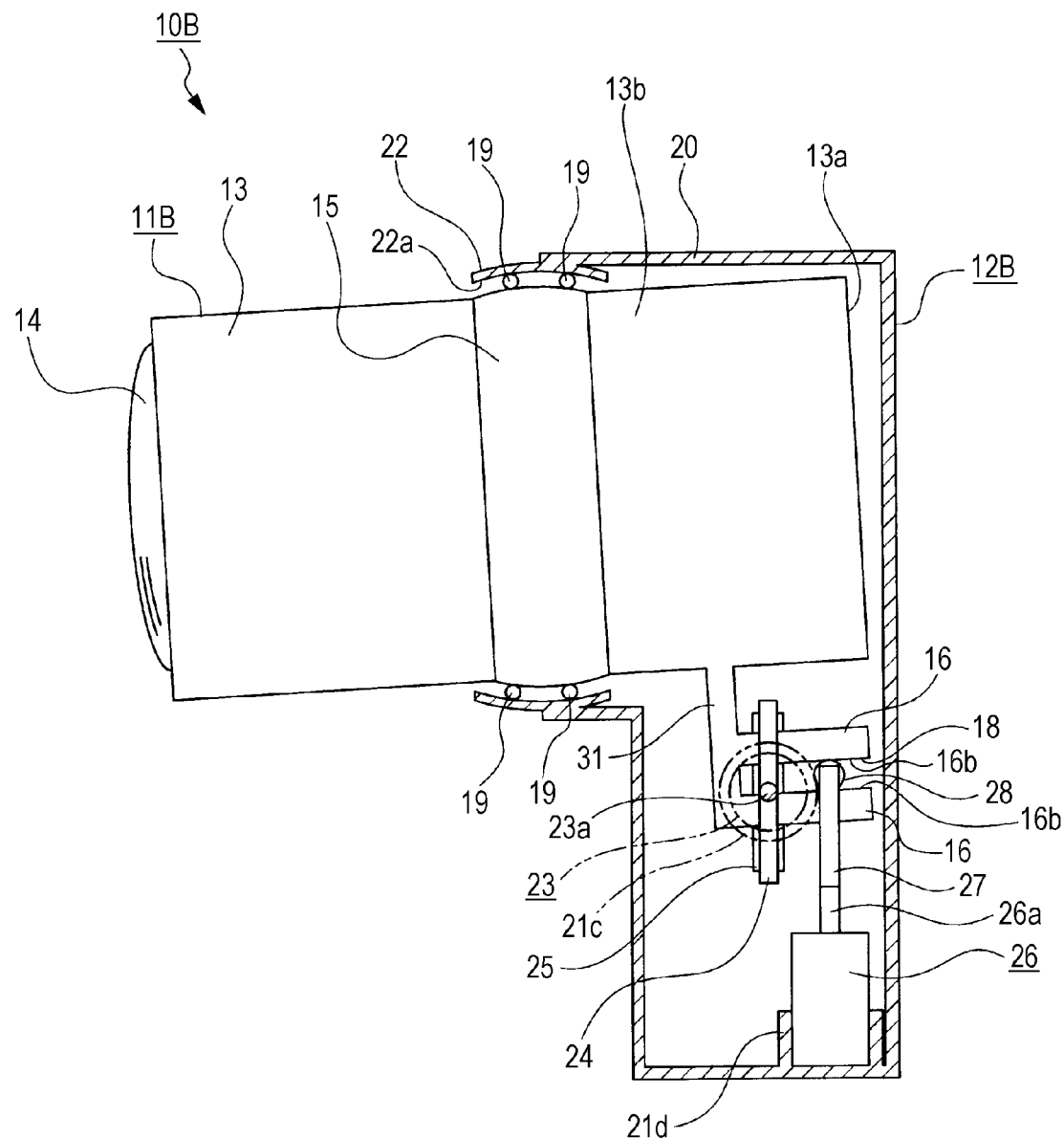
FIG. 27 is a schematic top plan view illustrating a condition where the lens unit is rotated in the second direction.

In a state where the blur correction operation is not performed, the image blur correction device 10B is at a reference position at which the device is not rotated in any one direction of the first direction and the second direction (refer to FIGS. 24 and 25).

First, a blur correction operation in the first direction (pitching direction) in the image blur correction device 10B will be described.

In the image blur correction device 10B, when the first driving shaft 23a of the first actuator 23 is moved downward and the first driving portion 25 is moved downward, the first surfaces 16a and 16a to be operated, which face toward the upper side of the driven portions 16 and 16, are pressed by the first driving portion 25, and the first driving portion 25 slides on the first surfaces 16a, 16a, . . . to be operated while rotating. As a result, the lens unit 11B is rotated about the first fulcrum axis S1 as a fulcrum in the first direction in which the photography lens 14 faces slightly upward (refer to FIG. 26).

At this time, the second driving portion 28 of the second actuator 26 is moved upward relative to the driven portions 16, 16, . . . in the second movement allowance section 18, in accordance with the rotation of the lens unit 11B in the first direction.

When the lens unit 11B is rotated in the first direction in such a manner, in accordance with the rotation of the lens unit 11B, the second driving portion 28 is moved upward relative to the driven portions 16, 16, . . . in the second movement allowance section 18. Hence, it is difficult for unnecessary load to be applied to the lens unit 11B from the second driving portion 28. Accordingly, the lens unit 11B is smoothly rotated in the first direction.

On the other hand, in the image blur correction device 10B, when the first driving shaft 23a of the first actuator 23 is moved upward and the first driving portion 25 is moved upward, the first surfaces 16a and 16a to be operated, which face toward the lower side of the driven portions 16 and 16, are pressed by the first driving portion 25, and the first driving portion 25 slides on the first surfaces 16a, 16a, . . . to be operated while rotating. As a result, the lens unit 11B is rotated about the first fulcrum axis S1 as a fulcrum in the first direction in which the photography lens 14 faces slightly downward.

At this time, the second driving portion 28 of the second actuator 26 is moved downward relative to the driven portions 16, 16, . . . in the second movement allowance section 18, in accordance with the rotation of the lens unit 11B in the first direction.

When the lens unit 11B is rotated in the first direction in such a manner, in accordance with the rotation of the lens unit 11B, the second driving portion 28 is moved downward relative to the driven portions 16, 16, . . . in the second movement allowance section 18. Hence, it is difficult for unnecessary load to be applied to the lens unit 11B from the second driving portion 28. Accordingly, the lens unit 11B is smoothly rotated in the first direction.

Next, a blur correction operation in the second direction (yawing direction) in the image blur correction device 10B will be described.

In the image blur correction device 10B, when the second driving shaft 26a of the second actuator 26 is moved rightward and the second driving portion 28 is moved rightward, the second surfaces 16b and 16b to be operated, which face toward the left side of the driven portions 16 and 16, are pressed by the second driving portion 28, and the second driving portion 28 slides on the second surfaces 16b, 16b, . . . to be operated while rotating. As a result, the lens unit 11B is rotated about the second fulcrum axis S2 as a fulcrum in the second direction in which the photography lens 14 faces slightly leftward (refer to FIG. 27).

At this time, the first driving portion 25 of the first actuator 23 is moved leftward relative to the driven portions 16, 16, . . . in the first movement allowance section 17, in accordance with the rotation of the lens unit 11B in the second direction.

When the lens unit 11B is rotated in the second direction in such a manner, in accordance with the rotation of the lens unit 11B, the first driving portion 25 is moved leftward relative to the driven portions 16, 16, . . . in the first movement allowance section 17. Hence, it is difficult for unnecessary load to be applied to the lens unit 11B from the first driving portion 25. Accordingly, the lens unit 11B is smoothly rotated in the second direction.

On the other hand, in the image blur correction device 10B, when the second driving shaft 26a of the second actuator 26 is moved leftward and the second driving portion 28 is moved leftward, the second surfaces 16b and 16b to be operated, which face toward the right side of the driven portions 16 and 16, are pressed by the second driving portion 28, and the second driving portion 28 slides on the second surfaces 16b, 16b, . . . to be operated while rotating. As a result, the lens unit 11B is rotated about the second fulcrum axis S2 as a fulcrum in the second direction in which the photography lens 14 faces slightly rightward.

At this time, the first driving portion 25 of the first actuator 23 is moved rightward relative to the driven portions 16, 16, . . . in the first movement allowance section 17, in accordance with the rotation of the lens unit 11B in the second direction.

When the lens unit 11B is rotated in the second direction in such a manner, in accordance with the rotation of the lens unit 11B, the first driving portion 25 is moved rightward relative to the driven portions 16, 16, . . . in the first movement allowance section 17. Hence, it is difficult for unnecessary load to be applied to the lens unit 11B from the first driving portion 25. Accordingly, the lens unit 11B is smoothly rotated in the second direction.

In addition, in the image blur correction device 10B, although not shown in the drawing, the lens unit 11B is configured to be rotatable in the second direction in a state where the lens unit 11B is rotated in the first direction from the reference position, and the lens unit 11B is configured to be rotatable in the first direction in a state where the lens unit 11B is rotated in the second direction from the reference position.

In the image blur correction device 10B, the respective sections for rotating the lens unit 11B are not disposed on the back side of the lens unit 11B, and thus it is possible to achieve reduction in the size thereof in the optical axis direction.

It should be noted that, even in the image blur correction device 10B according to the third embodiment, in a similar manner to the image blur correction device 10 according to the first embodiment, it is possible to apply the respective configurations of the first and second modified examples.

Configuration (Fourth Embodiment) of Image Blur Correction Device

Hereinafter, a configuration of an image blur correction device 10C according to a fourth embodiment will be described (refer to FIGS. 28 to 31).

In addition, the image blur correction device 10C to be described later is different, compared with the image blur correction device 10 according to the first embodiment, in that the positions of the driving portions and the driven portions are different. Accordingly, in the image blur correction device 10C, compared with the image blur correction device 10, only different parts will be described in detail, the other parts will be represented by numerals and signs the same as the numerals and signs used in the image blur correction device 10, and the description thereof will be omitted.

The image blur correction device 10C has a lens unit 11C and a fixing member 12C that supports the lens unit 11C.

The lens unit 11C has a barrel portion 13 and a plurality of lenses or a lens group.

The lens unit 11C is provided with four driven portions 16, 16, . . . which protrude leftward from the sliding portion 15 of the barrel portion 13. The driven portions 16, 16, . . . are formed in a prismatic shape, and are positioned at the same distance from the first fulcrum axis S1 on the periphery based on the first fulcrum axis S1. The driven portions 16, 16, . . . are arranged in a matrix so as to be separated in the vertical and front-back directions.

The upper and lower surfaces of the driven portions 16, 16, . . . facing each other in the vertical direction are formed as first surfaces 16a, 16a, . . . to be operated, and the front and back surfaces thereof facing each other in the front-back direction are formed as second surfaces 16b, 16b, . . . to be operated.

The spaces between the driven portions 16, 16, . . . are formed in a cross shape. The space extending in the front-back direction is formed as a first movement allowance section 17, and the space extending in the vertical direction is formed as a second movement allowance section 18.

The fixing member 12C has a supporting portion 20 that has a substantially cylindrical shape, and an actuator attaching portion 21C that is provided to be continuous with the supporting portion 20.

The actuator attaching portion 21C has a first holding portion 21c that is provided at the upper end portion and a second holding portion 21d that is provided at the left end portion.

The first holding portion 21c of the actuator attaching portion 21C in the fixing member 12C holds a first actuator 23. The first actuator 23 has a first driving shaft 23a that is movable in the vertical direction, and a first connection portion 24 is connected to the first driving shaft 23a. The first connection portion 24 is formed in a frame shape which is open in the horizontal direction, and the central portion of the upper end portion thereof in the front-back direction is connected to the lower end portion of the first driving shaft 23a.

The first driving portion 25, which has a cylindrical shape extending in the front-back direction, is supported on the lower end portion of the first connection portion 24 so as to be rotatable in the axial rotation direction.

The first driving portion 25 of the first actuator 23 is inserted into the first movement allowance section 17, and the first driving portion 25 is rotatable relative to the driven portions 16, 16, . . . in the first movement allowance section 17.

In the first actuator 23, when the first driving shaft 23a is moved in the vertical direction, the first connection portion 24 and the first driving portion 25 are integrally moved in the vertical direction in accordance with the movement of the first driving shaft 23a.

The second holding portion 21d of the actuator attaching portion 21C in the fixing member 12C holds a second actuator 26. The second actuator 26 has a second driving shaft 26a that is movable in the front-back direction, and a second connection portion 27 is connected to the second driving shaft 26a. The second connection portion 27 is formed in a frame shape which is open in the horizontal direction, and the central portion of the front end portion thereof in the vertical direction is connected to the back end portion of the second driving shaft 26a.

The second driving portion 28, which has a cylindrical shape extending in the vertical direction, is supported on the back end portion of the second connection portion 27 so as to be rotatable in the axial rotation direction.

The second driving portion 28 of the second actuator 26 is inserted into the second movement allowance section 18, and the second driving portion 28 is rotatable relative to the driven portions 16, 16, . . . in the second movement allowance section 18. For example, the second driving portion 28 is positioned on the left side of the first driving portion 25, and is inserted into the second movement allowance section 18 in a state where the second driving portion 28 intersects with the first driving portion 25.

In the second actuator 26, when the second driving shaft 26a is moved in the front-back direction, the second connection portion 27 and the second driving portion 28 are integrally moved in the front-back direction in accordance with the movement of the second driving shaft 26a.

Operation (Fourth Embodiment) of Image Blur Correction Device

Hereinafter, a blur correction operation in the image blur correction device 10C will be described (refer to FIGS. 28 to 31). In the image blur correction device 10C, the lens unit 11C is configured to be rotatable in the third direction (rolling direction) and the second direction (yawing direction). The third direction is the axial rotation direction of the third fulcrum axis S3 (optical axis P). The second direction is the axial rotation direction of the second fulcrum axis S2.

Figure 28:
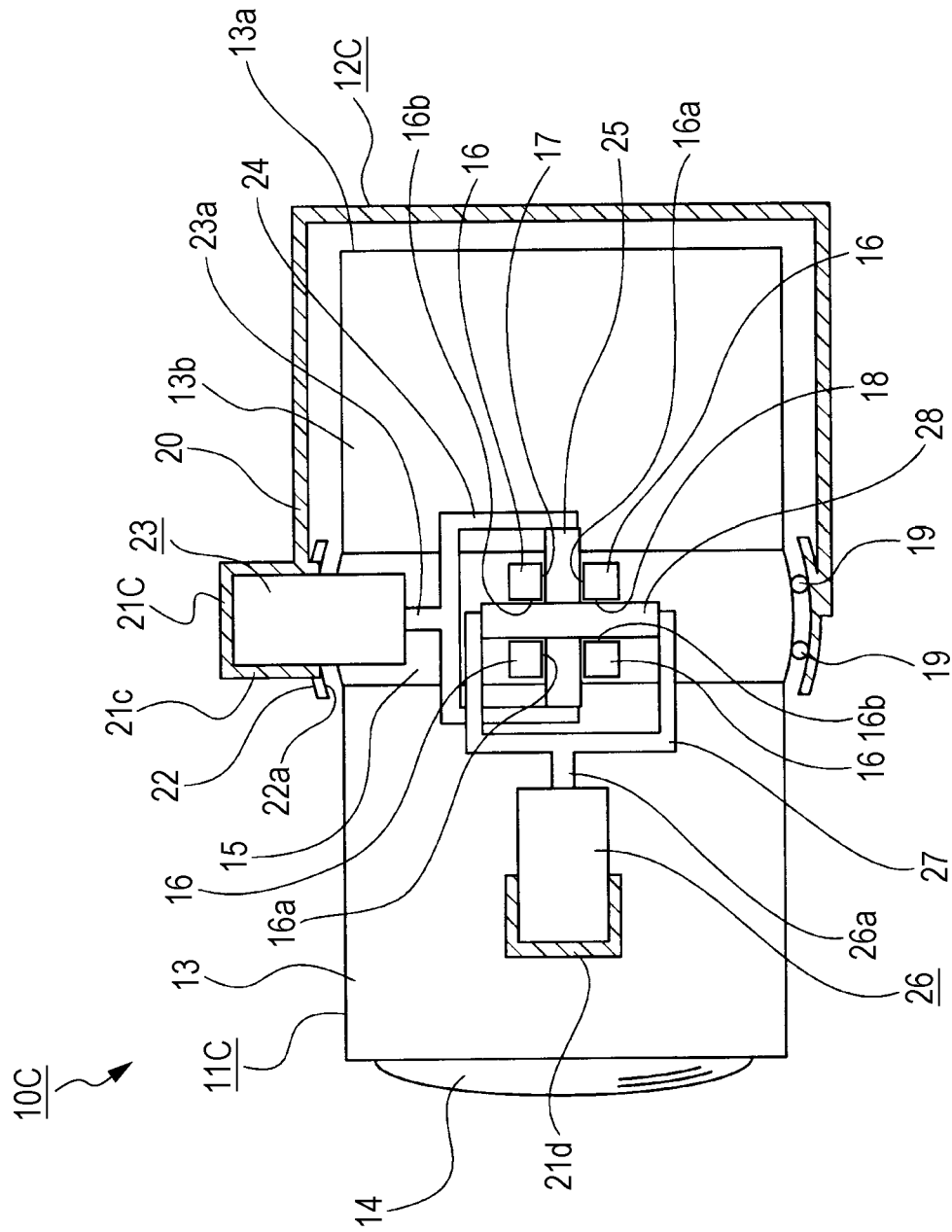
FIG. 28 is a schematic side view illustrating an image blur correction device according to a fourth embodiment together with FIGS. 29 to 31.
Figure 29:
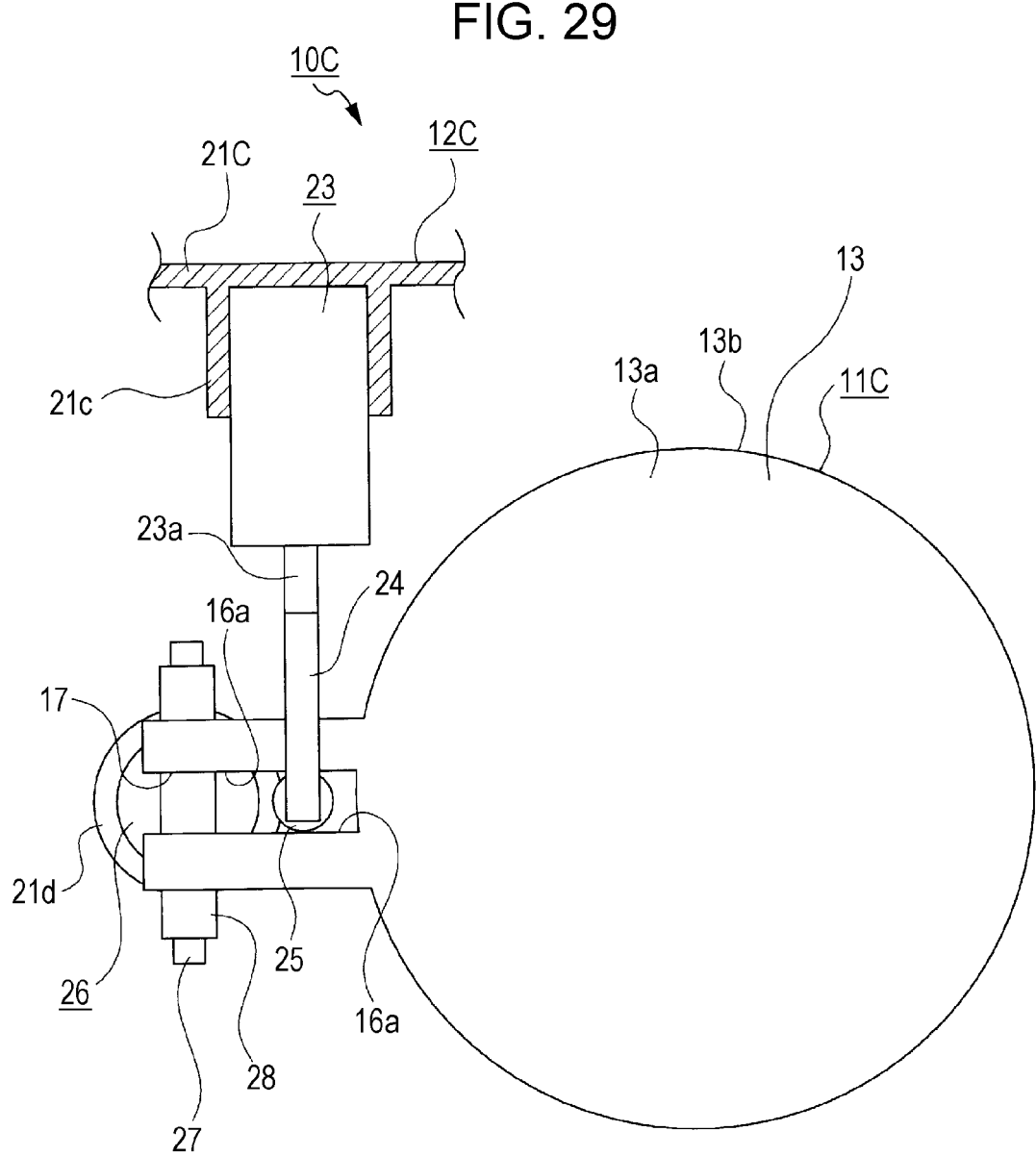
FIG. 29 is a schematic rear view of the image blur correction device.
Figure 30:
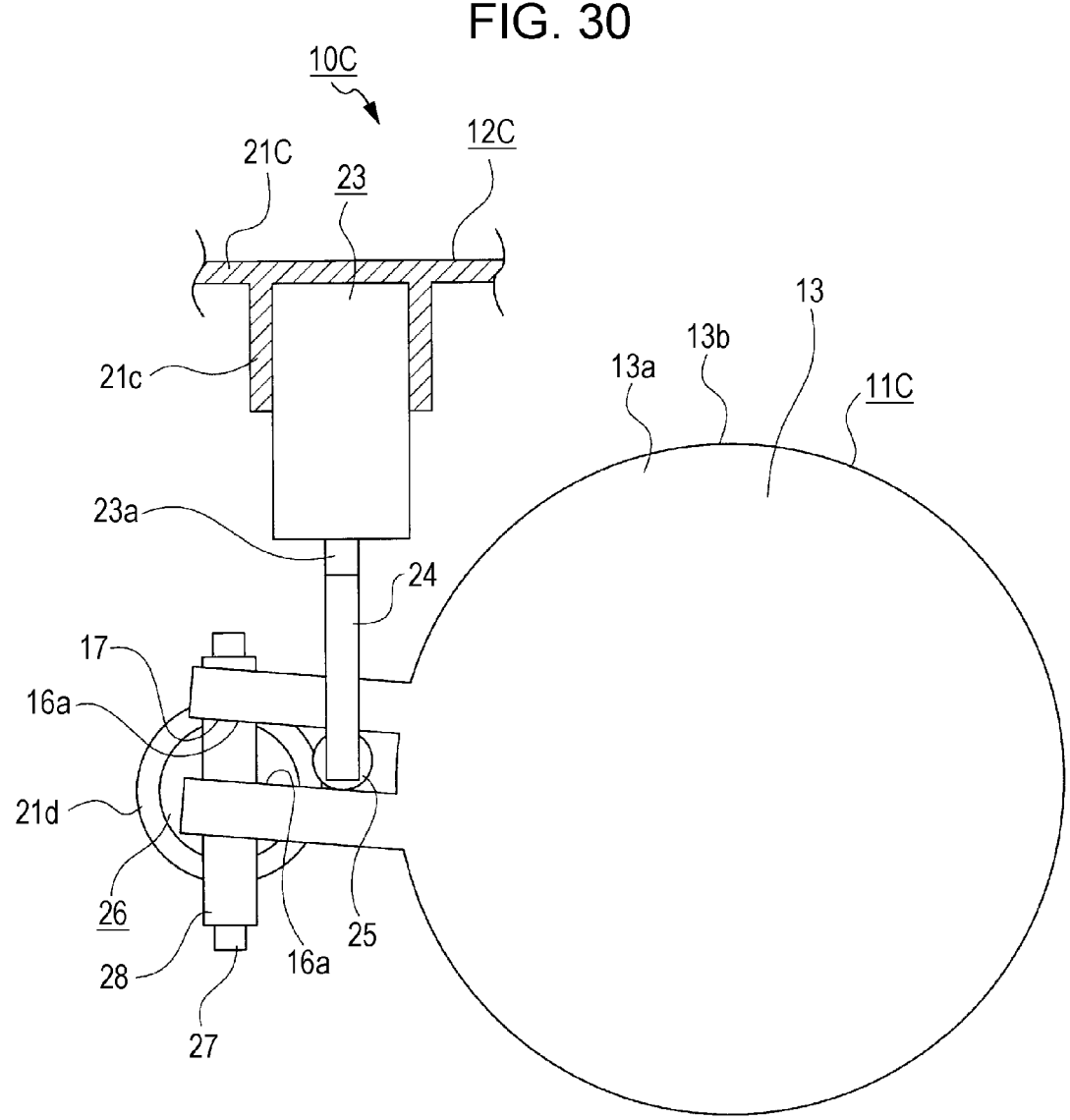
FIG. 30 is a schematic rear view illustrating an operation of the image blur correction device in a condition where the lens unit is rotated in the third direction together with FIG. 31.
Figure 31:
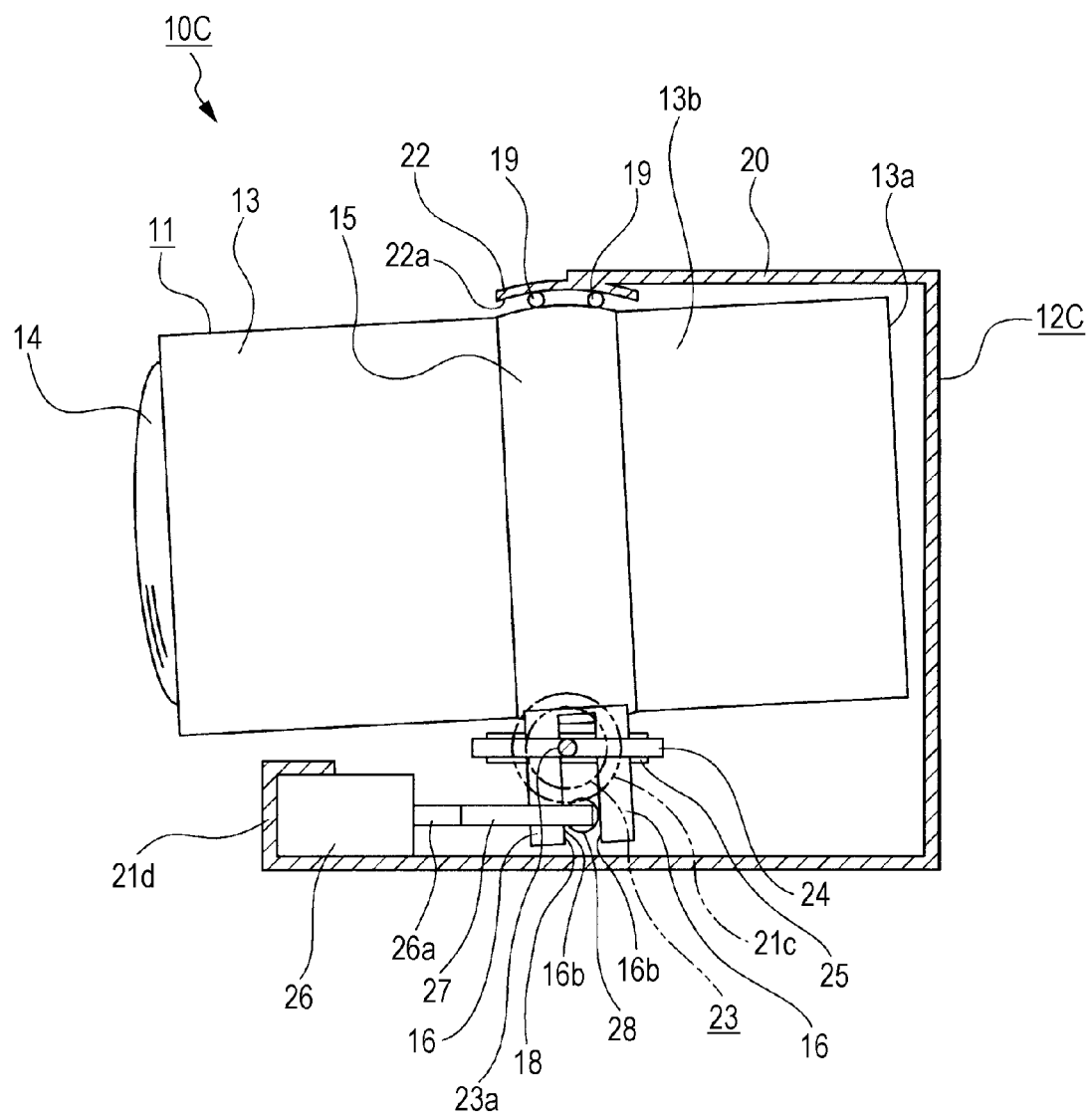
FIG. 31 is a schematic top plan view illustrating a condition where the lens unit is rotated in the second direction.

In a state where the blur correction operation is not performed, the image blur correction device 10C is at a reference position at which the device is not rotated in any one direction of the third direction and the second direction (refer to FIGS. 28 and 29).

First, a blur correction operation in the third direction (rolling direction) in the image blur correction device 10C will be described.

In the image blur correction device 10C, when the first driving shaft 23a of the first actuator 23 is moved upward and the first driving portion 25 is moved upward, the first surfaces 16a and 16a to be operated, which face toward the lower side of the driven portions 16 and 16, are pressed by the first driving portion 25, and the first driving portion 25 slides on the first surfaces 16a, 16a, . . . to be operated while rotating. As a result, the lens unit 11C is rotated toward one side in the third direction about the third fulcrum axis S3 as a fulcrum (refer to FIG. 30).

At this time, the second driving portion 28 of the second actuator 26 is moved downward relative to the driven portions 16, 16, . . . in the second movement allowance section 18, in accordance with the rotation of the lens unit 11C in the third direction.

When the lens unit 11C is rotated in the third direction in such a manner, in accordance with the rotation of the lens unit 11C, the second driving portion 28 is moved downward relative to the driven portions 16, 16, . . . in the second movement allowance section 18. Hence, it is difficult for unnecessary load to be applied to the lens unit 11C from the second driving portion 28. Accordingly, the lens unit 11C is smoothly rotated in the third direction.

On the other hand, in the image blur correction device 10C, when the first driving shaft 23a of the first actuator 23 is moved downward and the first driving portion 25 is moved downward, the first surfaces 16a and 16a to be operated, which face toward the upper side of the driven portions 16 and 16, are pressed by the first driving portion 25, and the first driving portion 25 slides on the first surfaces 16a, 16a, . . . to be operated while rotating. As a result, the lens unit 11C is rotated toward the other side in the third direction about the third fulcrum axis S3 as a fulcrum.

At this time, the second driving portion 28 of the second actuator 26 is moved upward relative to the driven portions 16, 16, . . . in the second movement allowance section 18, in accordance with the rotation of the lens unit 11C in the third direction.

When the lens unit 11C is rotated in the third direction in such a manner, in accordance with the rotation of the lens unit 11C, the second driving portion 28 is moved upward relative to the driven portions 16, 16, . . . in the second movement allowance section 18. Hence, it is difficult for unnecessary load to be applied to the lens unit 11C from the second driving portion 28. Accordingly, the lens unit 11C is smoothly rotated in the third direction.

Next, a blur correction operation in the second direction (yawing direction) in the image blur correction device 10C will be described.

In the image blur correction device 10C, when the second driving shaft 26a of the second actuator 26 is moved backward and the second driving portion 28 is moved backward, the second surfaces 16b and 16b to be operated, which face toward the front side of the driven portions 16 and 16, are pressed by the second driving portion 28, and the second driving portion 28 slides on the second surfaces 16b, 16b, . . . to be operated while rotating. As a result, the lens unit 11C is rotated about the second fulcrum axis S2 as a fulcrum in the second direction in which the photography lens 14 faces slightly leftward (refer to FIG. 31).

At this time, the first driving portion 25 of the first actuator 23 is moved frontward relative to the driven portions 16, 16, . . . in the first movement allowance section 17, in accordance with the rotation of the lens unit 11C in the second direction.

When the lens unit 11C is rotated in the second direction in such a manner, in accordance with the rotation of the lens unit 11C, the first driving portion 25 is moved frontward relative to the driven portions 16, 16, . . . in the first movement allowance section 17. Hence, it is difficult for unnecessary load to be applied to the lens unit 11C from the first driving portion 25. Accordingly, the lens unit 11C is smoothly rotated in the second direction.

On the other hand, in the image blur correction device 10C, when the second driving shaft 26a of the second actuator 26 is moved frontward and the second driving portion 28 is moved frontward, the second surfaces 16b and 16b to be operated, which face toward the back side of the driven portions 16 and 16, are pressed by the second driving portion 28, and the second driving portion 28 slides on the second surfaces 16b, 16b, . . . to be operated while rotating. As a result, the lens unit 11C is rotated about the second fulcrum axis S2 as a fulcrum in the second direction in which the photography lens 14 faces slightly rightward.

At this time, the first driving portion 25 of the first actuator 23 is moved backward relative to the driven portions 16, 16, . . . in the first movement allowance section 17, in accordance with the rotation of the lens unit 11C in the second direction.

When the lens unit 11C is rotated in the second direction in such a manner, in accordance with the rotation of the lens unit 11C, the first driving portion 25 is moved backward relative to the driven portions 16, 16, . . . in the first movement allowance section 17. Hence, it is difficult for unnecessary load to be applied to the lens unit 11C from the first driving portion 25. Accordingly, the lens unit 11C is smoothly rotated in the second direction.

In addition, in the image blur correction device 10C, although not shown in the drawing, the lens unit 11C is configured to be rotatable in the second direction in a state where the lens unit 11C is rotated in the third direction from the reference position, and the lens unit 11C is configured to be rotatable in the third direction in a state where the lens unit 11C is rotated in the second direction from the reference position.

In the image blur correction device 10C, the respective sections for rotating the lens unit 11C are not disposed on the back side of the lens unit 11C, and thus it is possible to achieve reduction in the size thereof in the optical axis direction.

It should be noted that, even in the image blur correction device 10C according to the fourth embodiment, in a similar manner to the image blur correction device 10 according to the first embodiment, it is possible to apply the respective configurations of the first and second modified examples.

Further, the above example described the image blur correction device 10C in which the lens unit 11C is rotatable in the third and second directions. However, by providing driven portions which protrude upward from the upper end portion of the sliding portion 15 or downward from the lower end portion, it is possible to adopt a configuration in which the lens unit is rotated in the third and first directions.

Configuration (Fifth Embodiment) of Image Blur Correction Device

Hereinafter, a configuration of an image blur correction device 10D according to a fifth embodiment will be described (refer to FIGS. 32 to 34).

In addition, the image blur correction device 10D to be described later is different, compared with the image blur correction device 10 according to the first embodiment, in that a third actuator is disposed and the driven portions are formed to be rotatable. Accordingly, in the image blur correction device 10D, compared with the image blur correction device 10, only different parts will be described in detail, the other parts will be represented by numerals and signs the same as the numerals and signs used in the image blur correction device 10, and the description thereof will be omitted.

The image blur correction device 10D has a lens unit 11D and a fixing member 12D that supports the lens unit 11D.

The lens unit 11D has a barrel portion 13D and a lens group or a plurality of lenses arranged on the barrel portion 13D in the optical axis direction. A supporting hole 13c having a circular shape, which is open backward, is formed at the central portion of the rear surface 13a of the barrel portion 13D.

A rotating body 32 is provided on the lens unit 11D, and the rotating body 32 and the barrel portion 13D are mutually rotatable relative to each other. The rotating body 32 is formed of four first driven portions 16D, 16D, . . . which protrude backward from a discoid rotation base 33 and the rotation base 33. The first driven portions 16D, 16D, . . . are formed in, for example, a shape and a size the same as those of the driven portions 16, 16, . . . according to the first embodiment, and are arranged in a matrix so as to be separated in the vertical direction.

The rotation base 33 of the rotating body 32 is inserted into the supporting hole 13c, and is rotatable in the axial rotation direction of the optical axis P in the barrel portion 13D.

Second driven portions 34 and 34 protrude from the left end portion of the sliding portion 15. The second driven portions 34 and 34 are positioned to be separated in the vertical direction with the first fulcrum axis S1 interposed therebetween. The surfaces facing each other in the vertical direction are respectively formed as interference prevention surfaces 34a and 34a which have curved shapes. The central portions of the interference prevention surfaces 34a and 34a in the front-back direction protrude in directions opposite to each other so as to be closest to each other.

The space between the second driven portions 34 and 34 is formed as a third movement allowance section 35.

The fixing member 12D has a supporting portion 20 that has a substantially cylindrical shape, and an actuator attaching portion 21D that is provided to be continuous with the supporting portion 20.

The actuator attaching portion 21D has a first holding portion 21c that is provided at the lower back end portion, a second holding portion 21d that is provided at the right back end portion, and a third holding portion 21e that is provided at the upper end portion.

The first holding portion 21c of the actuator attaching portion 21D in the fixing member 12D holds a first actuator 23.

In the first actuator 23, when the first driving shaft 23a is moved in the vertical direction, the first connection portion 24 and the first driving portion 25 are integrally moved in the vertical direction in accordance with the movement of the first driving shaft 23a.

The second holding portion 21d of the actuator attaching portion 21D in the fixing member 12D holds a second actuator 26.

In the second actuator 26, when the second driving shaft 26a is moved in the horizontal direction, the second connection portion 27 and the second driving portion 28 are integrally moved in the horizontal direction in accordance with the movement of the second driving shaft 26a.

The third holding portion 21e of the fixing member 12D holds a third actuator 36. The third actuator 36 has a third driving shaft 36a that is movable in the vertical direction, and a third connection portion 37 is fixed onto the third driving shaft 36a. Accordingly, the third connection portion 37 is moved in the vertical direction in accordance with the movement of the third driving shaft 36a.

The third connection portion 37 is connected to the third driving shaft 36a. The third connection portion 37 is formed in a frame shape which is open in the horizontal direction, and the central portion of the upper end portion thereof in the front-back direction is connected to the lower end portion of the third driving shaft 36a.

The third driving portion 38, which has a cylindrical shape extending in the front-back direction, is supported on the lower end portion of the third connection portion 37 so as to be rotatable in the axial rotation direction.

The third driving portion 38 of the third actuator 36 is inserted into the third movement allowance section 35, and the third driving portion 38 is rotatable relative to the second driven portions 34 and 34 in the third movement allowance section 35.

In the third actuator 36, when the third driving shaft 36a is moved in the vertical direction, the third connection portion 37 and the third driving portion 38 are integrally moved in the vertical direction in accordance with the movement of the third driving shaft 36a.

The lens unit 11D is configured to be rotatable in the first direction (pitching direction) about the first fulcrum axis S1 as a fulcrum relative to the fixing member 12D. Further, the lens unit 11D is configured to be rotatable in the second direction (yawing direction) about the second fulcrum axis S2 as a fulcrum. Furthermore, the lens unit 11D is configured to be rotatable in the third direction (rolling direction) about the third fulcrum axis S3 (optical axis P) as a fulcrum.

Operation (Fifth Embodiment) of Image Blur Correction Device

Hereinafter, a blur correction operation in the image blur correction device 10D will be described (refer to FIGS. 32 to 40).

Figure 32:
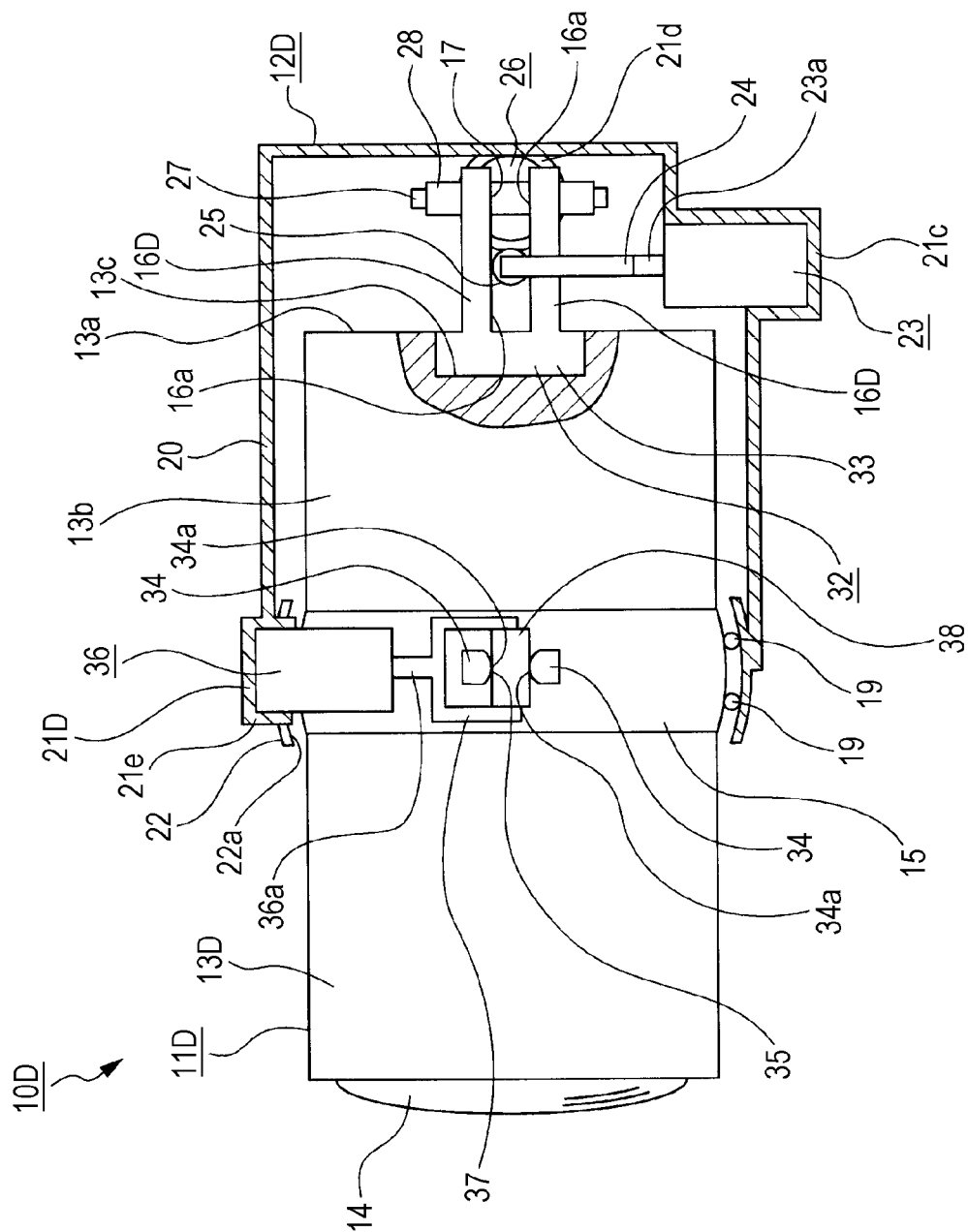
FIG. 32 is a schematic side view illustrating an image blur correction device according to a fifth embodiment together with FIGS. 33 to 42.
Figure 33:
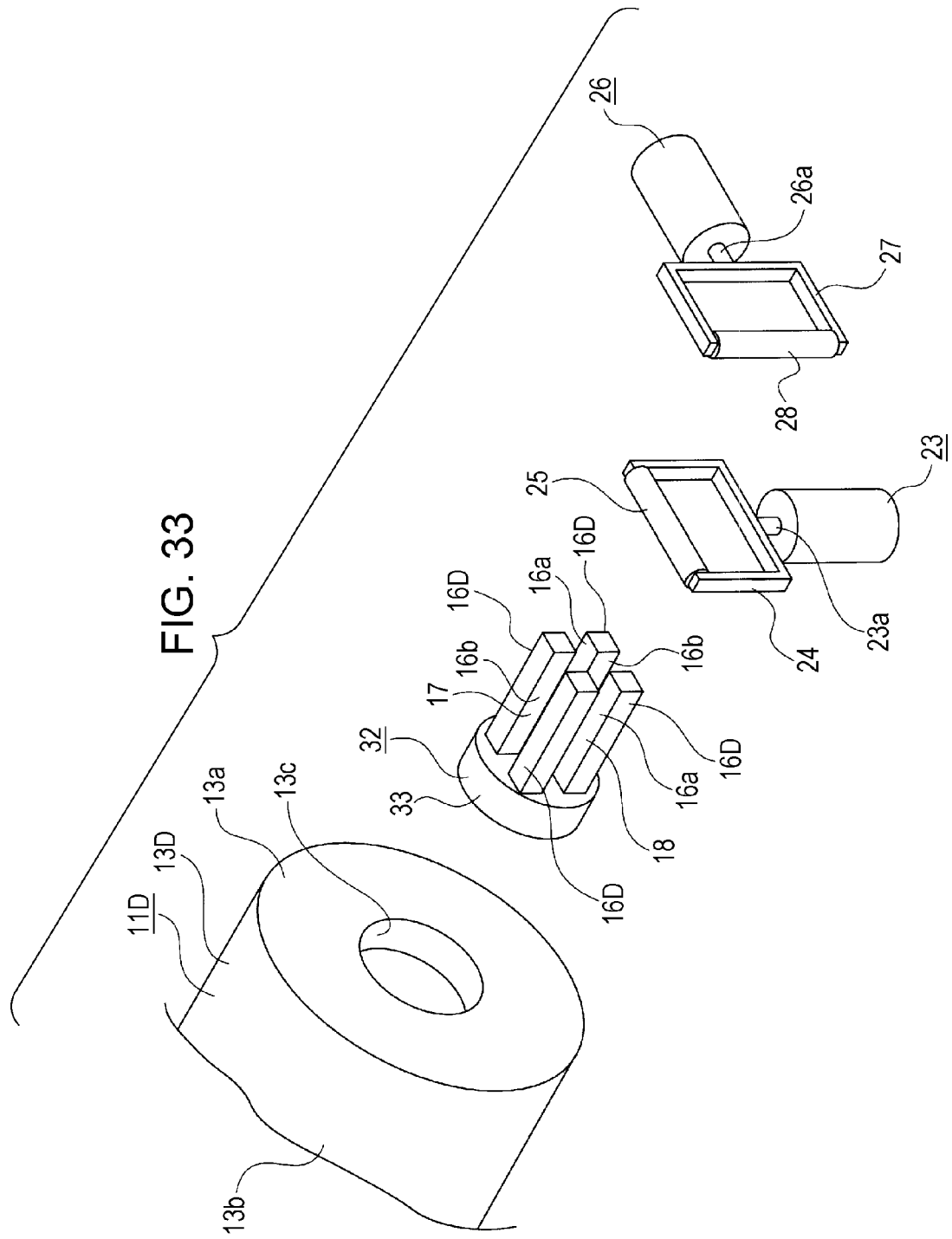
FIG. 33 is a schematic exploded perspective view of the image blur correction device.
Figure 34:
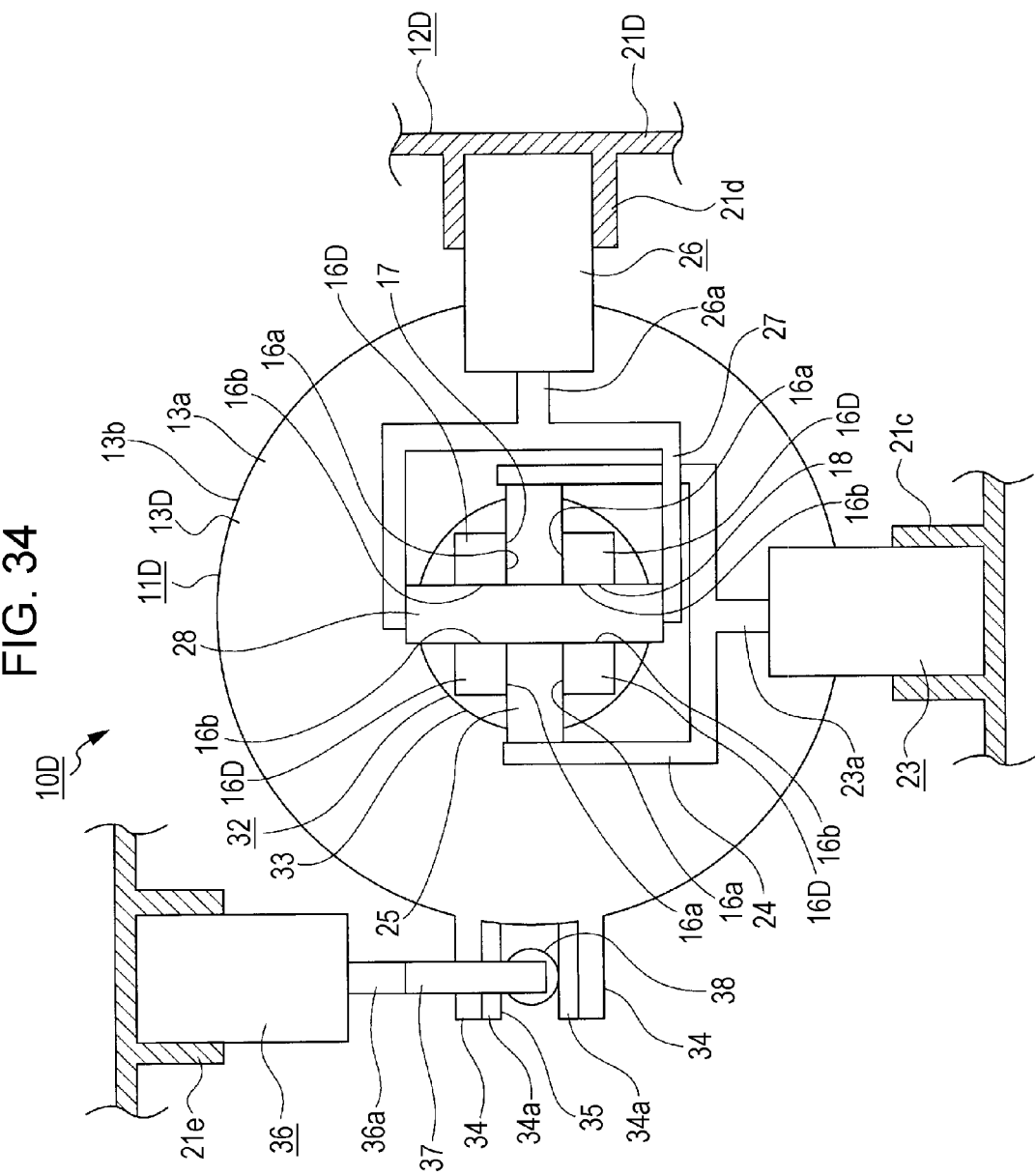
FIG. 34 is a schematic rear view of the image blur correction device.

In a state where the blur correction operation is not performed, the image blur correction device 10D is at a reference position at which the device is not rotated in any one direction of the second direction and the third direction (refer to FIGS. 32 and 34).

Figure 35:
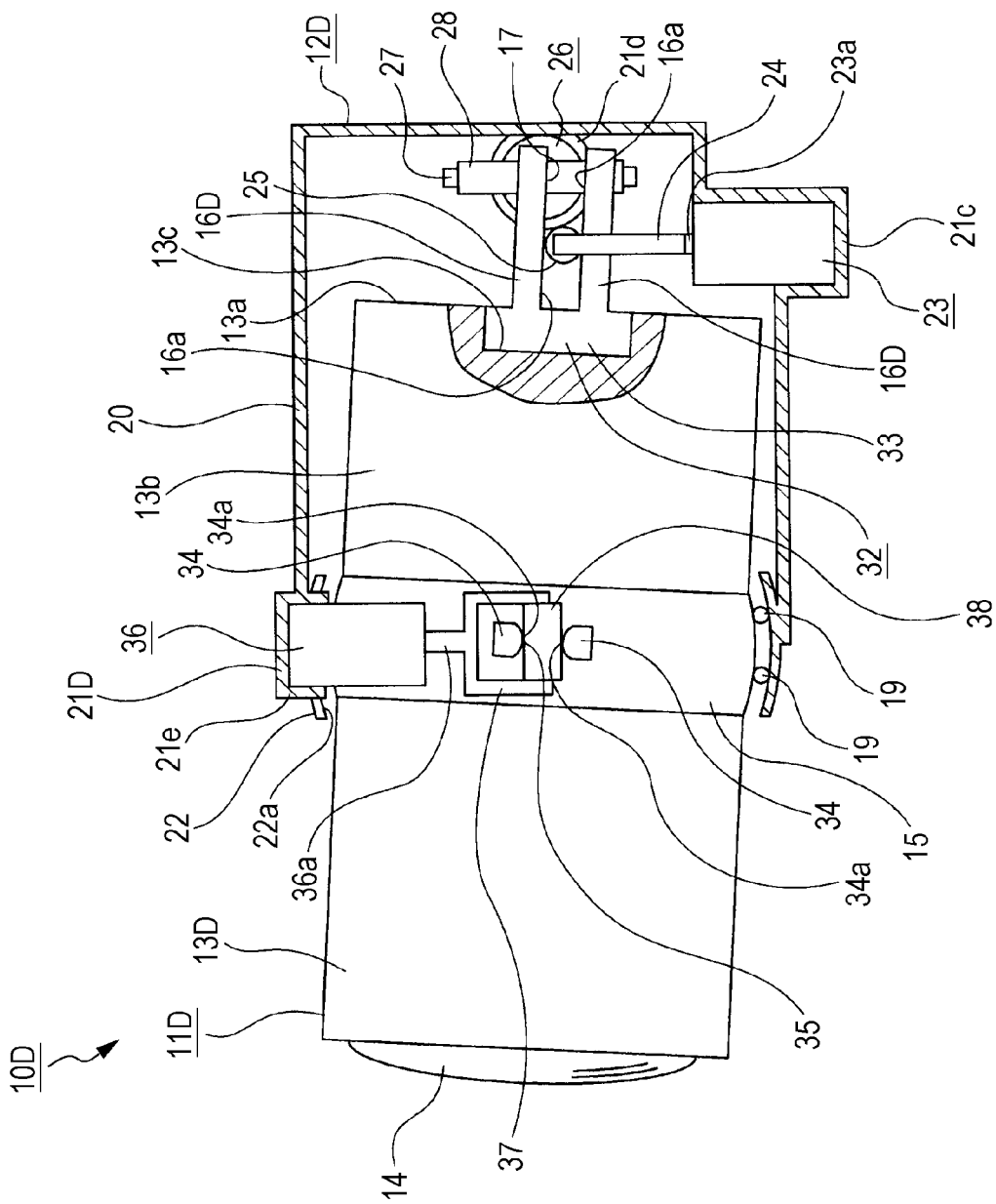
FIG. 35 is a schematic side view illustrating an operation of the image blur correction device in a condition where the lens unit is rotated toward one side in the first direction together with FIGS. 36 to 40.
Figure 36:
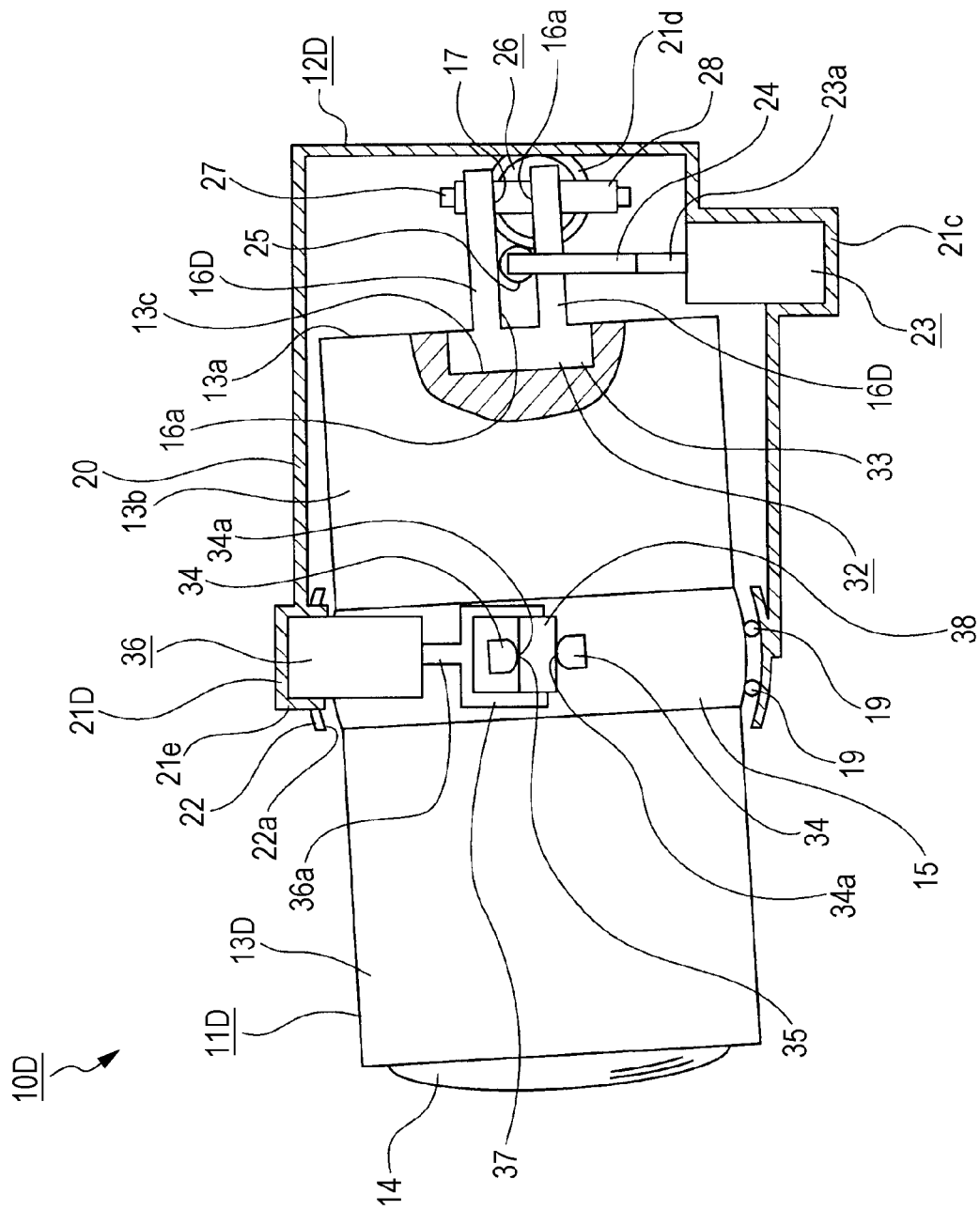
FIG. 36 is a schematic side view illustrating a condition where the lens unit is rotated toward the other side in the first direction.

First, a blur correction operation in the first direction (pitching direction) in the image blur correction device 10D will be described (refer to FIGS. 35 and 36).

In the image blur correction device 10D, when the first driving shaft 23a of the first actuator 23 is moved downward and the first driving portion 25 is moved downward, the first surfaces 16a and 16a to be operated, which face toward the upper side of the first driven portions 16D and 16D, are pressed by the first driving portion 25, and the first driving portion 25 slides on the first surfaces 16a, 16a, . . . to be operated while rotating. As a result, the lens unit 11D is rotated about the first fulcrum axis S1 as a fulcrum in the first direction in which the photography lens 14 faces slightly upward (refer to FIG. 35).

At this time, the second driving portion 28 of the second actuator 26 is moved upward relative to the first driven portions 16D, 16D, . . . in the second movement allowance section 18, in accordance with the rotation of the lens unit 11D in the first direction.

Simultaneously, the second driven portions 34 and 34 come into contact with the third driving portion 38 of the third actuator 36. Thus, in accordance with the rotation of the lens unit 11D in the first direction, the third driving portion 38 is oblique to the second driven portions 34 and 34 in the vertical direction. However, the interference prevention surfaces 34a and 34a prevent the third driving portion 38 and the second driven portions 34 and 34 from interfering with each other.

When the lens unit 11D is rotated in the first direction in such a manner, in accordance with the rotation of the lens unit 11D, the second driving portion 28 is moved upward relative to the first driven portions 16D, 16D, . . . in the second movement allowance section 18, and the interference prevention surfaces 34a and 34a prevent the third driving portion 38 and the second driven portions 34 and 34 from interfering with each other. Hence, it is difficult for unnecessary load to be applied to the lens unit 11D from the second driving portion 28 and the third driving portion 38. Accordingly, the lens unit 11D is smoothly rotated in the first direction.

On the other hand, in the image blur correction device 10D, when the first driving shaft 23a of the first actuator 23 is moved upward and the first driving portion 25 is moved upward, the first surfaces 16a and 16a to be operated, which face toward the lower side of the first driven portions 16D and 16D, are pressed by the first driving portion 25, and the first driving portion 25 slides on the first surfaces 16a, 16a, . . . to be operated while rotating. As a result, the lens unit 11D is rotated about the first fulcrum axis S1 as a fulcrum in the first direction in which the photography lens 14 faces slightly downward (refer to FIG. 36).

At this time, the second driving portion 28 of the second actuator 26 is moved downward relative to the first driven portions 16D, 16D, . . . in the second movement allowance section 18, in accordance with the rotation of the lens unit 11D in the first direction.

Simultaneously, the second driven portions 34 and 34 come into contact with the third driving portion 38 of the third actuator 36. Thus, in accordance with the rotation of the lens unit 11D in the first direction, the third driving portion 38 is oblique to the second driven portions 34 and 34 in the vertical direction. However, the interference prevention surfaces 34a and 34a prevent the third driving portion 38 and the second driven portions 34 and 34 from interfering with each other.

When the lens unit 11D is rotated in the first direction in such a manner, in accordance with the rotation of the lens unit 11D, the second driving portion 28 is moved downward relative to the first driven portions 16D, 16D, . . . in the second movement allowance section 18, and the interference prevention surfaces 34a and 34a prevent the third driving portion 38 and the second driven portions 34 and 34 from interfering with each other. Hence, it is difficult for unnecessary load to be applied to the lens unit 11D from the second driving portion 28 and the third driving portion 38. Accordingly, the lens unit 11D is smoothly rotated in the first direction.

Figure 37:
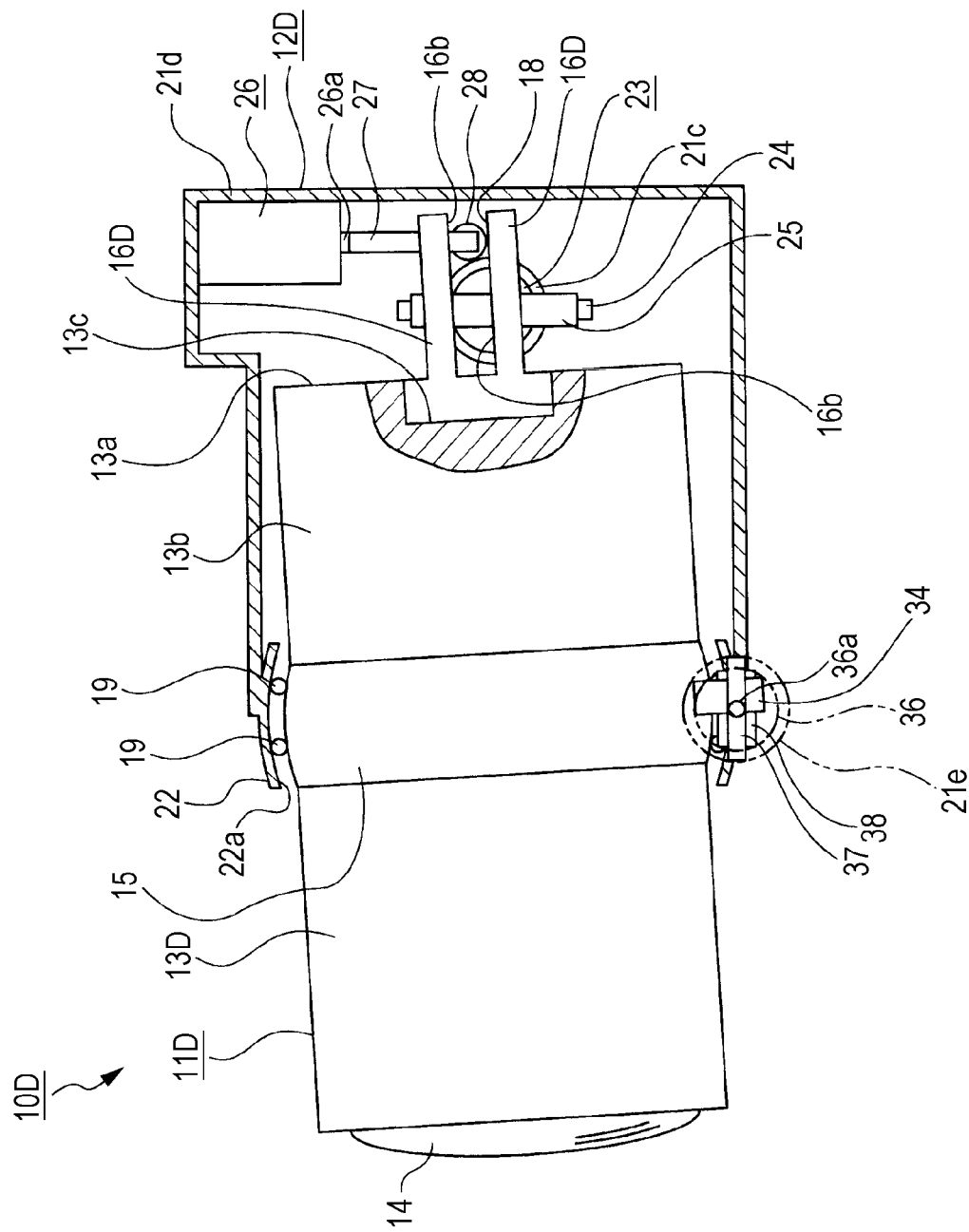
FIG. 37 is a schematic top plan view illustrating a condition where the lens unit is rotated toward one side in the second direction.
Figure 38:
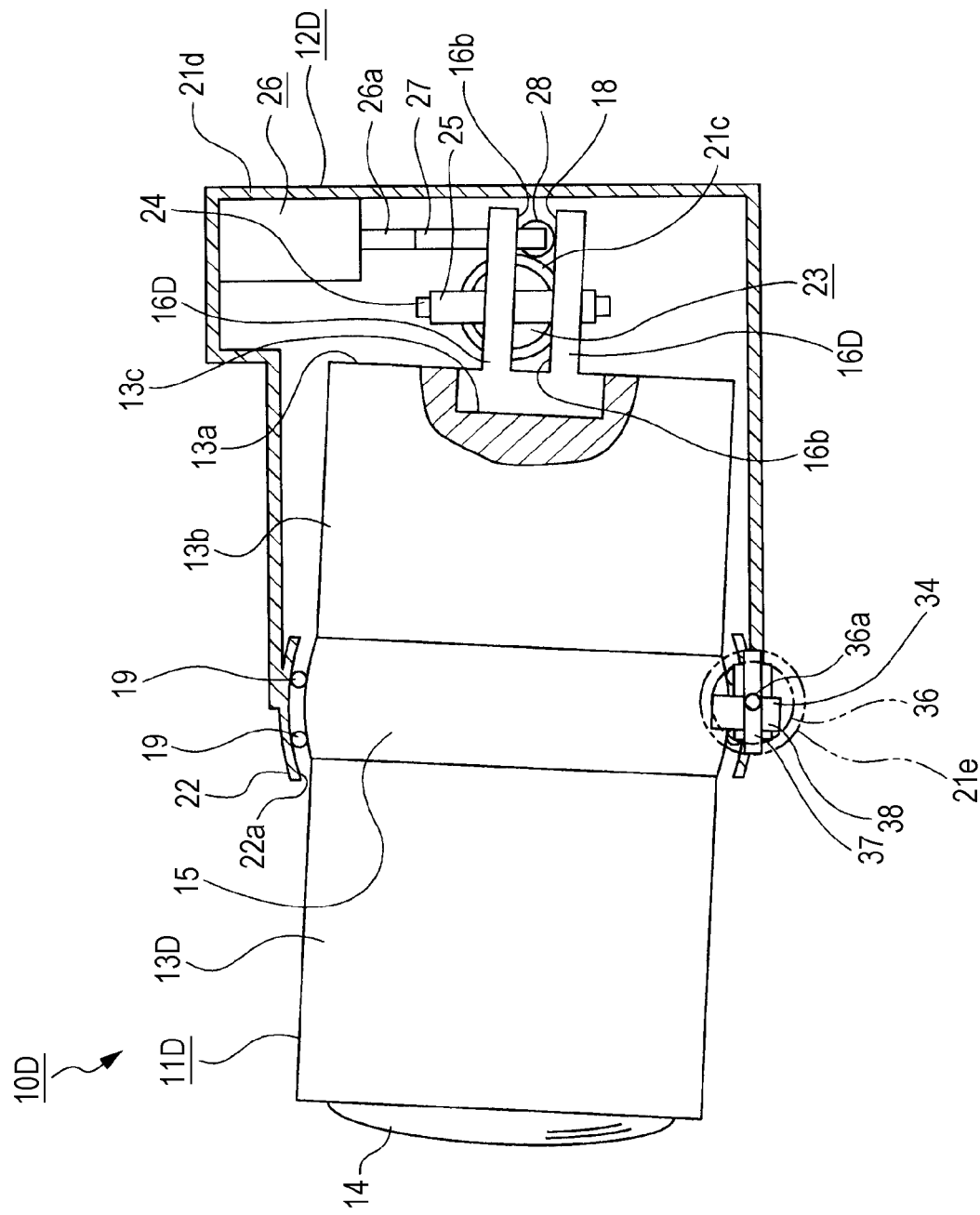
FIG. 38 is a schematic top plan view illustrating a condition where the lens unit is rotated toward the other side in the second direction.

Next, a blur correction operation in the second direction (yawing direction) in the image blur correction device 10D will be described (refer to FIGS. 37 and 38).

In the image blur correction device 10D, when the second driving shaft 26a of the second actuator 26 is moved rightward and the second driving portion 28 is moved rightward, the second surfaces 16b and 16b to be operated, which face toward the left side of the first driven portions 16D and 16D, are pressed by the second driving portion 28, and the second driving portion 28 slides on the second surfaces 16b, 16b, . . . to be operated while rotating. As a result, the lens unit 11D is rotated about the second fulcrum axis S2 as a fulcrum in the second direction in which the photography lens 14 faces slightly leftward.

At this time, the first driving portion 25 of the first actuator 23 is moved leftward relative to the first driven portions 16D, 16D, . . . in the first movement allowance section 17, in accordance with the rotation of the lens unit 11D in the second direction.

Simultaneously, the third driving portion 38 of the third actuator 36 is moved frontward relative to the second driven portions 34 and 34 in the third movement allowance section 35, in accordance with the rotation of the lens unit 11D in the second direction.

When the lens unit 11D is rotated in the second direction in such a manner, in accordance with the rotation of the lens unit 11D, the first driving portion 25 is moved leftward relative to the first driven portions 16D, 16D, . . . in the first movement allowance section 17, and the third driving portion 38 is moved frontward relative to the second driven portions 34 and 34 in the third movement allowance section 35. Hence, it is difficult for unnecessary load to be applied to the lens unit 11D from the first driving portion 25 and the third driving portion 38. Accordingly, the lens unit 11D is smoothly rotated in the second direction.

On the other hand, in the image blur correction device 10D, when the second driving shaft 26a of the second actuator 26 is moved leftward and the second driving portion 28 is moved leftward, the second surfaces 16b and 16b to be operated, which face toward the right side of the first driven portions 16D and 16D, are pressed by the second driving portion 28, and the second driving portion 28 slides on the second surfaces 16b, 16b, . . . to be operated while rotating. As a result, the lens unit 11D is rotated about the second fulcrum axis S2 as a fulcrum in the second direction in which the photography lens 14 faces slightly rightward.

At this time, the first driving portion 25 of the first actuator 23 is moved rightward relative to the first driven portions 16D, 16D, . . . in the first movement allowance section 17, in accordance with the rotation of the lens unit 11D in the second direction.

Simultaneously, the third driving portion 38 of the third actuator 36 is moved backward relative to the second driven portions 34 and 34 in the third movement allowance section 35, in accordance with the rotation of the lens unit 11D in the second direction.

When the lens unit 11D is rotated in the second direction in such a manner, in accordance with the rotation of the lens unit 11D, the first driving portion 25 is moved rightward relative to the first driven portions 16D, 16D, . . . in the first movement allowance section 17, and the third driving portion 38 is moved backward relative to the second driven portions 34 and 34 in the third movement allowance section 35. Hence, it is difficult for unnecessary load to be applied to the lens unit 11D from the first driving portion 25 and the third driving portion 38. Accordingly, the lens unit 11D is smoothly rotated in the second direction.

Figure 39:
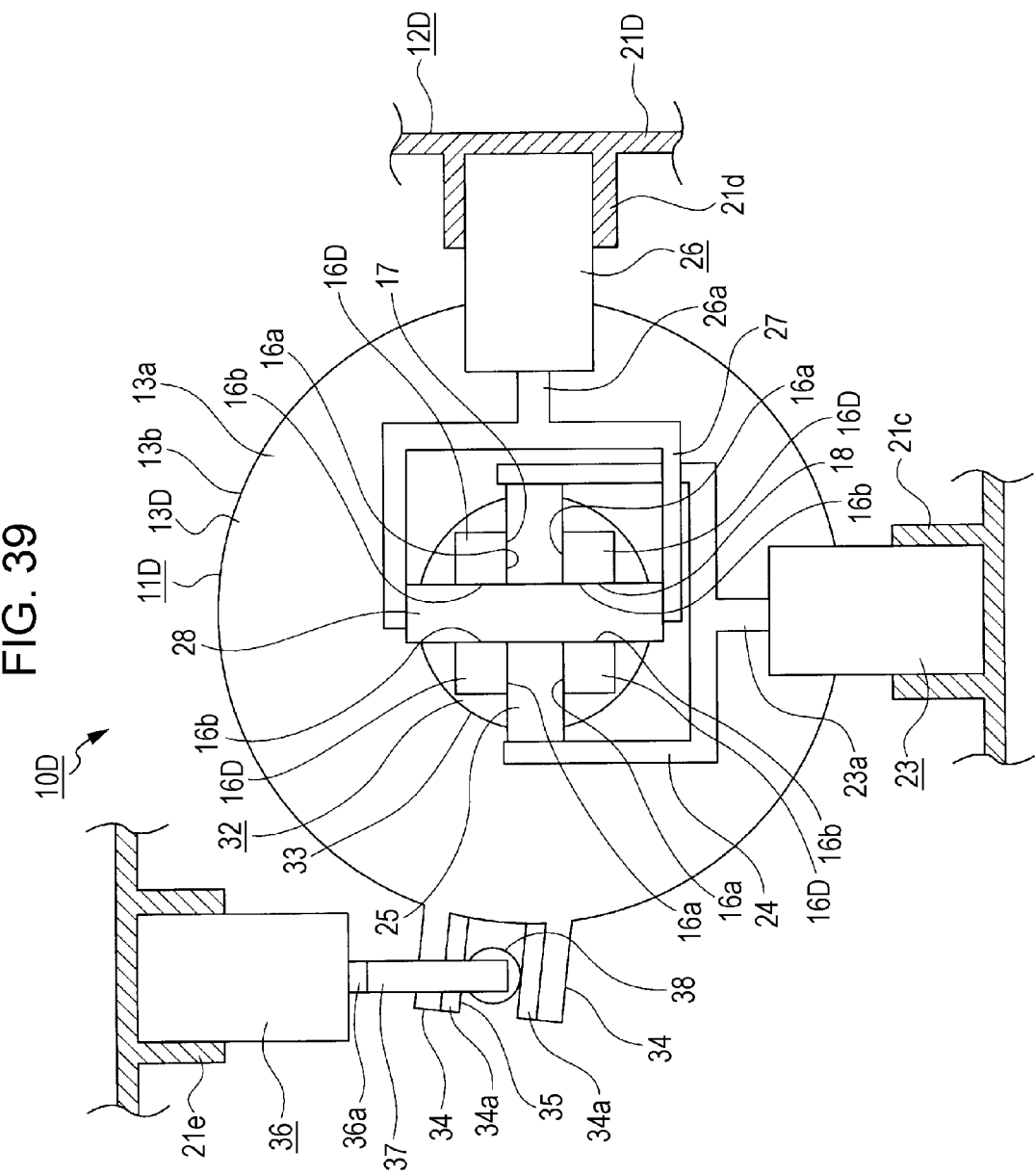
FIG. 39 is a schematic rear view illustrating a condition where the lens unit is rotated toward one side in the third direction.
Figure 40:
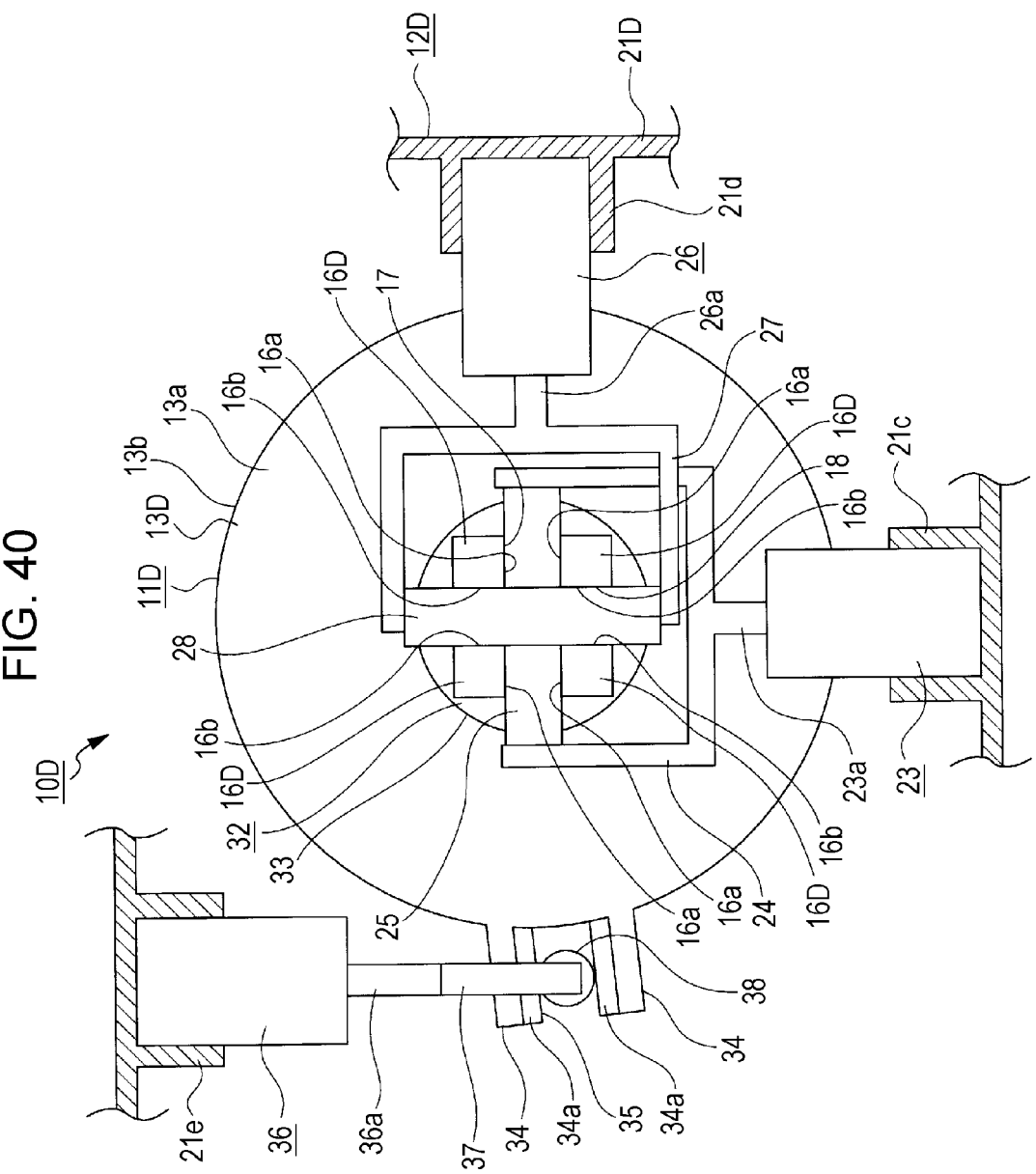
FIG. 40 is a schematic rear view illustrating a condition where the lens unit is rotated toward the other side in the third direction.

Subsequently, a blur correction operation in the third direction (rolling direction) in the image blur correction device 10D will be described (refer to FIGS. 39 and 40).

In the image blur correction device 10D, when the third driving shaft 36a of the third actuator 36 is moved upward and thereby the third driving portion 38 is moved upward, the second driven portions 34 and 34 are moved upward in accordance with the movement of the third driving portion 38. Thereby, the lens unit 11D is rotated in the third direction about the third fulcrum axis S3 as a fulcrum such that the photography lens 14 is rotated toward one side (refer to FIG. 39).

At this time, the first driving portion 25 of the first actuator 23 is inserted into the first movement allowance section 17, and the second driving portion 28 of the second actuator 26 is inserted into the second movement allowance section 18. Since rotation of the rotating body 32 is regulated, the lens unit 11D is rotated in the third direction relative to the rotating body 32.

When the lens unit 11D is rotated in the third direction in such a manner, the lens unit 11D is rotated relative to the rotating body 32. Hence, it is difficult for unnecessary load to be applied to the lens unit 11D from the first driving portion 25 and the second driving portion 28. Accordingly, the lens unit 11D is smoothly rotated in the third direction.

In the image blur correction device 10D, when the third driving shaft 36a of the third actuator 36 is moved downward and thereby the third driving portion 38 is moved downward, the second driven portions 34 and 34 are moved downward in accordance with the movement of the third driving portion 38. Thereby, the lens unit 11D is rotated in the third direction about the third fulcrum axis S3 as a fulcrum such that the photography lens 14 is rotated toward the other side (refer to FIG. 40).

At this time, the first driving portion 25 of the first actuator 23 is inserted into the first movement allowance section 17, and the second driving portion 28 of the second actuator 26 is inserted into the second movement allowance section 18. Since rotation of the rotating body 32 is regulated, the lens unit 11D is rotated in the third direction relative to the rotating body 32.

When the lens unit 11D is rotated in the third direction in such a manner, the lens unit 11D is rotated relative to the rotating body 32. Hence, it is difficult for unnecessary load to be applied to the lens unit 11D from the first driving portion 25 and the second driving portion 28. Accordingly, the lens unit 11D is smoothly rotated in the third direction.

In addition, in the image blur correction device 10D, although not shown in the drawing, the lens unit 11D is configured to be rotatable in the second direction in a state where the lens unit 11D is rotated in the first direction from the reference position, and the lens unit 11D is configured to be rotatable in the first direction in a state where the lens unit 11D is rotated in the second direction from the reference position.

Further, in the image blur correction device 10D, although not shown in the drawing, the lens unit 11D is configured to be rotatable in the third direction in a state where the lens unit 11D is rotated in the first direction from the reference position, and the lens unit 11D is configured to be rotatable in the first direction in a state where the lens unit 11D is rotated in the third direction from the reference position.

Furthermore, in the image blur correction device 10D, although not shown in the drawing, the lens unit 11D is configured to be rotatable in the third direction in a state where the lens unit 11D is rotated in the second direction from the reference position, and the lens unit 11D is configured to be rotatable in the second direction in a state where the lens unit 11D is rotated in the third direction from the reference position.

It should be noted that, even in the image blur correction device 10D according to the fifth embodiment, in a similar manner to the image blur correction device 10 according to the first embodiment, it is possible to apply the respective configurations of the first and second modified examples.

As described above, in the image blur correction device 10D, the lens unit 11D is rotated in the third direction about the third fulcrum axis S3 as a fulcrum. Hence, it is possible to improve functionality, and it is possible to simplify the structure and achieve reduction in the size of the device.

Further, when the lens unit 11D is rotated, the rotating body 32 having the first driven portions 16D, 16D, . . . is rotatable in the third direction relative to the barrel portion 13D. Hence, the first driven portions 16D, 16D, . . . do not regulate the rotation of the lens unit 11D in the third direction, and it is possible to secure a smooth rotation operation of the lens unit 11D.

Furthermore, the third driving portion 38 is rotatable in the axial rotation direction of the third fulcrum axis S3. Hence, a sliding load of the third driving portion 38 to the second driven portions 34 and 34 is reduced, and thus it is possible to secure a further smooth rotation operation of the lens unit 11D in the third direction.

Figure 41:
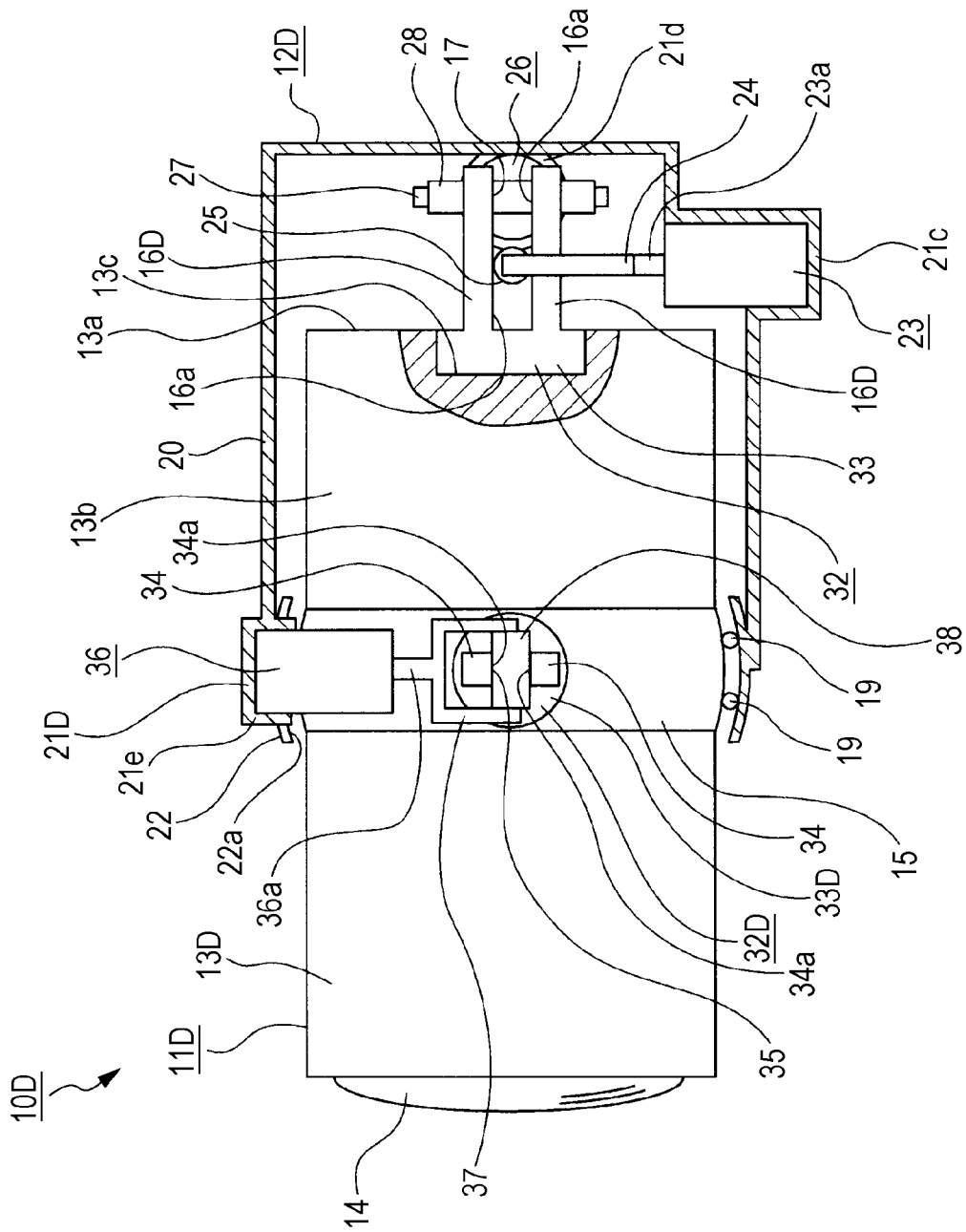
FIG. 41 is a schematic side view illustrating another example of the fifth embodiment together with FIG. 42.

In addition, in the image blur correction device 10D according to the fifth embodiment, it is possible to adopt a configuration in which the second driven portions 34 and 34 are rotatable in the axial rotation direction of the first fulcrum axis S1 relative to the lens unit 11D (refer to FIG. 41).

That is, the second driven portions 34 and 34 protrude from a discoid rotation base 33D, and a rotating body 32D is formed of the rotation base 33D and the second driven portions 34 and 34. The rotating body 32D is configured to be rotatable in the axial rotation direction of the first fulcrum axis S1 relative to the lens unit 11D. In addition, when the rotating body 32D is used, the interference prevention surfaces 34a and 34a do not have to be provided on the second driven portions 34 and 34.

Figure 42:
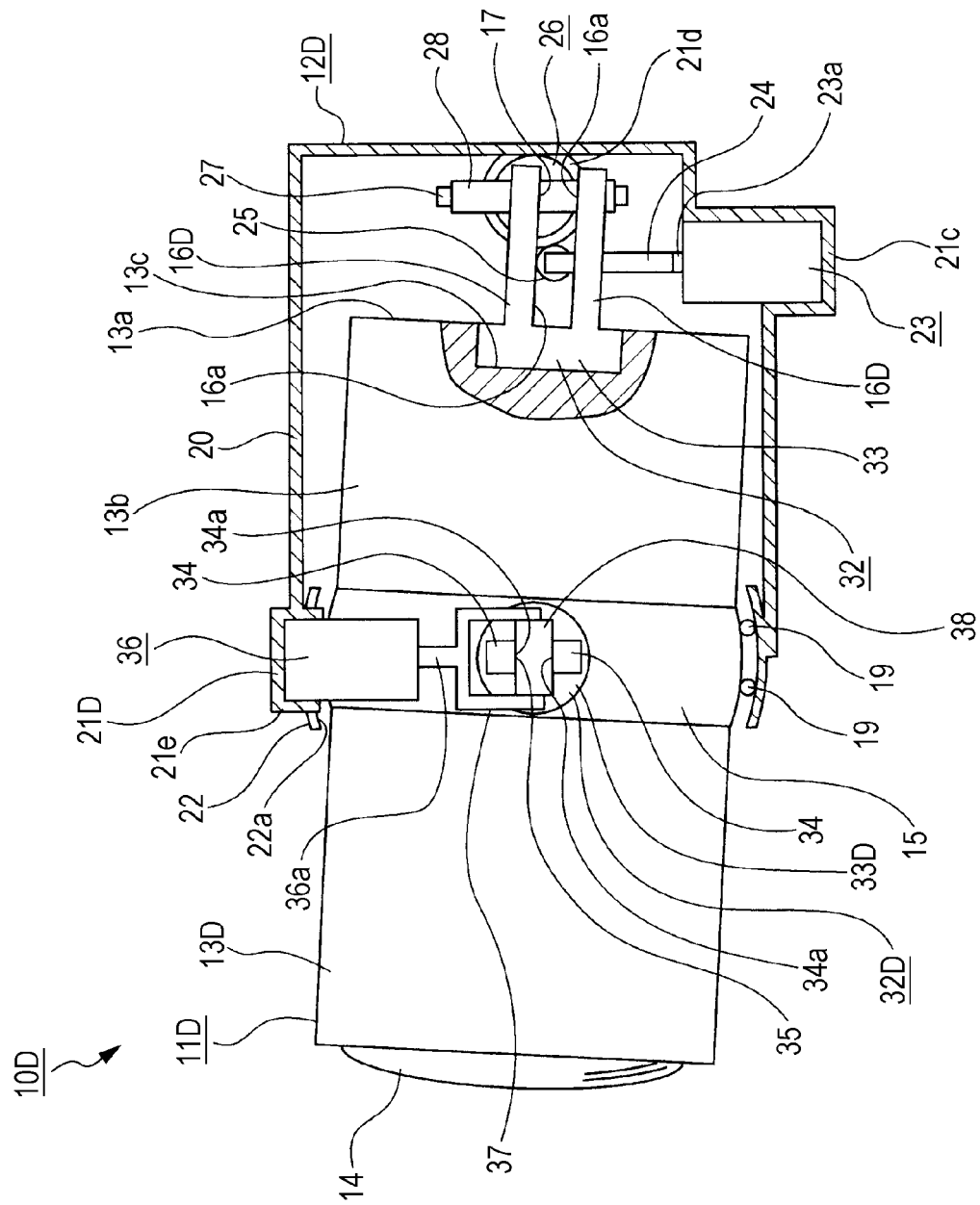
FIG. 42 is a schematic side view illustrating a condition where the lens unit is rotated in the first direction.

With such a configuration, the first driving shaft 23a of the first actuator 23 is moved in the vertical direction, the first driving portion 25 is moved in the vertical direction, and the lens unit 11D is rotated in the first direction. In this case, the rotating body 32D is rotated about the first fulcrum axis S1 as a fulcrum relative to the lens unit 11D (refer to FIG. 42). Accordingly, when the lens unit 11D is rotated in the first direction, it is difficult for unnecessary load to be applied to the lens unit 11D from the third driving portion 38. Hence, it is possible to smoothly perform the rotation operation of the lens unit 11D in the first direction.

In addition, it is also possible to adopt a configuration in which the rotating body 32D is rotatable in the axial rotation direction of the second fulcrum axis S2 relative to the lens unit 11D by providing the rotating body 32D at the upper or lower end portion of the lens unit 11D. In this case, when the lens unit 11D is rotated in the second direction, the rotating body 32D is rotated about the second fulcrum axis S2 as a fulcrum relative to the lens unit 11D. Hence, it is possible to smoothly perform the rotation operation of the lens unit 11D in the second direction.

Modified Example of Image Blur Correction Device (Fifth Embodiment)

Next, a third modified example of the fifth embodiment will be described (refer to FIGS. 43 to 45).

Third Modified Example

Figure 43:
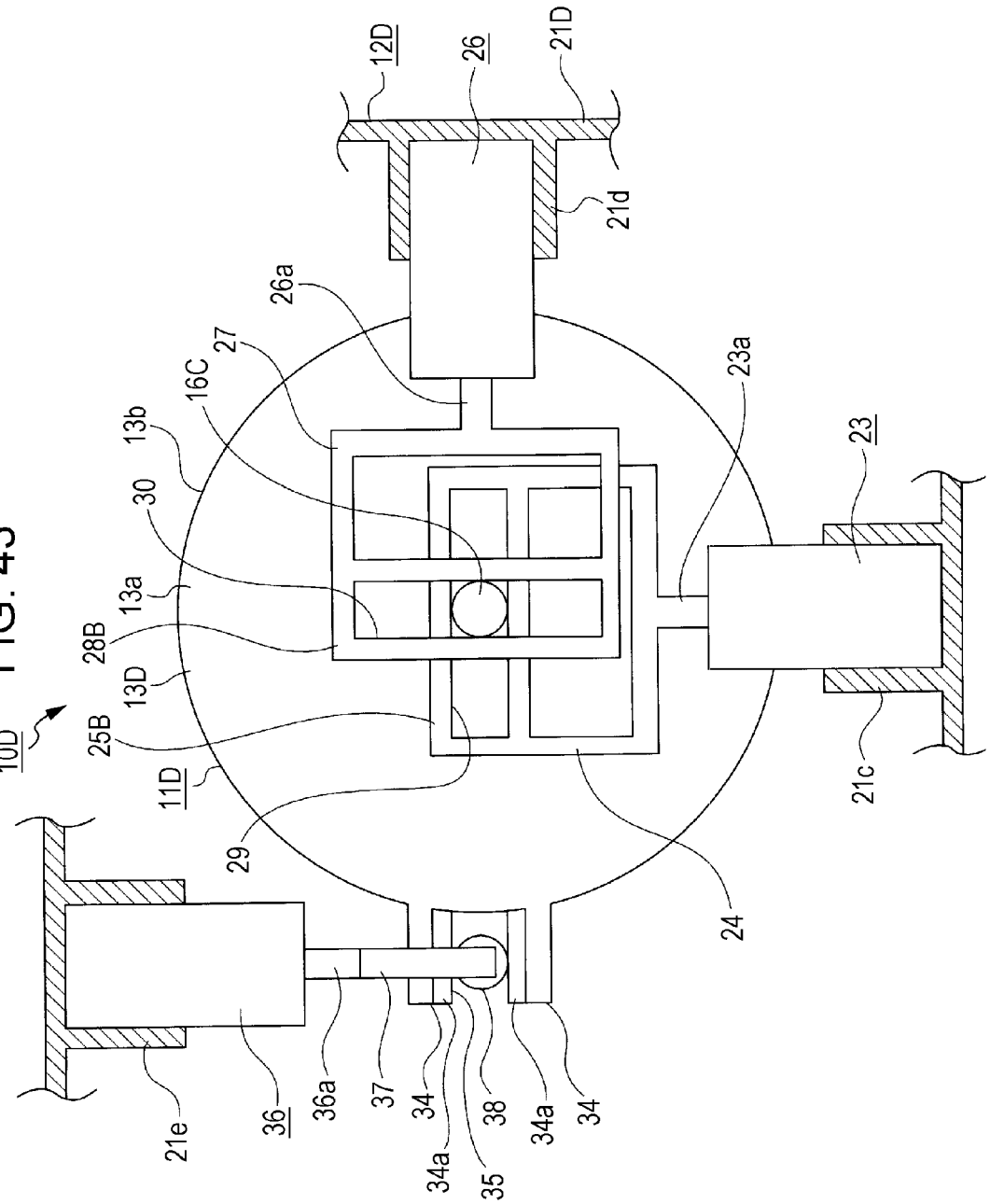
FIG. 43 is a schematic rear view illustrating a third modified example together with FIGS. 44 and 45.

The third modified example is an example of using the first driving portion 25B and the second driving portion 28B shown in the second modified example of the image blur correction device 10D according to the fifth embodiment (refer to FIG. 43).

In the third modified example, a driven portion 16C is used, and the driven portion 16C is formed as, for example, a round shank shape. The driven portion 16C protrudes backward from the central portion of the rear surface 13a of the barrel portion 13. Further, in the third modified example, the rotating body 32 is not provided.

In the third modified example, the driven portion 16C having a round shank shape is used. Hence, in the image blur correction device 10D, the third driving shaft 36a of the third actuator 36 is moved in the vertical direction, and the lens unit 11D is rotated in the third direction. In this case, the barrel portion 13D and the driven portion 16C are integrally rotated in the third direction without regulating the rotation of the lens unit 11D.

Accordingly, it is possible to simplify the structure, and then it is possible to smoothly perform the rotation operation of the lens unit 11D in the third direction.

In the above described example, the driven portion 16C having the round shank shape is used. However, for example, instead of the driven portion 16C, it is also possible to use a driven portion 16X or a driven portion 16Y (refer to FIGS. 44 and 45).

Figure 44:
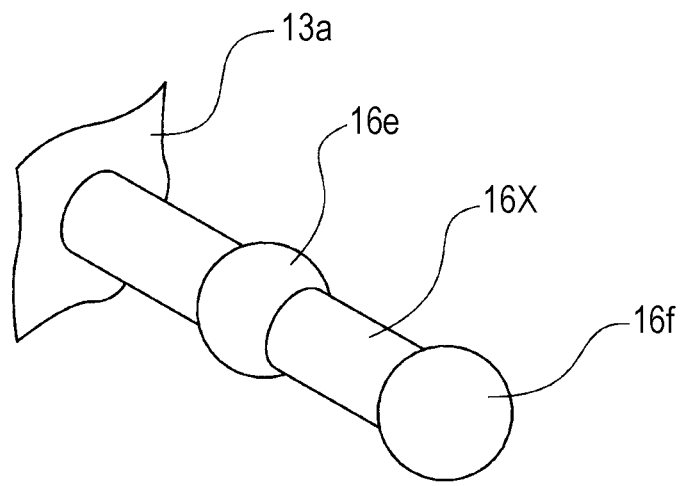
FIG. 44 is a perspective view of a driven portion.

In the driven portion 16X, a first surface 16e to be operated is formed in a spherical shape at the central portion in the length direction, and a second surface 16f to be operated is formed in a spherical shape at the tip portion (refer to FIG. 44).

When the driven portion 16X is used, the first driving portion 25B and the second driving portion 28B constantly come into point contact with the driven portion 16X at the time of the rotation of the lens unit 11D. Hence, sliding loads of the first driving portion 25B and the second driving portion 28B to the driven portion 16X are reduced, and it is possible to secure a smooth rotation operation of the lens unit 11D in the first, second, and third directions.

Figure 45:
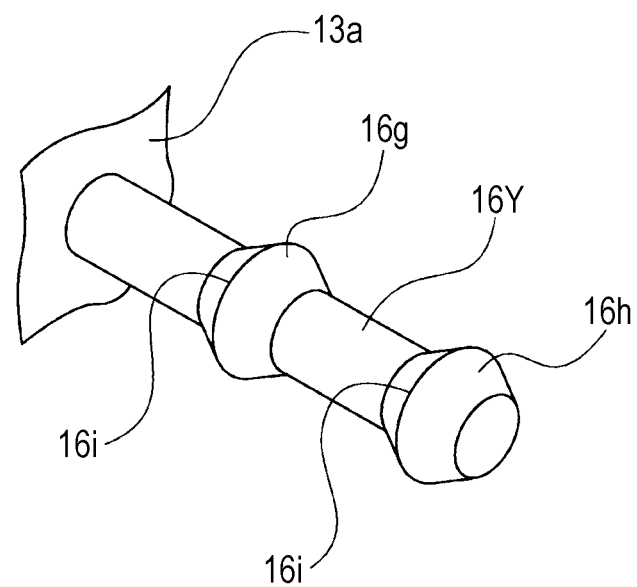
FIG. 45 is a perspective view of another driven portion.

In the driven portion 16Y, a first surface 16g to be operated is formed at the central portion in the length direction, and a second surface 16h to be operated is formed at the tip portion (refer to FIG. 45).

The central portions of the first surface 16g to be operated and the second surface 16h to be operated in the front-back direction are respectively formed as large diameter lines 16i and 16i of which the diameters are largest.

When the driven portion 16Y is used, the first driving portion 25B and the second driving portion 28B constantly come into point contact with the large diameter lines 16i and 16i of the driven portion 16Y at the time of rotation of the lens unit 11D. Hence, sliding loads of the first driving portion 25B and the second driving portion 28B to the driven portion 16Y are reduced, and it is possible to secure a smooth rotation operation of the lens unit 11D in the first, second, and third directions.

Others

In the examples of the image blur correction device 10 according to the first embodiment, the image blur correction device 10A according to the second embodiment, the image blur correction device 10B according to the third embodiment, the image blur correction device 10C according to the fourth embodiment, and the image blur correction device 10D according to the fifth embodiment, the first actuator 23, the second actuator 26, and the third actuator 36 are movable-shaft-type actuators in which the first driving shaft 23a, the second driving shaft 26a, and the third driving shaft 36a are movable in the axial direction respectively.

Figure 46:
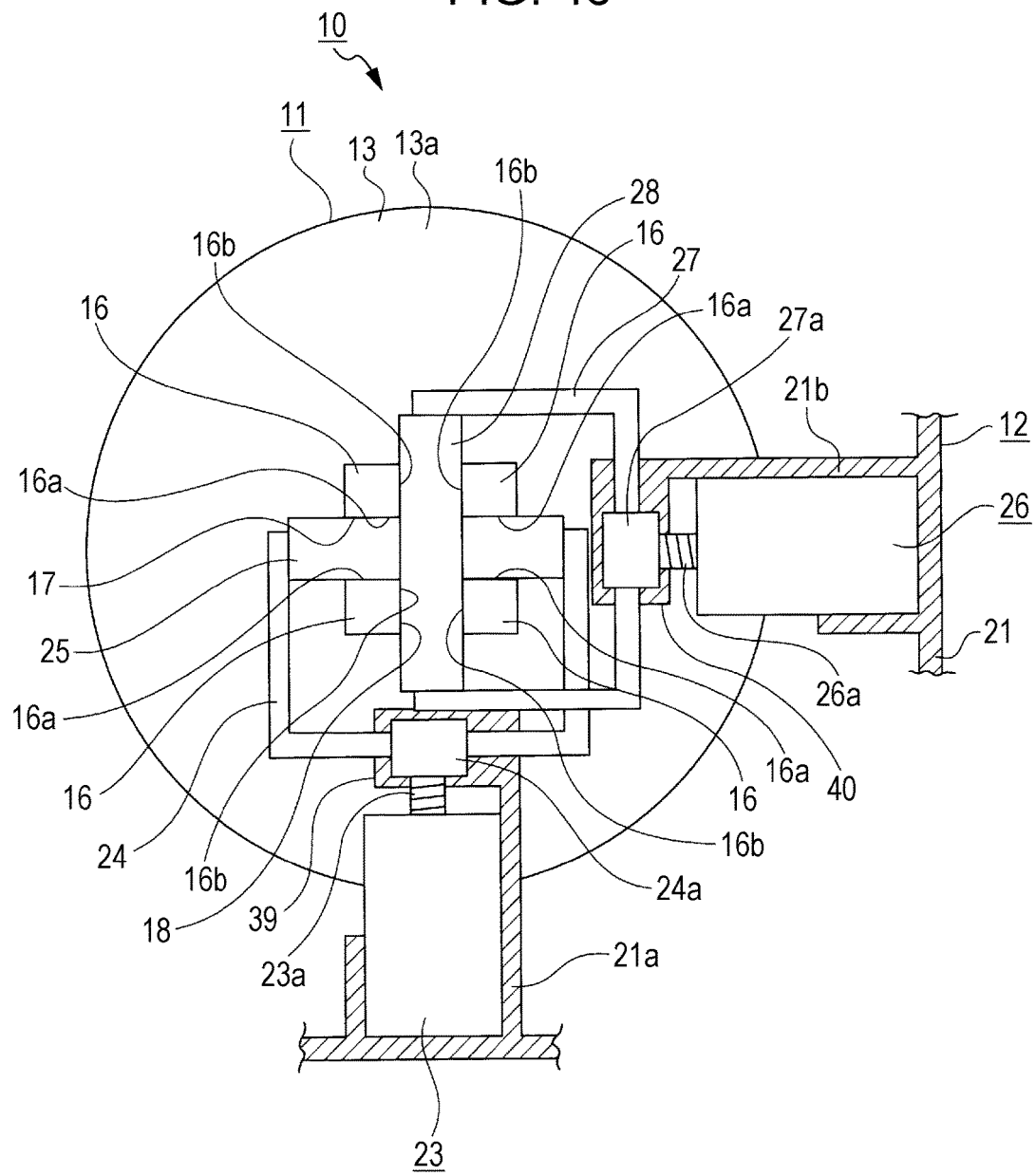
FIG. 46 is a schematic rear view illustrating an example in which a rotatable-shaft-type actuator is used as an actuator together with FIG. 47.
Figure 47:
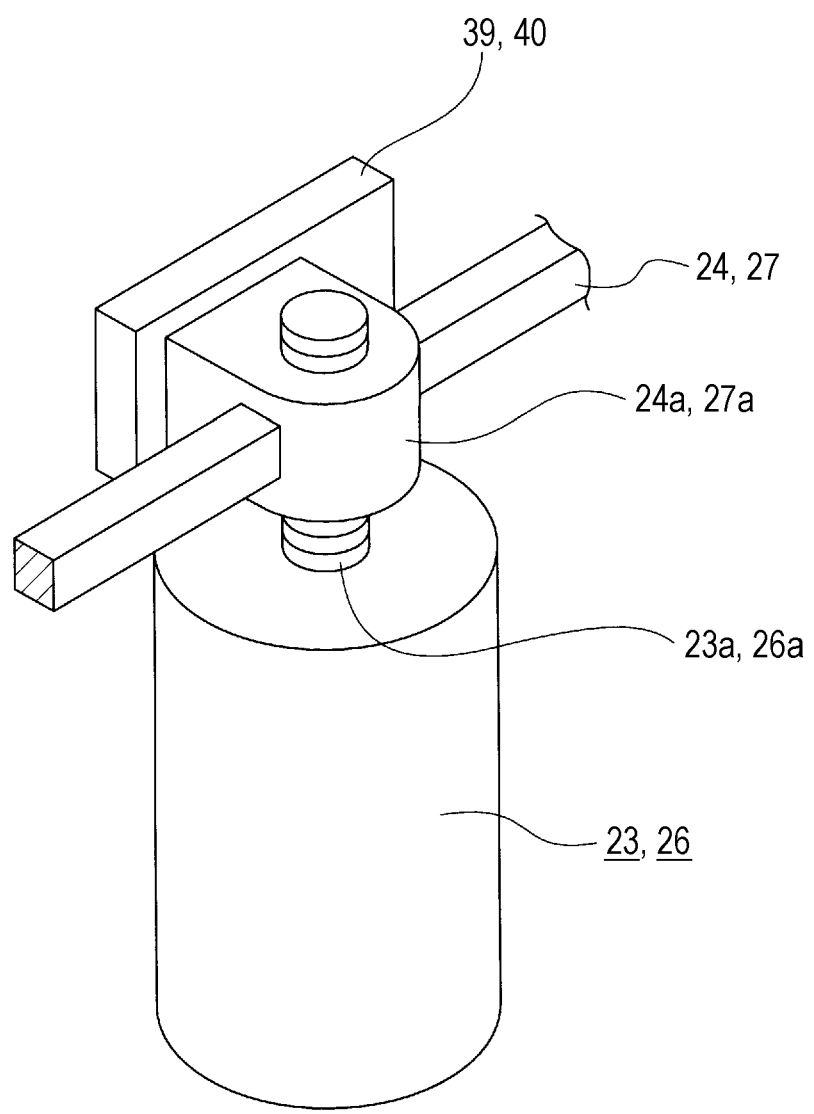
FIG. 47 is a schematic enlarged perspective view.

However, as described below, in the image blur correction devices 10, 10A, 10B, 10C, and 10D, it is possible to use rotatable-shaft-type actuators in which the first driving shaft 23a, the second driving shaft 26a, and the third driving shaft 36a are rotatable in the axial rotation direction (refer to FIGS. 46 and 47).

The configurations and operations of the first actuator 23, the second actuator 26, and the third actuator 36 as rotatable-shaft-type actuators are the same. Hence, hereinafter, exemplary cases of the first actuator 23 and the second actuator 26 will be described.

When the first actuator 23 is used as a rotatable-shaft-type actuator, thread grooves are formed in the first driving shaft 23a, and a thread portion 24a having a planar portion is provided on the first connection portion 24. Thus, the thread portion 24a is threadedly engaged with the first driving shaft 23a. The planar portion of the thread portion 24a comes into, for example, surface contact with a rotation regulation portion 39 which is provided in the fixing member 12, 12A, 12B, 12C, or 12D, whereby the rotation is regulated.

Accordingly, when the driving shaft 23a of the first actuator 23 is rotated, the thread portion 24a, of which rotation is regulated by the rotation regulation portion 39, is integrated with the first driving portion 25, is pushed in a direction according to the rotation direction of the first driving shaft 23a, and is moved upward or downward. When the first driving portion 25 is moved, the driven portions 16 and 16 are pressed, whereby the lens unit 11, 11A, 11B, 11C, or 11D is rotated.

When the second actuator 26 is used as a rotatable-shaft-type actuator, thread grooves are formed in the second driving shaft 26a, and a thread portion 27a having a planar portion is provided on the second connection portion 27. Thus, the thread portion 27a is threadedly engaged with the second driving shaft 26a. The planar portion of the thread portion 27a comes into, for example, surface contact with a rotation regulation portion 40 which is provided in the fixing member 12, 12A, 12B, 12C, or 12D, whereby the rotation is regulated.

Accordingly, when the driving shaft 26a of the second actuator 26 is rotated, the thread portion 27a, of which rotation is regulated by the rotation regulation portion 40, is integrated with the second driving portion 28, is pushed in a direction according to the rotation direction of the second driving shaft 26a, and is moved rightward or leftward. When the second driving portion 28 is moved, the driven portions 16 and 16 are pressed, whereby the lens unit 11, 11A, 11B, 11C, or 11D is rotated.

Embodiment of Imaging Apparatus

Figure 48:
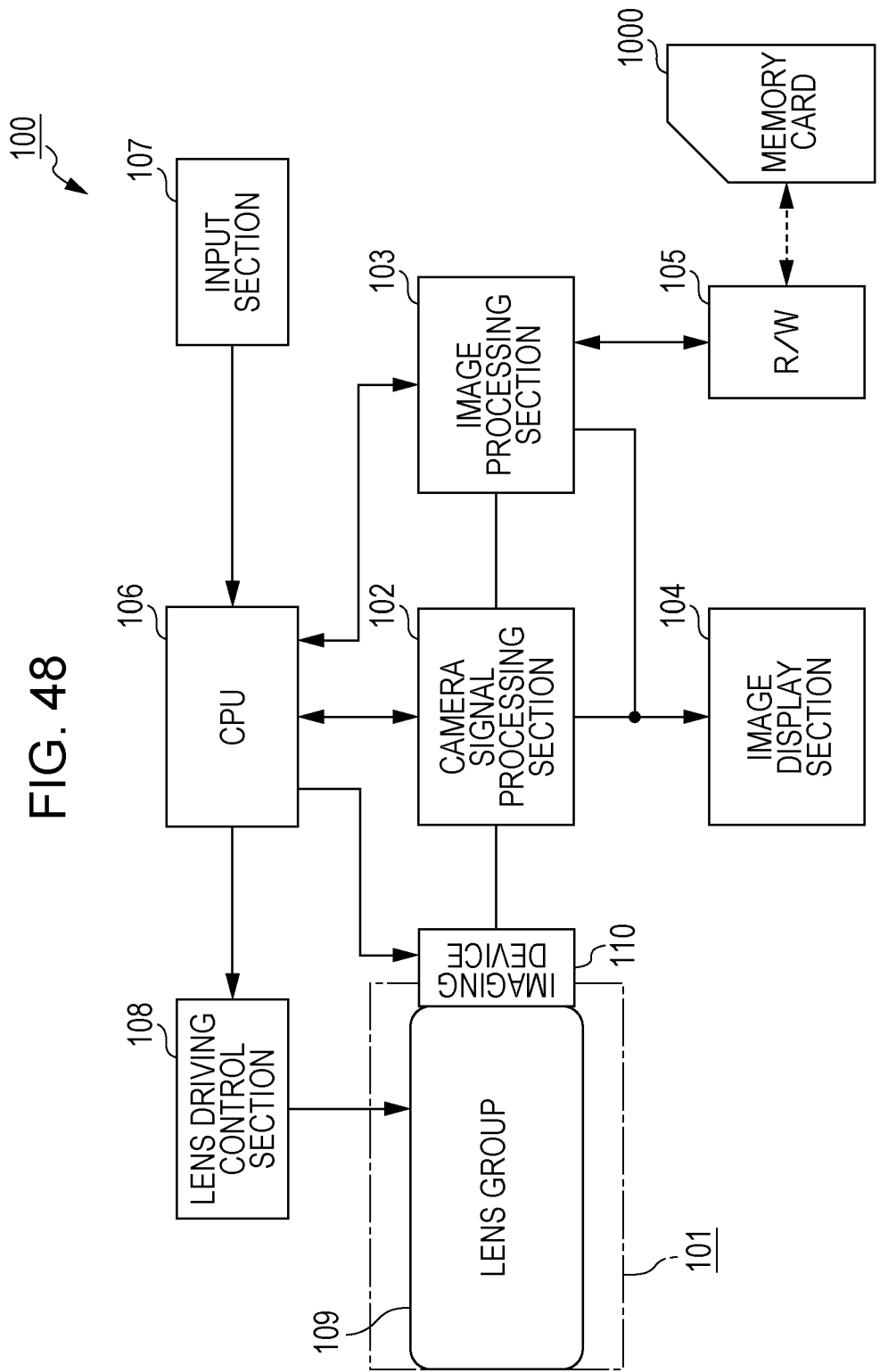
FIG. 48 is a block diagram of an imaging apparatus.

FIG. 48 is a block diagram of a video camera as an imaging apparatus according to an embodiment of the present technology.

An imaging apparatus (video camera) 100 (corresponds to an imaging apparatus 1) includes: a lens unit 101 (corresponds to lens unit 11, 11A, 11B, 11C, or 11D) that is in charge of an imaging function; a camera signal processing section 102 that performs signal processing such as analog-digital conversion on a photographed image signal; and an image processing section 103 that performs recording reproduction processing on an image signal. Further, the imaging apparatus 100 includes: an image display section 104 such as a liquid crystal panel that displays the photographed image and the like; a reader/writer (R/W) 105 that writes and reads the image signal into and from a memory card 1000; a central processing unit (CPU) 106 that controls the entire imaging apparatus 100; an input section 107 that is formed of various switches and the like for causing a user to perform necessary operations; and a lens driving control section 108 that controls driving of the lens disposed in the lens unit 101.

The lens unit 101 includes: an optical system that includes a lens group 109; an imaging device 110 such as a charge coupled device (CCD) or a complementary metal-oxide semiconductor (CMOS); and the like.

The camera signal processing section 102 performs various kinds of signal processing such as conversion of an output signal from the imaging device 110 into a digital signal, noise removal, image quality correction, and conversion into a luminance color difference signal.

The image processing section 103 performs compression coding and expansion decoding processing on the image signal based on a predetermined image data format, processing of converting data specification such as resolution, and the like.

The image display section 104 has a function of displaying a state of a user's operation performed on the input section 107 and various kinds of data such as the photographed image.

The R/W 105 writes the image data, which is encoded by the image processing section 103, into the memory card 1000, and reads the image data which is recorded into the memory card 1000.

The CPU 106 functions as a control processing unit that controls respective circuit blocks provided in the imaging apparatus 100, and controls the respective circuit blocks on the basis of an instruction input signal from the input section 107 and the like.

The input section 107 includes, for example, a shutter release button for performing a shutter operation and a selection switch for selecting an operation mode, and outputs the instruction input signal according to the user's operation to the CPU 106.

The lens driving control section 108 controls a not-shown motor that drives the lenses of the lens group 109 on the basis of the control signal sent from the CPU 106.

The memory card 1000 is, for example, a semiconductor memory that is detachable from a slot connected to the R/W 105.

Hereinafter, the operations of the imaging apparatus 100 will be described.

In a photography standby state, under the control performed by the CPU 106, the signal of the image photographed by lens unit 101 is output to the image display section 104 through the camera signal processing section 102, and is displayed as a camera live view. Further, when the instruction input signal for zooming sent from the input section 107 is input, the CPU 106 outputs the control signal to the lens driving control section 108, and thereby a predetermined lens of the lens group 109 is moved on the basis of the control of the lens driving control section 108.

When a not-shown shutter of the lens unit 101 is operated by the instruction input signal sent from the input section 107, the photographed image signal is output from the camera signal processing section 102 to the image processing section 103, and is subjected to the compression coding processing so as to be converted into digital data with a predetermined data format. The converted data is output to the R/W 105, and is written into the memory card 1000.

Focusing and zooming are performed by causing the lens driving control section 108 to move the predetermined lens of the lens group 109 on the basis of the control signal sent from the CPU 106.

When the image data recorded in the memory card 1000 is reproduced, in response to the operation of the input section 107, the predetermined image data is read from the memory card 1000 through the R/W 105, and is subjected to the expansion decoding processing through the image processing section 103. Thereafter, the reproduced image signal is output to the image display section 104, and a reproduced image is displayed.

Overview

As described above, in the image blur correction device 10, 10A, 10B, 10C, or 10D, the first movement allowance section 17 or 29 is formed. The first movement allowance section 17 or 29 moves the first driving portion 25 relative to the lens unit 11, 11A, 11B, 11C, or 11D when the lens unit 11, 11A, 11B, 11C, or 11D is rotated by the movement of the second driving portion 28.

Further, the second movement allowance section 18 or 30 is formed. The second movement allowance section 18 or 30 moves the second driving portion 28 relative to the lens unit 11, 11A, 11B, 11C, or 11D when the lens unit 11, 11A, 11B, 11C, or 11D is rotated by the movement of the first driving portion 25.

Thereby, when the lens unit 11, 11A, 11B, 11C, or 11D is rotated by the second driving portion 28, the first driving portion 25 is moved relative to the lens unit 11, 11A, 11B, 11C, or 11D. In addition, when the lens unit 11, 11A, 11B, 11C, or 11D is rotated by the first driving portion 25, the second driving portion 28 is moved relative to the lens unit 11, 11A, 11B, 11C, or 11D.

Accordingly, the two gimbal mechanisms are not configured so as to face toward and overlap with each other. Hence, it is possible to simplify the structure and achieve reduction in the size of the device.

Further, the spaces between the plural driven portions 16, 16, . . . , 16A, 16A, . . . , or 16D, 16D, . . . are formed as the first movement allowance section 17 or 29 and the second movement allowance section 18 or 30. The first driving portion 25 and the second driving portion 28 are respectively inserted into the first movement allowance section 17 or 29 and the second movement allowance section 18 or 30.

Accordingly, the first driving portion 25 and the second driving portion 28 press the driven portions 16, 16, . . . , 16A, 16A, . . . , or 16D, 16D, . . . , the lens unit 11, 11A, 11B, 11C, or 11D is rotated, and the first movement allowance section 17 or 29 and the second movement allowance section 18 or 30 are spaces between the driven portions 16, 16, . . . , 16A, 16A, . . . , or 16D, 16D, . . . . Hence, it is possible to simplify the structure, and then it is possible to secure a smooth rotation operation of the lens unit 11, 11A, 11B, 11C, or 11D.

Furthermore, the first driving portion 25 and the second driving portion 28 are disposed to intersect with each other. Hence, the first driving portion 25 and the second driving portion 28 overlap with each other in the optical axis direction, and thus it is possible to achieve reduction in the size through space saving in a direction orthogonal to the optical axis P.

Moreover, the four driven portions 16, 16, . . . are arranged in a matrix. Hence, it is possible to minimize the space in which the driven portions 16, 16, . . . , 16A, 16A, . . . , or 16D, 16D, . . . are arranged, and it is possible to further simplify the structure and achieve reduction in the size of the device.

Present Technology

The present technology may have the following configurations:

(1) An image blur correction device including: a lens unit that has at least one lens and is rotatable at least in a first direction, which is an axial rotation direction of a first fulcrum axis orthogonal to an optical axis of the lens, and a second direction which is an axial rotation direction of a second fulcrum axis orthogonal to the first fulcrum axis; a fixing member that rotatably supports the lens unit in the first and second directions; a first actuator that has a first driving portion movable in a predetermined direction so as to rotate the lens unit in the first direction; and a second actuator that has a second driving portion movable in a predetermined direction so as to rotate the lens unit in the second direction, in which a first movement allowance portion is formed that moves the first driving portion relative to the lens unit when the lens unit is rotated in the second direction by movement of the second driving portion, and in which a second movement allowance portion is formed that moves the second driving portion relative to the lens unit when the lens unit is rotated in the first direction by movement of the first driving portion.

(2) The image blur correction device according to (1), in which the lens unit is provided with a plurality of protrusion portions which are pressed by the driving portions and function as driven portions, in which spaces between the plurality of protrusion portions are formed as the movement allowance portions, and in which the driving portions are inserted into the movement allowance portions in a state where the driving portions are movable.

(3) The image blur correction device according to (2), in which the first driving portion and the second driving portion are disposed in a state where the driving portions intersect with each other in a protruding direction of the driven portions.

(4) The image blur correction device according to (3), in which the number of the driven portions provided is four, and the driven portions are arranged in a matrix.

(5) The image blur correction device according to any one of (2) to (4), in which when the lens unit is rotated, the driving portions come into line contact with the driven portions.

(6) The image blur correction device according to any one of (1) to (5), in which the lens unit is provided with a plurality of protrusion portions which are pressed by the driving portions and function as driven portions, in which the driving portions are formed in frame shapes, and spaces inside the driving portions are formed as the movement allowance portions, and in which the driving portions are inserted into the movement allowance portions in a state where the driving portions are movable.

(7) The image blur correction device according to (6), in which the first driving portion and the second driving portion are disposed in a state where the driving portions intersect with each other.

(8) The image blur correction device according to (6) or (7), in which when the lens unit is rotated, the driving portions come into line contact with the driven portions.

(9) The image blur correction device according to any one of (1) to (8), in which the first driving portion is rotatable in an axial rotation direction of the first fulcrum axis, and in which the second driving portion is rotatable in an axial rotation direction of the second fulcrum axis.

(10) The image blur correction device according to any one of (1) to (9), in which the lens unit is rotatable in a third direction which is an axial rotation direction of a third fulcrum axis orthogonal to both of the first fulcrum axis and the second fulcrum axis, and in which a third actuator, which has a third driving portion movable in a predetermined direction so as to rotate the lens unit in the third direction, is provided.

(11) The image blur correction device according to (10), in which the third direction is set as an axial rotation direction of the optical axis of the lens, in which the lens unit is provided with a driven portion which is pressed by the first driving portion or the second driving portion, in which the lens unit is rotated in the first direction or the second direction by the driven portion being pressed by the first driving portion or the second driving portion, and in which when the lens unit is rotated toward one side in the third direction of the lens unit, the driven portion is rotatable toward the other side in the third direction.

(12) The image blur correction device according to (10) or (11), in which the third driving portion is rotatable in the axial rotation direction of the third fulcrum axis.

(13) An imaging apparatus including: an image blur correction device that has a lens unit having at least one lens and an outer casing, in which the lens unit is disposed, and corrects image blur by rotating the lens unit at least in a first direction, which is an axial rotation direction of a first fulcrum axis orthogonal to an optical axis of the lens, and a second direction which is an axial rotation direction of a second fulcrum axis orthogonal to the first fulcrum axis, in which the image blur correction device includes a fixing member that rotatably supports the lens unit in the first and second directions, a first actuator that has a first driving portion movable in a predetermined direction so as to rotate the lens unit in the first direction, and a second actuator that has a second driving portion movable in a predetermined direction so as to rotate the lens unit in the second direction, in which a first movement allowance portion is formed that moves the first driving portion relative to the lens unit when the lens unit is rotated in the second direction by movement of the second driving portion, and in which a second movement allowance portion is formed that moves the second driving portion relative to the lens unit when the lens unit is rotated in the first direction by movement of the first driving portion.

It should be understood by those skilled in the art that various modifications, combinations, sub-combinations and alterations may occur depending on design requirements and other factors insofar as they are within the scope of the appended claims or the equivalents thereof.

What is claimed is:

1. An image blur correction device, comprising:
    a lens unit that has at least one lens, wherein the lens unit is configured to rotate at least in one of a first direction or a second direction, wherein the first direction is an axial rotation direction of a first fulcrum axis orthogonal to an optical axis of the at least one lens, and wherein the second direction is an axial rotation direction of a second fulcrum axis orthogonal to the first fulcrum axis;

a fixing member configured to support the lens unit in the first direction and the second direction;

a first actuator configured to move in a third direction, wherein the first actuator comprises a first driving portion, and wherein the first actuator is further configured to rotate the lens unit in the first direction, a second actuator configured to move in a fourth direction, wherein the second actuator comprises a second driving portion, and wherein the second actuator is further configured to rotate the lens unit in the second direction; and a third actuator configured to move in a fifth direction, wherein the third actuator comprises a third driving portion, and wherein the third actuator is further configured to rotate the lens unit in a sixth direction, wherein a first movement allowance section in the lens unit is configured to allow movement of the first driving portion relative to the lens unit based on rotation of the lens unit in the second direction, wherein a second movement allowance section in the lens unit is configured to allow movement of the second driving portion relative to the lens unit based on rotation of the lens unit in the first direction, wherein a plurality of driven portions protrude from an end of a sliding portion of the lens unit, and wherein the lens unit further comprises a plurality of interference prevention surfaces configured to prevent interference between the third driving portion and the plurality of driven portions.

2. The image blur correction device according to claim 1, wherein the first driving portion and the second driving portion are inserted into the first movement allowance section and the second movement allowance section, based on movement of the first driving portion and the second driving portions.

3. The image blur correction device according to claim 1, wherein the first driving portion intersects with the second driving portion in a protruding direction of the plurality of driven portions.

4. The image blur correction device according to claim 1, wherein a number of driven portions in the plurality of driven portions is four, and wherein the plurality of driven portions are arranged in a matrix.

5. The image blur correction device according to claim 1, wherein, based on rotation of the lens unit, the first driving portion and second driving portion come into line contact with the plurality of driven portions.

6. The image blur correction device according to claim 1, wherein the first driving portion and the second driving portion are configured in frame shapes, and wherein a plurality of inner spaces of the first driving portion and the second driving portion are configured as the first movement allowance section and the second movement allowance section.

7. The image blur correction device according to claim 6, wherein the first driving portion intersects with the second driving portion.

8. The image blur correction device according to claim 6, wherein, based on rotation of the lens unit, the first driving portion and the second driving portion come into line contact with the plurality of driven portions.

9. The image blur correction device according to claim 1, wherein the first driving portion is configured to rotate in the axial rotation direction of the first fulcrum axis, and wherein the second driving portion is configured to rotate in the axial rotation direction of the second fulcrum axis.

10. The image blur correction device according to claim 1, wherein the lens unit is further configured to rotate in the sixth direction, and wherein the sixth direction is an axial rotation direction of a third fulcrum axis orthogonal to both of the first fulcrum axis and the second fulcrum axis.

11. The image blur correction device according to claim 10, wherein the sixth direction is set as an axial rotation direction of the optical axis of the at least one lens, wherein the plurality of driven portions are pressed by the first driving portion or the second driving portion, wherein the plurality of driven portions are configured to rotate the lens unit in the first direction or the second direction, and wherein, based on rotation of the lens unit toward the sixth direction, the plurality of driven portions are rotatable toward a direction opposite to the sixth direction.

12. The image blur correction device according to claim 10, wherein the third driving portion is configured to rotate in the axial rotation direction of the third fulcrum axis.

13. The image blur correction device according to claim 1, wherein the fixing member has a supporting portion which is cylindrical in shape, and an actuator attaching portion is on a back side of the supporting portion.

14. The image blur correction device according to claim 13, further comprising:

an annular portion at a front end portion of the supporting portion, wherein the annular portion is annular in shape, wherein the sliding portion is on an outer peripheral surface of an intermediate part of the lens unit, wherein the sliding portion is configured to support the annular portion with a plurality of spherical objects, and wherein the plurality of spherical objects are interposed between the sliding portion and the annular portion.

15. An imaging apparatus, comprising:

an image blur correction device that has a lens unit, wherein the lens unit comprises at least one lens, wherein the lens unit is in an outer casing, and wherein the image blur correction device is configured to correct image blur based on rotation of the lens unit at least in one of a first direction or a second direction, wherein the first direction is an axial rotation direction of a first fulcrum axis orthogonal to an optical axis of the at least one lens, and wherein the second direction is an axial rotation direction of a second fulcrum axis orthogonal to the first fulcrum axis, wherein the image blur correction device includes:

a fixing member configured to support the lens unit in the first direction and the second direction;

a first actuator configured to move in a third direction, wherein the first actuator comprises a first driving portion, and wherein the first actuator is further configured to rotate the lens unit in the first direction;

a second actuator configured to move in a fourth direction, wherein the second actuator comprises a second driving portion, and wherein the second actuator is further configured to rotate the lens unit in the second direction; and a third actuator configured to move in a fifth direction, wherein the third actuator comprises a third driving portion, and wherein the third actuator is further configured to rotate the lens unit in the sixth direction, wherein a first movement allowance section in the lens unit is configured to allow movement of the first driving portion relative to the lens unit based on rotation of the lens unit in the second direction, wherein a second movement allowance section in the lens unit is configured to allow movement of the second driving portion relative to the lens unit based on rotation of the lens unit in the first direction, wherein a plurality of driven portions protrude from an end of a sliding portion of the lens unit, wherein the lens unit further comprises a plurality of interference prevention surfaces configured to prevent interference between the third driving portion and the plurality of driven portions.

* * * * *